US008134748B2

(12) United States Patent
Nakabayashi et al.

(10) Patent No.: US 8,134,748 B2
(45) Date of Patent: Mar. 13, 2012

(54) IMAGE DATA MANAGEMENT PROCESSING APPARATUS, MEDIUM RECORDING IMAGE DATA MANAGEMENT PROCESSING PROGRAM AND IMAGE DATA MANAGEMENT PROCESSING METHOD

(75) Inventors: Kaoru Nakabayashi, Matumoto (JP); Shingo Yudasaka, Matumoto (JP); Yasushi Hiraoka, Matumoto (JP)

(73) Assignees: Seiko Epson Corporation, Tokyo (JP); A.I. Soft, Inc., Tokyo (JP)

( * ) Notice: Subject to any disclaimer, the term of this patent is extended or adjusted under 35 U.S.C. 154(b) by 0 days.

(21) Appl. No.: 13/082,948

(22) Filed: Apr. 8, 2011

(65) Prior Publication Data

US 2011/0181898 A1 Jul. 28, 2011

Related U.S. Application Data

(60) Division of application No. 12/431,337, filed on Apr. 28, 2009, now abandoned, which is a continuation of application No. 11/768,232, filed on Jun. 26, 2007, now Pat. No. 7,538,908, which is a continuation of application No. 10/811,881, filed on Mar. 30, 2004, now Pat. No. 7,333,241, which is a continuation of application No. 09/529,665, filed on Jun. 30, 2000, now Pat. No. 7,113,306.

(30) Foreign Application Priority Data

Aug. 18, 1998 (JP) .................................. 10-231708

(51) Int. Cl.
*H04N 1/60* (2006.01)

(52) U.S. Cl. ...................... 358/1.9; 358/448; 358/452

(58) Field of Classification Search .................. 358/1.1, 358/1.2, 1.9, 2.1, 443, 444, 448, 452
See application file for complete search history.

(56) References Cited

U.S. PATENT DOCUMENTS

| 5,335,097 | A | | 8/1994 | Murakami |
| 5,531,172 | A | | 7/1996 | Kojima et al. |
| 5,587,799 | A | | 12/1996 | Kawamura et al. |
| 5,669,040 | A | | 9/1997 | Hisatake |
| 5,724,154 | A | | 3/1998 | Ito et al. |
| 5,740,335 | A | | 4/1998 | Takayanagi et al. |
| 6,016,184 | A | * | 1/2000 | Haneda ........................... 355/36 |
| 6,166,719 | A | * | 12/2000 | Cariffe .......................... 345/690 |
| 6,323,882 | B1 | | 11/2001 | Jerome et al. |
| 6,344,907 | B1 | | 2/2002 | Watanabe et al. |

(Continued)

FOREIGN PATENT DOCUMENTS

JP 63082553 4/1988

(Continued)

*Primary Examiner* — Thomas D Lee
(74) *Attorney, Agent, or Firm* — Sughrue Mion, PLLC

(57) ABSTRACT

There has been a problem in that original image data should be saved with another name so as not to be altered, resulting in complexity and an increase in a necessary storage region. Image data are housed in a folder managed as a film metaphor and a database of photographic data 30b corresponding to each image data is prepared. When a desirable image processing is selected for desirable image data, the selected image processing is updated as modification information in the database structure. When display, output or print is actually required, various image processings are executed by referring to modification information on only a work area with original image data left. Therefore, it is possible to easily enjoy image modification or the like with the original image data left as they are.

6 Claims, 62 Drawing Sheets

U.S. PATENT DOCUMENTS

| | | |
|---|---|---|
| 6,377,359 B1 | 4/2002 | Higashio |
| 6,784,925 B1 | 8/2004 | Tomat et al. |
| 7,184,171 B2 | 2/2007 | Hara |
| 7,538,908 B2 | 5/2009 | Nakabayashi et al. |

FOREIGN PATENT DOCUMENTS

| | | |
|---|---|---|
| JP | 63313966 | 12/1988 |
| JP | 4239979 | 8/1992 |
| JP | 6309428 | 11/1994 |
| JP | 737071 | 2/1995 |
| JP | 757074 | 3/1995 |
| JP | 785237 | 3/1995 |
| JP | 896113 | 4/1996 |
| JP | 8293032 | 11/1996 |
| JP | 10200671 | 7/1998 |

* cited by examiner

FIG. 7

```
// private: attribute

USHORT m_nMask;      // mask flag indicative of effective member

SHORT m_x1;          // trimming start x coordinate
  SHORT m_y1;          // trimming start y coordinate
  SHORT m_x2;          // trimming end x coordinate
  SHORT m_y2;          // trimming end y coordinate
  SHORT m_nRotation;   // rotating angle
  SHORT m_nApf;        // automatic image modification
  SHORT m_nRed;        // red
  SHORT m_nGreen;      // green
  SHORT m_nBlue;       // blue
  SHORT m_nBrightness; // brightness
  SHORT m_nContrast;   // contrast
```

FIG. 15

| y | Y |
|---|---|
| 0 | 0 |
| Ymin | 5 |
| ⋮ | ⋮ |
| Ymax | 250 |
| 255 | 255 |

FIG. 19

| Ymed_target−Ymed | $\gamma$ |
|---|---|
| +20 | 0.80 |
| +15 | 0.85 |
| +10 | 0.90 |
| +5 | 0.95 |
| 0 | 1 |
| −5 | 1.05 |
| −10 | 1.10 |
| −15 | 1.15 |
| −20 | 1.20 |

FIG. 25

| $f(x-1, y+1)$ | $f(x, y+1)$ | $f(x+1, y+1)$ |
|---|---|---|
| $f(x-1, y)$ | $f(x, y)$ | $f(x+1, y)$ |
| $f(x-1, y-1)$ | $f(x, y-1)$ | $f(x+1, y-1)$ |

|  | i=-2 | -1 | 0 | 1 | 2 |
|---|---|---|---|---|---|
| j=-2 | 0 | 2 | 4 | 2 | 0 |
| -1 | 2 | 20 | 46 | 20 | 2 |
| 0 | 4 | 46 | 100 | 46 | 4 |
| 1 | 2 | 20 | 46 | 20 | 2 |
| 2 | 0 | 2 | 4 | 2 | 0 |

Please confirm the Epson printer is turned on and five A4 sheets are put in.
Please click an execute button to start print.

Execute   Cancel

FIG. 49
(a) 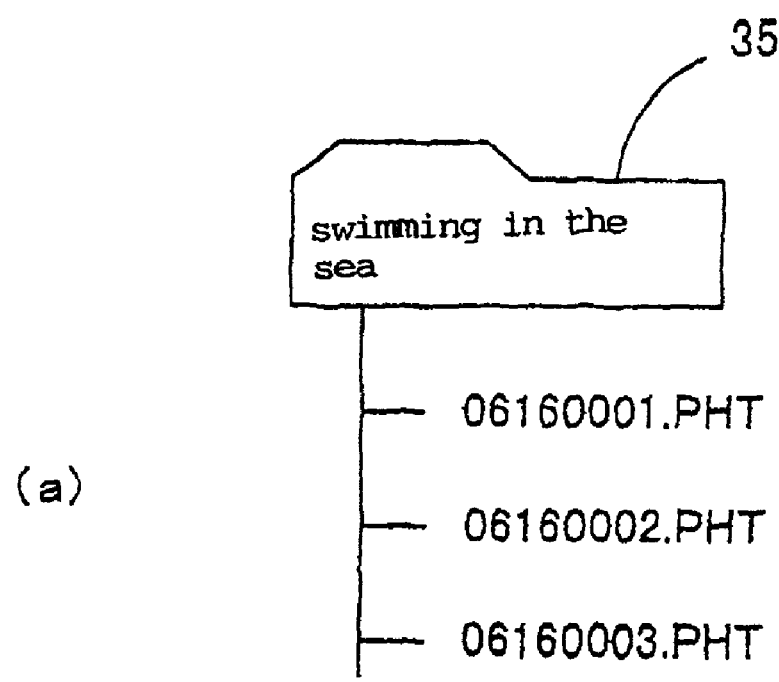
(b) 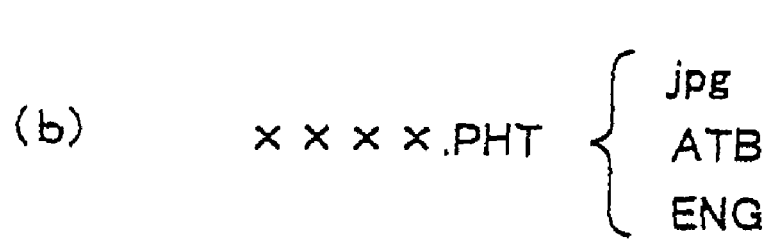

FIG. 51

```
private :

char [100]       PATRONE   ;

char [1000]       f_PICT   ;
```

FIG. 53

| processing | engine | order | processing intensity |
|---|---|---|---|
| automatic image modification | V1 | 1 | 1 |
| brightness | V1 | 0 | 0 |
| contrast | V1 | 0 | 0 |
| red | V1 | 0 | 0 |
| green | V1 | 0 | 0 |
| blue | V1 | 0 | 0 |

(a)

| processing | engine | order | processing intensity |
|---|---|---|---|
| automatic image modification | V1 | 0 | 0 |
| brightness | V2 | 4 | +2 |
| contrast | V2 | 5 | +3 |
| red | V2 | 1 | +1 |
| green | V2 | 2 | +1 |
| blue | V2 | 3 | −1 |

| group | processing | engine | order | processing intensity |
|---|---|---|---|---|
| 1 | automatic image modification | V1 | 1 | 1 |
| | brightness | V1 | 0 | 0 |
| | contrast | V1 | 0 | 0 |
| | red | V1 | 0 | 0 |
| | green | V1 | 0 | 0 |
| | blue | V1 | 0 | 0 |
| 2 | automatic image modification | V1 | 0 | 0 |
| | brightness | V1 | 1 | 2 |
| | contrast | V1 | 1 | 1 |
| | red | V1 | 0 | 0 |
| | green | V1 | 0 | 0 |
| | blue | V1 | 0 | 0 |

IMAGE DATA MANAGEMENT PROCESSING APPARATUS, MEDIUM RECORDING IMAGE DATA MANAGEMENT PROCESSING PROGRAM AND IMAGE DATA MANAGEMENT PROCESSING METHOD

This is a divisional of application Ser. No. 12/431,337 filed Apr. 28, 2009, which is continuation of application Ser. No. 11/768,232 filed Jun. 26, 2007, which is a continuation of application Ser. No. 10/811,881 filed Mar. 30, 2004, which in turn is a continuation of application Ser. No. 09/529,665 filed Apr. 18, 2000, now U.S. Pat. No. 7,113,306. The entire disclosures of the prior applications, application Ser. Nos. 12/431,337, 11/768,232, 10/811,881 and 09/529,665 are considered part of the disclosure of the present application and are hereby incorporated by reference.

TECHNICAL FIELD

The present invention relates to an image data processing apparatus capable of properly modifying and utilizing image data, a medium recording an image data set, a medium recording an image data processing program and an image data processing method.

BACKGROUND ART

In recent years, a digital still camera has been utilized rapidly. In the case in which photographing is carried out by means of the digital still camera, an image can be managed as data and modification and the like can be performed easily. For example, image data can easily give the fact that a dark image can be modified to be brighter and the color of the sky can be bluer for beauty.

Such a processing has widely been utilized as an image processing. If image data to be input is subjected to a processing, new image data are obtained and are overwritten in an original storage region.

DISCLOSURE OF THE INVENTION

In the above-mentioned conventional image data processing apparatus, there has been the following problem.

First of all, original image data are changed. The image data processing apparatus is not preferable for utilization if importance is attached to the original image data. As a matter of course, it is also possible to carry out a processing in which the original image data are once saved and are further saved with another name. However, this processing is complicated and causes a required storage region to be increased. In that case, moreover, the individual management of the original image data and the modified image data is very complicated.

Furthermore, picture quality is more deteriorated for each rewriting in a certain kind of image format. In this sense, therefore, even if the modification is slightly carried out, the picture quality is deteriorated.

In consideration of the above-mentioned problem, it is an object of the present invention to provide an image data processing apparatus capable of referring to a result obtained by easily carrying out an image processing while maintaining the originality of image data, a medium recording an image data set, a medium recording an image data processing program and an image data processing method.

In order to achieve the above-mentioned object, a first aspect of the present invention is directed to an image data processing apparatus comprising a parameter setting unit which sets a parameter representing contents of a predetermined image processing to be executed on image data, a data saving unit which saves the image data and the parameter together with relating information, a data acquiring unit, which acquires the image data and the parameter by referring to the relating information, and an image processing reproducing unit which obtains image data subjected to the specified image processing based on the acquired image data and parameter.

A second aspect of the present invention is directed to an image data processing apparatus comprising a parameter setting unit which sets a parameter representing contents of a predetermined image processing to be executed on image data, and a data saving unit which saves the image data and the parameter together with relating information, and a third aspect of the present invention is directed to an image data processing apparatus in which a parameter representing contents of a predetermined image processing to be executed on image data and the image data are saved together with mutual relating information, the apparatus comprising a data acquiring unit which acquires the image data and the parameter by referring to the relating information, and an image processing reproducing unit which obtains image data subjected to the specified image processing based on the acquired image data and parameter.

According to the first aspect of the present invention having the above-mentioned structure, when the parameter setting unit sets a parameter representing contents of a predetermined image processing to be executed on image data, the data saving unit saves the image data and the parameter together with relating information. When the data acquiring unit acquires the image data and the parameter by referring to the relating information, the image processing reproducing unit obtains image data subjected to the specified image processing based on the acquired image data and parameter.

More specifically, the parameter representing the contents of the image processing are stored in relation to the image data. For example, also in the case in which the image processing is carried out, the original image data are not altered but are managed as a parameter. If necessary, image data subjected to the image processing based on the parameter are obtained. The result of the image processing can be utilized and the original image data are left as they are.

According to the second and third aspects of the present invention, the whole present invention is carried out partially.

According to the fourth aspect of the present invention having the above-mentioned structure, the type or degree of the image processing is represented by the parameter. Consequently, the contents of the image processing are shown more specifically. As a matter of course, the types and degrees of a plurality of image processings are also represented.

According to the fifth aspect of the present invention having the above-mentioned structure, furthermore, a plurality of parameters are prepared every type of the image processing. Therefore, a certain type of image processing is net always restricted to one content but a plurality of contents can be left. For example, one image processing adjusts a sharpness, and a parameter representing a high enhancement degree of the sharpness and a parameter representing a low enhancement degree of the sharpness are saved, any of which is selected during reproduction. In the case in which the reproduced image data are to be printed, an optimum enhancement degree of the sharpness is sometimes changed by the resolution of a printing device. Corresponding to such a case, a plurality of parameters can also be left.

According to the sixth aspect of the present invention having the above-mentioned structure, furthermore, a plurality of parameters which can be saved can be executed selectively.

For example, consequently, in the cases in which a sufficient time can be obtained for the image processing and the image processing should be carried out in a very short time, the same picture quality is not always required. For the latter, therefore, an image processing which can be implemented at a low load can be carried out. Accordingly, in the case of a slide show, an image processing corresponding to a parameter according to the execution of the slide show is carried out. In the case of print, an image processing is executed according to a parameter corresponding thereto. As a matter of course, execution conditions may be determined for this selection to select and execute the processing which satisfies the condition at the time of the execution or a user may specify the condition.

According to the seventh aspect of the present invention having the above-mentioned structure, moreover, the execution order information of the parameter is also provided on the premise that there are a plurality of parameters. Consequently, when the image processing is carried out according to the execution order information, it is performed in time series. Correspondingly, if the parameter is left for each operation, such a parameter represents a plurality of histories in time series. Accordingly, the image is reproduced by faithfully passing through the image processing process in progress. As a matter of course, it is not necessary to execute all the processings and the processing can be halted to reproduce a reproducing process.

According to the eighth aspect of the present invention having the above-mentioned structure, furthermore, the parameter is divided into a plurality of sets which can be selected optionally. Thus, the image processing can be carried out based on the parameters of the sets selected according to the situation of the execution.

More specifically, only one result of the image processing is not restricted but a plurality of results of the image processing can be selected. For example, an image processing for clear display on a display and an image processing for clear printing are different from each other in many cases. In such cases, it is advantageous that a parameter for the display on the display and a parameter for the printing can be stored together. Moreover, it is suitable that parameter sets can be prepared for each size and each user to correspond to an output size as well as an output destination and to share one image data by a plurality of users.

According to the ninth aspect of the present invention having the above-mentioned structure, furthermore, the parameter is divided into a plurality of sets, and an image processing corresponding to the situation of a pixel is applied. More specifically, the parameter sets are applied ununiformly to the image data. For example, the parameter sets are used separately according to the position of the pixel or the color of the pixel. The region is divided into the central portion of an image, a specific range which is designated in advance and upper and lower half portions, thereby causing different sets of parameters to apply to the position of the pixel. Moreover, the color of the pixel is divided into a skin color region, a blue color region and a region of the bright colors of the sunset, an optimum parameter according to a subject can almost be applied.

According to the tenth aspect of the present invention having the above-mentioned structure, furthermore, the storage region is partitioned as a hierarchical structure, and the image data and the parameter are divided by the hierarchical structure. The partitioned portion itself also represents a relation. Moreover, for the correspondence of the image data to the parameter, the parameter may be stored in the same section or a corresponding hierarchical structure may be provided in another region to store the same parameter.

According to the eleventh aspect of the present invention having the above-mentioned structure, furthermore, the thumb nail having a small capacity is caused to previously correspond with the same level as the correspondence of the parameter. The thumb nail data can also be managed by a processing to be carried out in parallel with the management of the parameter.

According to the twelfth aspect of the present invention having the above-mentioned structure, furthermore, the image data and the parameter are managed on the different storage devices. For example, the image data are sometimes managed in a plurality of removable storage regions. In this case, writing cannot be always carried out depending on the storage region. In a write disable storage region, the parameter can be managed in a write enable storage region.

In some storage regions, the writing can be carried gut but cannot be properly performed. For example, several people often share the storage region through a network. Any of them should prevent the rewriting of the shared image data without permission. In such a case, the image data are managed in the write enable storage region together with a shared region as the storage region which is not suitable for the writing. Referring to the image data in the storage region which is not suitable for the writing, the parameter is managed in the write enable region. As a matter of course, the same problems sometimes arise in addition to the network and the shared region. In any case, the parameter is managed in the storage region which is suitable for the writing.

According to the thirteenth aspect of the present invention having the above-mentioned structure, furthermore, the parameter setting unit sets the contents of the image processing represented by the parameter based on the result obtained by statistically analyzing the image data. More specifically, the present invention is applied to the automatic processing.

According to the fourteenth aspect of the present invention having the above-mentioned structure, furthermore, the image processing reproducing unit selects the corresponding image processing section based on the parameter, thereby executing the image processing to be carried out for reproducing the result of the image processing. The means for implementing the image processing can be selected by the various methods as an example of implementation on a computer. Irrespective of the inside or outside, the method can be selected for the implementation. More specifically, an image processing section corresponding to an image processing having a different version can be selected, an image processing section provided by an operating system of a computer or the like can be selected and activated, or a necessary image processing section can be searched from a network or the like and be activated.

Thus, it can be easily understood that a measure for relating and saving the parameter representing the contents of the image processing without changing the image data by the execution of the image processing is not restricted to a substantial apparatus but can function as a method thereof. More specifically, it is obvious that the substantial apparatus is not always used but the method can also be used effectively.

Moreover, such an image data processing apparatus is provided by itself or is incorporated and utilized in another equipment in some cases. The thought of the invention is not restricted but includes various manners. Accordingly, a software or a hardware can be used properly.

As a concrete example of the thought of the invention, in the case in which the present invention is applied to the software of the image data processing apparatus, it is present and utilized on a recording medium recording such a software as a matter of course. Thus, the present invention is established as the software itself. Accordingly, each invention as a medium described in this specification corresponds to a recorded program itself at a ratio of one to one.

As a matter of course, the recording medium may be a magnetic recording medium or an optical magnetic recording medium, and so is any recording medium which will be developed in the future. Moreover, a duplicating stage such as a primary reproduced article, a secondary reproduced article or the like is quite the same. Moreover, also in the case in which a communicating line is utilized as a supply method, the present invention is utilized.

Furthermore, also in the case in which a software and a hardware are partially used for implementation, the thought of the invention is not quite different. It is also possible to use such a configuration that a part of data may be stored on the recording medium and may be properly read if necessary.

In order to thus reproduce the image data, the medium recording the image data set is indispensable and the present invention can also be implemented in such a configuration.

BRIEF DESCRIPTION OF THE DRAWINGS

FIG. 7 shows a variable declaration of a management parameter.

FIG. 15 shows a conversion table for the enlargement of the luminance distribution.

FIG. 19 is a table showing the correspondence relationship between a brightness evaluation and γ.

FIG. 25 is a diagram illustrating the case in which the degree of change of an image is obtained between all the adjacent pixels.

FIG. 27 is a diagram showing an unsharp mask having 5×5 pixels.

FIG. 45 is a diagram showing an operation screen for carrying out a print processing.

FIG. 49 is a diagram showing another variant of the file structure.

FIG. 51 shows an example of definition of a variable to be used for the processing of generating a work image file.

FIG. 53 is a table showing the contents of modification information.

FIG. 56 is a table showing the contents obtained when there are a plurality of modification information.

BEST MODE OF CARRYING OUT THE INVENTION

First Embodiment

An embodiment of the present invention will be described below with reference to the drawings.

Figure 1:
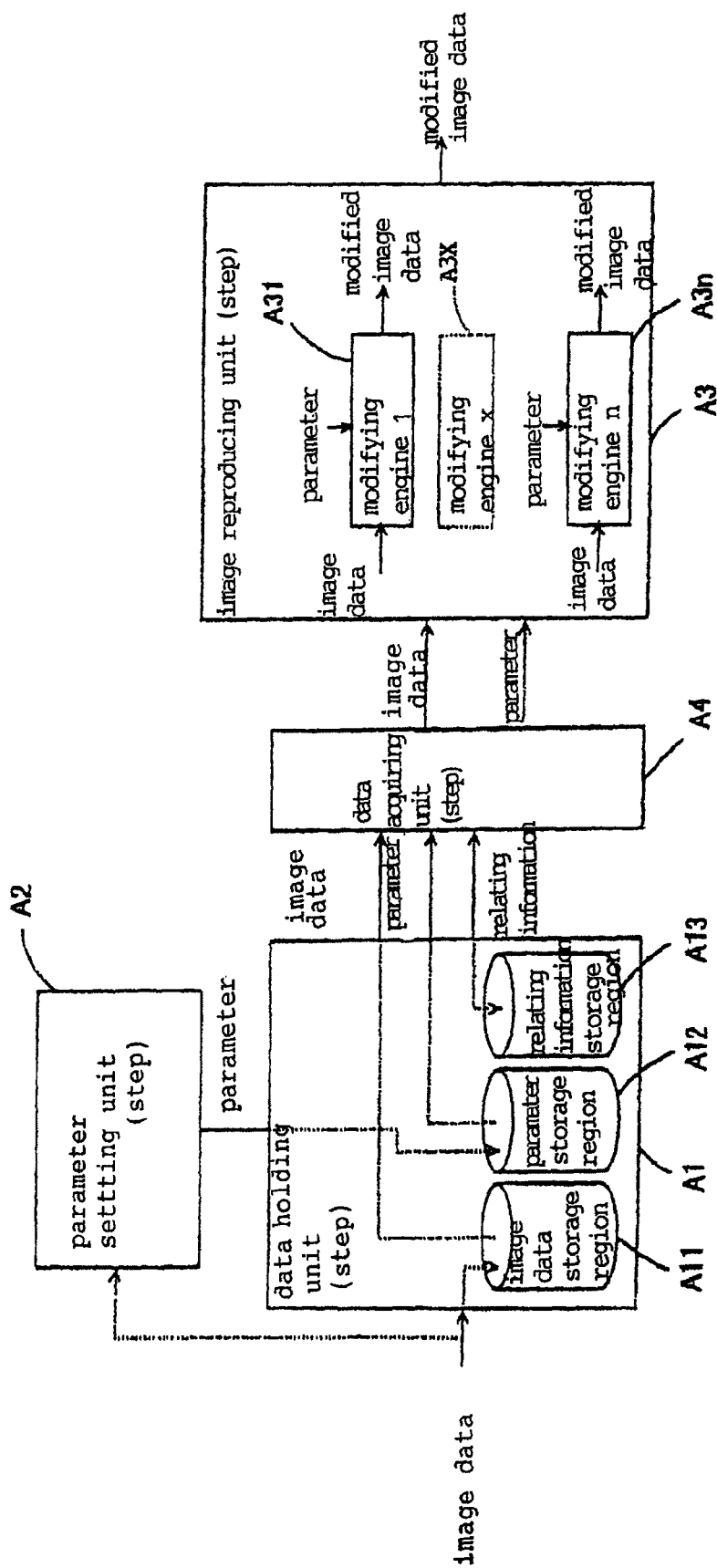
FIG. 1 is a diagram showing the schematic structure of an image data processing apparatus according to an embodiment of the present invention corresponding to claims.

FIG. 1 is a diagram showing the corresponding schematic structure of an image data processing apparatus according to the embodiment of the present invention.

Image data photographed by a digital still camera or the like are managed by utilizing an external storage device such as a computer or the like. A data saving unit A1 corresponding to the external storage device or the like stores a plurality of image data and parameters corresponding thereto in relation to each other, and carries out management such as proper change, addition, deletion or the like by database management by a computer.

In order to carry out such management, the data saving unit A1 keeps an image data storage region A11, a parameter storage region A12 and a relating information storage region A13. While the image data storage region A11 stores image data, it may have a batch database structure or may store individual files. The parameter storage region A12 is information indicative of an instruction for an image processing to individual image data and has a comparative smaller capacity than the image data. Also in this case, a batch database structure may be provided or individual files may be generated. The relating information storage region A13 records relating information for relating a parameter stored in the parameter storage region A12 and image data stored in the image data storage region A11. Thus, there are various relating methods. As an example, if the database structure of a parameter is formed and constituted as index information, the parameter storage region A12 and the relating information storage region A13 are implemented inseparably integrally. As a matter of course, the image data storage region A11 includes removable recording media and the like. Moreover, the image data storage region A11, the parameter storage region A12 and the relating information storage region A13 do not need to be the same devices physically. Furthermore, the image data storage region A11 may be a shared region to be accessed by a plurality of devices and the like.

Moreover, if a parameter representing the contents of an image processing by the management operation or arithmetic operation of the image data and the like is set by means of a parameter setting unit A2 which is implemented by an input-output apparatus of a computer itself and the result of an arithmetic operation of the computer itself, the data saving unit A1 relates a corresponding parameter to image data to executes a management processing through the database management. In this case, relating information is generated. The parameter setting unit A2 serves to generate a parameter as a result, and includes the case in which an instruction for an image processing from a user through a GUI is accepted to set a parameter and the case in which image data are originally inspected to set a parameter for implementing an image processing to meet a predetermined purpose. The relating information can be variously utilized, for which a correspondence table may be prepared, a file name may be related and saving regions may be made coincident with each other for relations.

In the data saving unit A1, thus, image data and a parameter representing the contents of an image processing to be executed for the image data are related by the relating information and are saved. A data acquiring unit A4 acquires image data and parameters corresponding based on the information of the relating information storage region A13 from the image data storage region A11 and the parameter storage region A12 in the data saving unit A1, and outputs them to an image processing reproducing unit A3. In general, the data acquiring unit A4 also accepts an instruction for image selection from the user through the GUI and specifies image data to be acquired. A specifying method is not restricted. In a computer or the like, for example, a predetermined argument is given from an external application to specify object image data. Consequently, the image data can be specified and acquired and be simultaneously transferred to the image processing reproducing unit A3. Moreover, a manner for acquiring the image data is changed by a specific hardware. Also in the case in which the image data are simply set to a variable in an expanded state on a memory, it can be considered that the image data are acquired.

The image processing reproducing unit A3 serves to implement a modification processing corresponding to a parameter and includes a plurality of modifying engines A31 to A3n. When image data and a parameter are given, each modifying engine A3x carries out modification corresponding to each modifying engine A3x represented by the same parameter on the image data and newly generates and outputs modified image data. The image data are treated as an original and the modified image data are newly generated. As a matter of course, the original image data can be freely overwritten by the newly generated image data, and may be overwritten and saved in the image data storage region A11 in the data saving unit A1. A plurality of modifying engines A31 to A3n are provided in such a meaning that various kinds of conversion results are obtained. One modifying engine may be substantially provided to obtain various kinds of results of conversion depending on the parameter or the modifying engines may be individually prepared to obtain individual results of conversion, respectively. Moreover, the modifying engines A31 to A3n do not always include applications themselves therein but the modifying engines A31 to A3n provided externally may be selected.

The data saving unit A1, the parameter setting unit A2, the image processing reproducing unit A3 and the data acquiring unit A4 are not restricted to a single hardware but can be implemented by utilizing a general-purpose computer system 10. In the case in which the above-mentioned structure is thus implemented by a software, they are implemented as a data saving step A1, a parameter setting step A2, a data acquiring step A4 and an image reproducing processing step A3, respectively.

In the present embodiment, the computer system 10 is employed as an example of a hardware for implementing such an image data processing apparatus.

Figure 2:
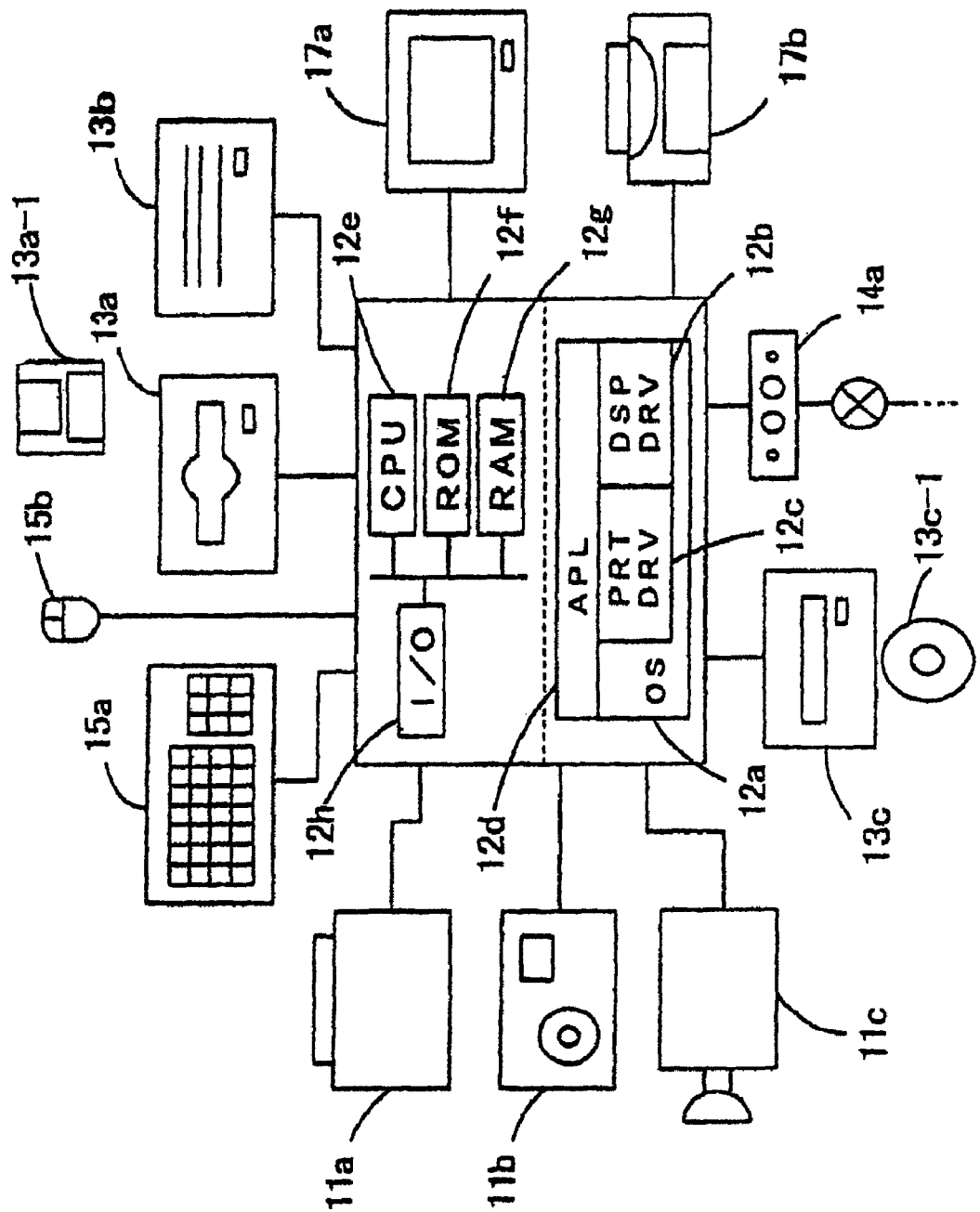
FIG. 2 is a block diagram showing a specific hardware of the image data processing apparatus.

FIG. 2 is a block diagram showing the computer system 10.

The computer system 10 includes a scanner 11a, a digital still camera 11b and a video camera 11c as image input devices for directly inputting image data which are connected to a computer body 12. The respective input devices can generate image data representing an image by a pixel in a dot matrix and output them to the computer body 12. The same image data can be displayed in 256 gradations in primaries of RGB, thereby representing approximately 16700000 colors.

A floppy disk drive 13a, a hard disk 13b and a CD-ROM drive 13c are connected as external auxiliary storage devices to the computer body 12. The hard disk 13b records a system-related main program, and can properly read a necessary program from the floppy disk, the CD-ROM and the like.

Moreover, a modem 14a is connected as a communicating device for connecting the computer body 12 to an external network or the like, and can be connected to an external network through a public communicating line to download and introduce a software and data. In this example, access can be given to the outside by the modem 14a through a telephone line. It is also possible to use a structure in which access is given to the network through a LAN adapter.

Referring to the floppy disk drive 13a and the CD-ROM drive 13c as the external auxiliary storage devices, recording media themselves can be exchanged. With the supply of image data recorded in the recording media, they can also act as image input devices. Moreover, in the case in which access is given to a network through the modem 14a and the LAN adapter, image data can also be supplied from this network. Also in this cases, they can act as the image input devices. The network is accessed to acquire a part of a program and another program which can be activated externally in addition to the case in which data are to be acquired. Consequently, it is also possible to acquire the modifying engine partially or wholly from the outside or to cause external devices to execute the processing.

Moreover, a keyboard 15a and a mouse 15b acting as a pointing device are also connected for the operation of the computer body 12, and furthermore, a speaker 18a and a microphone 18b are provided for multimedia correspondence.

Furthermore, a display 17a and a color printer 17b are provided as image output devices. The display 17a has a display area having 800 pixels in a horizontal direction and 600 pixels in a vertical direction and can display the above-mentioned 16700000 colors for each pixel. As a matter of course, this resolution is one of examples and can be properly changed to 640×480 pixels, 1024×768 pixels and the like.

Moreover, the color printer 17b acting as a printer is an ink jet printer, and can use a four-color ink of CMYK to attach a dot on a print paper as a recording medium, thereby printing an image. While high density printing having an image density of 360×360 dpi and 720×720 dpi can be carried out, two-gradation expression is used as to whether or not a color ink is attached. The color ink is not restricted to the four colors but can also have six colors having light cyan and light magenta, thereby reducing the loudness of the dot. Furthermore, an electrostatographic method utilizing a color toner or the like can also be employed in place of the ink jet method. Moreover, the printer does not need to be a color printer but may be a black and white printer. As will, be described below, an optimum image processing can also be carried out corresponding to black and white reproduction. If image data are subjected to such an image processing, a disadvantage is caused in the case in which color reproduction is to be carried out again. In the present invention, however, original image data are strictly left and such an image processing can easily be carried out.

In order to input an image by using such an image input device and to display or output the image to an image output device, a predetermined program is executed in the computer body 12. An operating system (OS) 12a is activated as a basic program. In the operating system 12a are incorporated a display driver (DSP DRV) 12b for causing the display 17a to perform display and a printer driver (PRT DRV) 12c for causing the color printer 17b to perform print and output. These drivers 12b and 12c depend on the types of the display 17a and the color printer 17b, and can be added and changed for the operating system 12a depending on the respective types. Moreover, it is also possible to implement more additional functions than a standard processing depending on the respective types. More specifically, it is possible to implement various additional processings within an allowable range while maintaining a processing system which is shared on a standard system such as the operating system 12a.

As a matter of course, the computer body 12 includes a CPU 12e, a RAM 12f, a ROM 12g, an I/O 12h and the like as a premise that such a program is executed. The CPU 12e for executing an arithmetic operation uses the RAM 12f as a temporary work area or a set storage region or as a program region to properly execute the basic program written to the ROM 12g, thereby controlling external and internal apparatuses and the like which are connected through the I/O 12h.

An application 12d is executed on the operating system 12a as the basic program. The application 12d has various processing contents, and monitors the operations of the keyboard 15a and the mouse 15b as the operating devices, properly controls various external apparatuses to execute a corresponding arithmetic operation during the operation, and furthermore, displays the result of the processing on the display 17a and outputs the same to the color printer 17b.

In such a computer system 10, a photograph or the like can be read by the scanner 11a as an image input device or the like to acquire image data, and furthermore, image data picked up the digital still camera 11b can be acquired and image data can be acquired as a dynamic image picked up by the video camera 11c. Moreover, various image data previously picked up are provided as a CD-ROM software very often, and the image data are previously saved in one storage region to which a plurality of people often give access through a network.

The image data picked up by the digital still camera 11b are often saved collectively in the hard disk 13b. Such image data are enjoyed on the display 17a, and furthermore, are output for enjoyment by the color printer 17b. As an advantage of the image data, a poor picture can easily be modified. More specifically, since original image data give a poor picture or the like for the printing by the color printer 17b, modification is carried out by photoretouch or the like. Thus, an image data processing apparatus for managing image data and modifying an image is required. Consequently, the application 12d and the computer system 10 are organically integrated to implement the image data processing apparatus.

In this sense, the application 12d which is an image data processing software stores and manages the image data picked up by the digital still camera 11b in the hard disk 13b, carries out management such that image data supplied from the CD-ROM through the CD-ROM drive 13c can be properly input, and manages a parameter as will be described below.

Accordingly, the data saving unit A1 is constituted by a software and a hardware which are related to each other in this sense.

For the image data thus stored, moreover, a processing object is specified by the application 12d and an image processing is carried out by an inner image processing routine together with the above-mentioned corresponding parameter. The image processing reproducing unit A3 is constituted by a software and a hardware which are related to each other in this sense.

The application 12d inputs the operations of the keyboard 15a and the mouse 15b through the operating system 12a and generates a predetermined corresponding screen to be displayed on the display 17a. In such a sense that the object image data are selected through the GUI processing to specify an image processing to be executed, the parameter setting unit A2 is constituted by a software and a hardware which are related to each other. Furthermore, the data acquiring unit A4 is constituted by a software and a hardware which are related to each other in such a meaning that a parameter is read to execute a prespecified image processing when reading the saved image data.

Such a software is stored in the hard disk 13b and is read and activated by the computer body 12. During introduction, the software is recorded and installed in a medium such as a CD-ROM 13c-1, a floppy disk 13a-1 or the like. Accordingly, these media record the image data processing programs.

Figure 3:
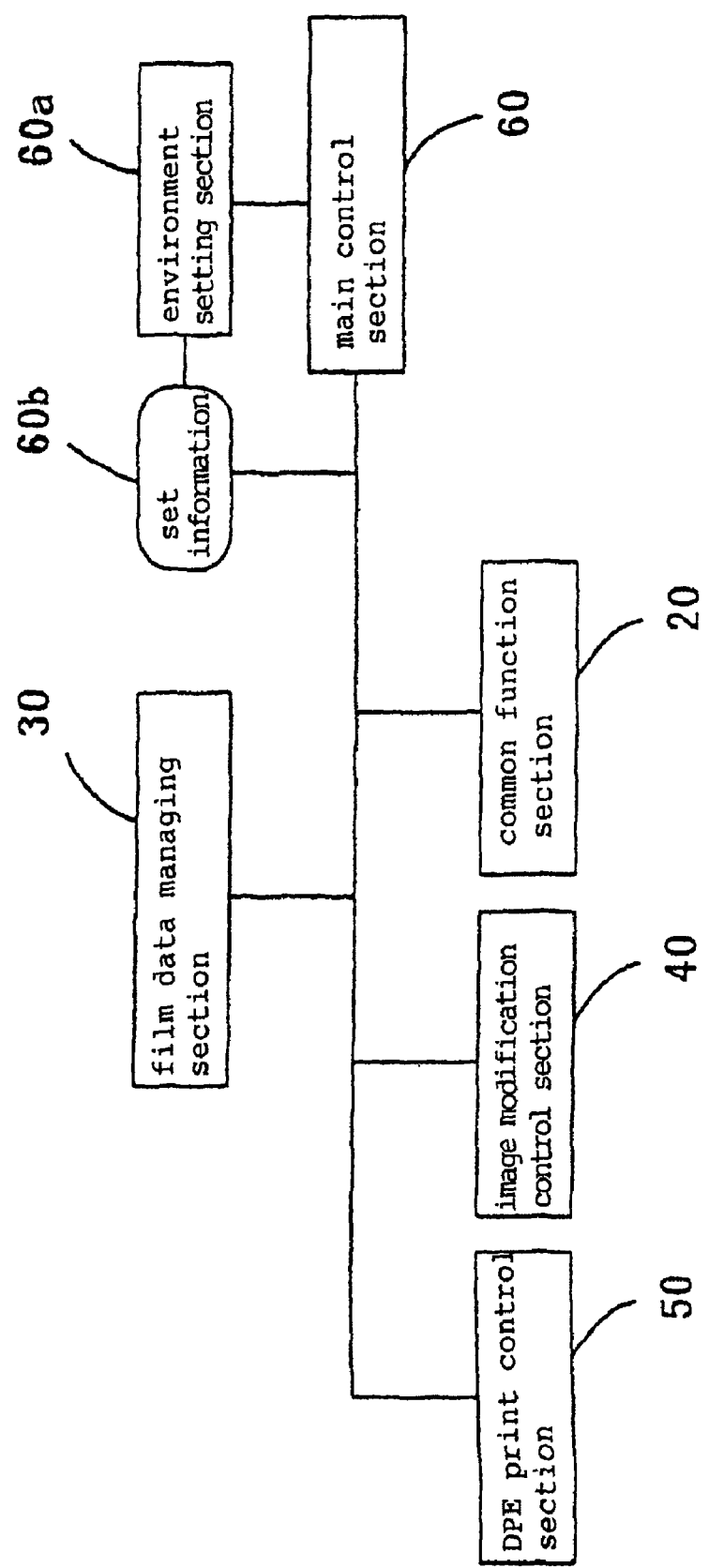
FIG. 3 is a functional block diagram showing the image data processing apparatus.

FIG. 3 is a block diagram showing the contents of control by the image data processing software, which are constituted by a main control section 60 for carrying out various general control operations, a common function section 20 for carrying out various common control operations, a film data managing section 30 for managing image data, an image modifying control section 40 for executing image modification for each image data and a DPE print control section 50 for executing a series of printing processings.

The main control section 60 properly selects and executes various flows which will be described below, and also executes various other functions which are not classified. One of them is an environment setting section 60a which can record, as a set information file 60b, common setting in the image data processing software and the like on the hard disk 13b and can properly perform reading from other function sections. For the set information file 60b, various default specifications, for example, the specification of the fetch source of new image data, a parameter for a page to be continued next time in a printing processing which will be described below and the like are recorded.

Figure 4:
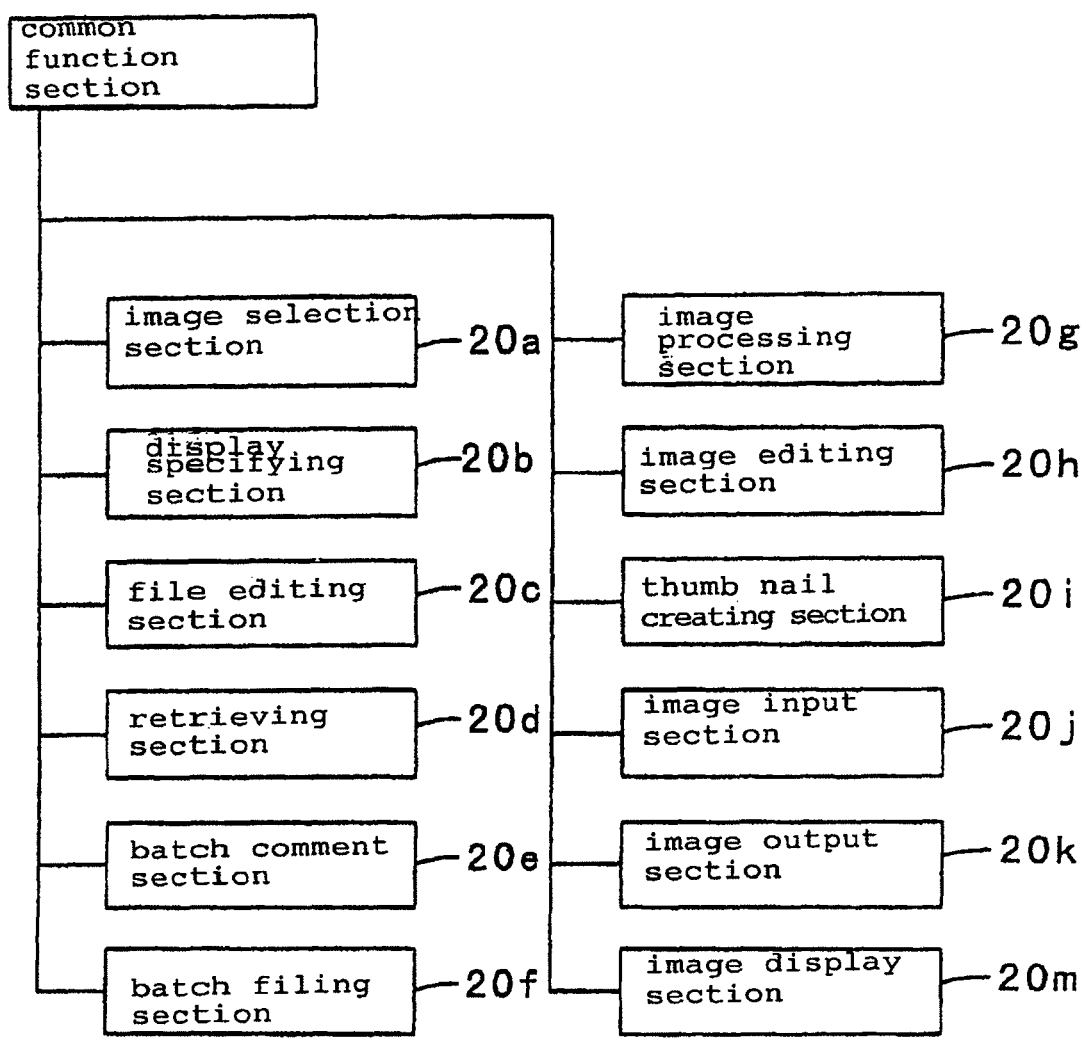
FIG. 4 is a block diagram showing a common function section.

The common function section 20 is shown in a detailed block of FIG. 4, some of which can be called from other function sections in common. For example, an image selecting section 20a causes the display 17a to display a plurality of thumb nail images in an image display section 20m while creating a thumb nail for each image data in a thumb nail creating section 20i, and accepts a selecting operation by the keyboard 15a and the mouse 15b in that state, thereby inputting the presence of the selection for each image. As a matter of course, in the case in which the display is to be changed by the selecting operation, the display is properly changed by the image display section 20m and the result of selection is transferred to other function sections. Moreover, a display specifying section 20b serves to specify the display on a screen and to properly specify the display of an image corresponding to the change of the size of a window region or the like depending on a GUI operation.

A file editing section 20c serves to execute an operation for properly changing a saving region of image data and the like, and a retrieving section 20d serves to execute retrieval according to a comment, a date and the like based on a parameter managed together with an image file. A batch comment section 20e serves to process a comment for a plurality of image data in batches, and a batch filing section 20f serves to process image data and parameters in batches at the same time.

The image modification control section 40 mainly generates various parameters for automatically executing an image processing, while an image processing section 20g and an image editing section 20h are portions which actually execute the image processing and also execute the specified image processings manually. The results of the processings are treated as dummy data in principle, and are reflected by original image data if a specification for changing the original image data is given during an actual processing. Moreover, the processings do not need to be always executed based on the original image data for convenience of a display and a time required for the processing but the image processing section 20g and the image editing section 20h execute various processings based on the image data of a thumb nail during the operation.

In the case in which the storage region of the image data has already been registered by the file editing section 20c, an image input section 20j carries out a processing of reading the same image data during an image processing and a print processing. Moreover, an image output section 20k carries out a processing of converting a format to be output corresponding to the presence of various data formats as image data.

Figure 5:
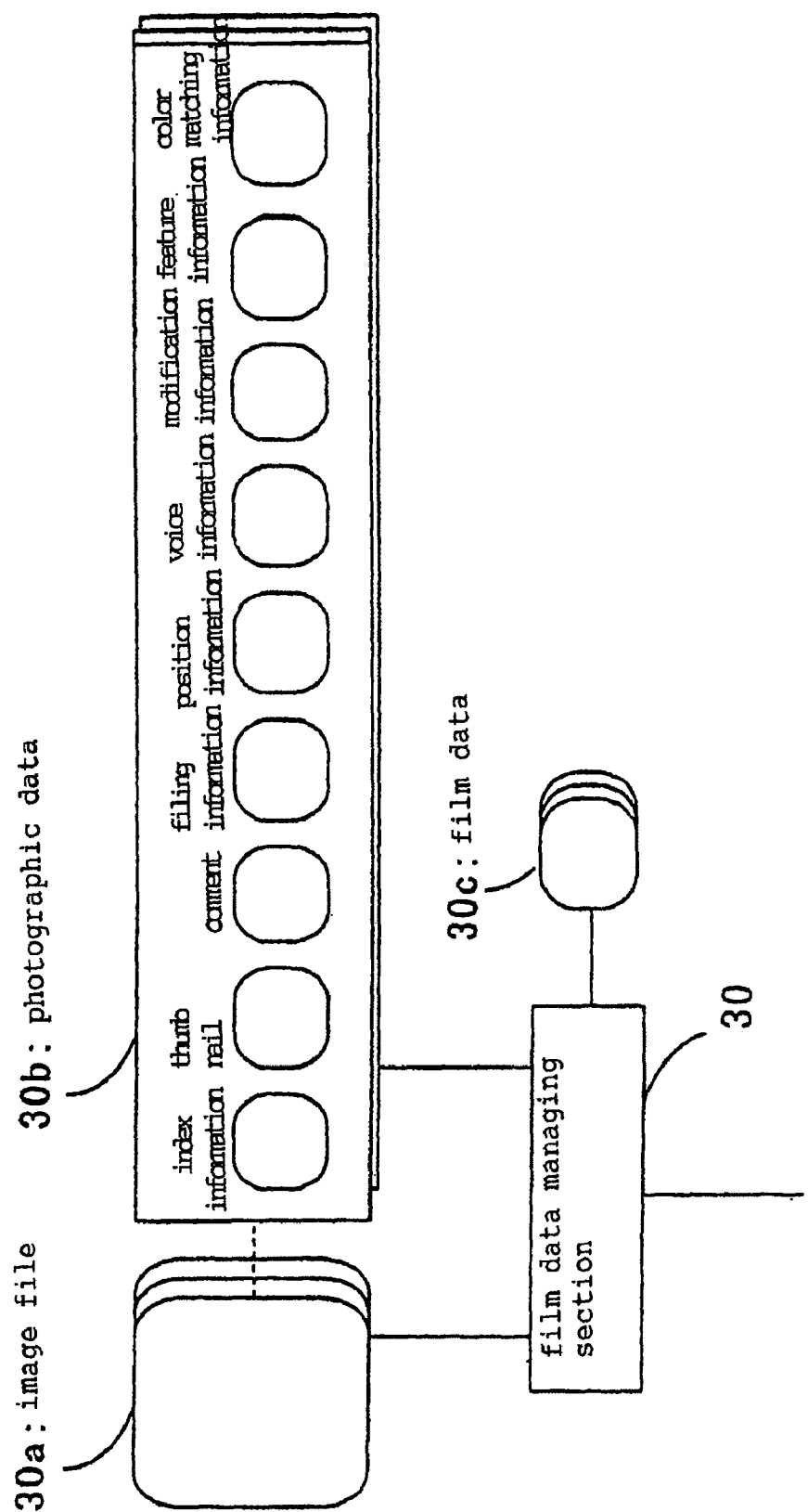
FIG. 5 is a functional block diagram showing a film data managing section.

Next, a film data managing section 30 will be described below. FIG. 5 is a block diagram showing the management structure of an image file 30 which is image data managed by the film data managing section 30, photographic data 30b including a parameter and film data 30c utilizing the grouping of the image data. Since the image data are treated as a file in the computer system 10, it is indicated as an image file and the parameter is indicated as the photographic data 30b together with various information corresponding to the respective image data. Moreover, the film data 30c is information for grouping and managing the image data and is shown as a film metaphor in FIG. 6. The database of the photographic data 30b is saved in the storage region which can be rewritten on the computer system 10, and furthermore, is saved in a constant region irrespective of a plurality of film metaphors. As a matter of course, it is possible to physically set a plurality of databases. In brief, it is not always necessary to form the database in a medium in which the image data are actually stored.

Figure 6:
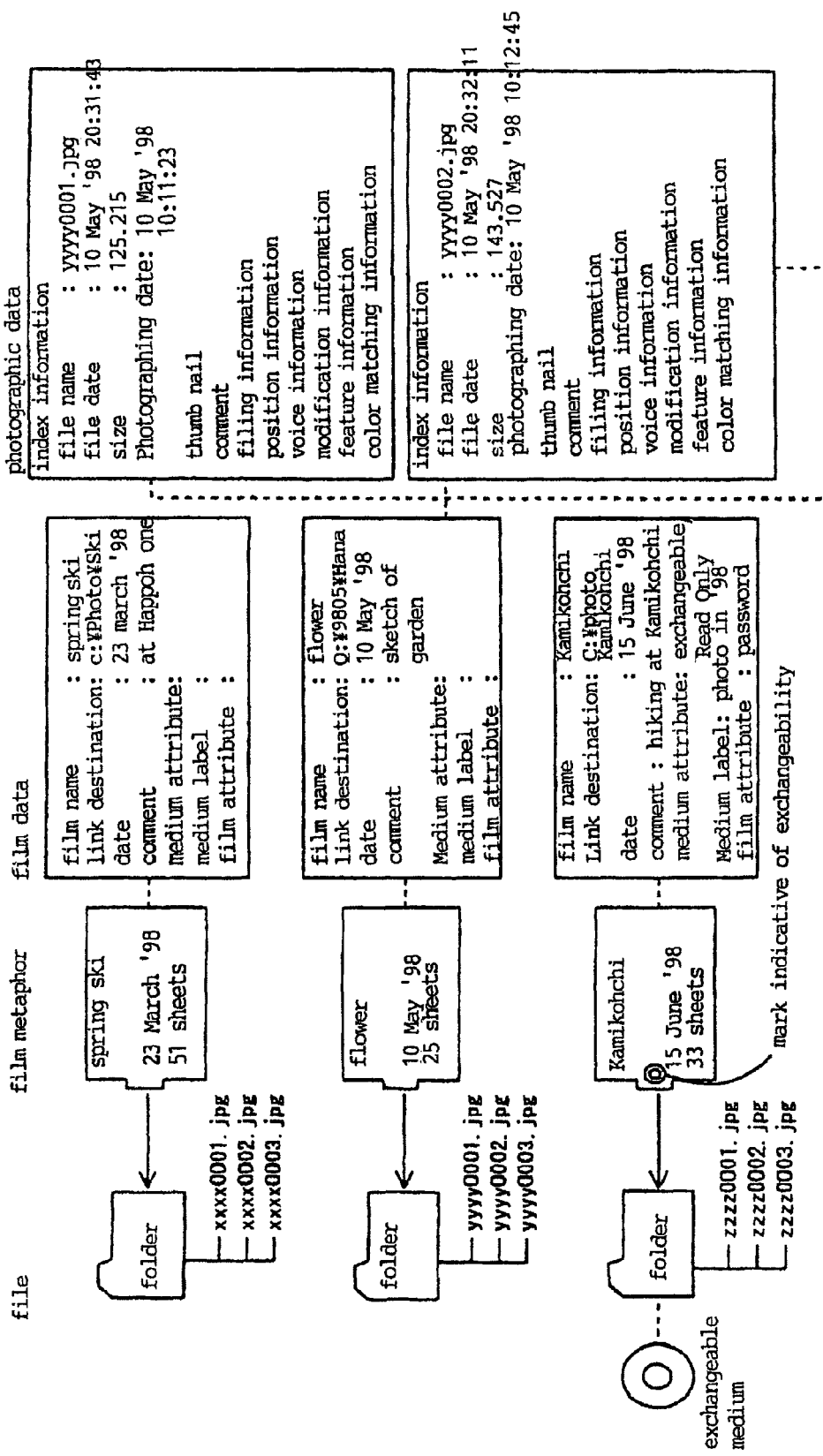
FIG. 6 is a schematic diagram showing a data structure to be managed by the film data managing section.

In FIG. 6, the physical recording configuration of an image file is shown on the left. A hierarchical structure is formed in a folder unit by the operating system 12a, and an image file is stored in each folder. The grouping of image data in the present embodiment physically utilizes the hierarchical structure in just a folder unit, and adds and manages information in the folder unit. More specifically, minimum information constituting the film data 30c includes a film name which can be optically given, a link destination indicative of an actual storage region as the physical arrangement information of the folder, the date for creation, a comment, a medium attribute, a medium label, a film attribute, the number of housed image files and the like. As shown, moreover, each folder is viewed as a patrone of a film in respect of the management. From another viewpoint, an actual storage region is viewed as a patrone individually unconsciously. Therefore, areas management is almost approximated. A mark indicating whether or not a physical storage region is an exchangeable medium is displayed on the patrone to give easy understanding to a user.

More specifically, in the case in which an image file is supplied by the CD-ROM, the storage region can be exchanged. In some cases, the CD-ROM is not attached to the actual CD-ROM drive 13c by the exchange. In such a case, even if the CD-ROM is not attached, non-display is not carried out. The display is carried out based on the registered film data 30c. In that case, an operator can easily understand that the CD-ROM should be set for reference because of the exchangeable mark.

In this example, only the exchangeable mark is indicated. Such a mark may be properly changed to display information. For example, the mark can be changed depending on the case in which the CD-ROM is attached or not attached in the exchangeable storage region. Moreover, in the case in which image data are saved in a storage region shared by a plurality of people on a network, a mark representing a network drive may be displayed because a confusion is caused by their rewriting operations. As a matter of course, the network drive can be set to be writable or unwritable. It is also possible to change the shape of the patrone itself without changing the mark.

The specific structure of the photographic data 30b is shown in FIGS. 5 and 6. Index information is constituted by a file name, a file date, a file size and a photographing date. Thumb nail data obtained by scaling down the image file are displayed as a thumb nail. The comment can be attached to each image file, and constitutes the photographic data 30b together with filing information indicative of a display order and the like, position information indicative of an actual storage region and voice information given through the microphone 18b or the like.

Furthermore, the photographic data 30b also includes modification information, feature information and color matching information. As described above, the image data processing software carries out the management of image data and the modification of an image. The original image data are not directly changed by the modification of the image but only a pointer for modification is managed as modification information by these parameters. Correspondingly, the feature information and the color matching information can be managed. FIG. 7 shows a specific example of a variable declaration for managing the modification information, which is constituted by a trimming start X coordinate (m_x1), a trimming start Y coordinate (m_y1), a trimming end X coordinate (m_x2) and a trimming end Y coordinate (m_y2) which are modification enhancements about the trimming, a rotating angle (m_nRotation) for the execution of a rotation processing, automatic image modification (m_nApf), an enhancement of a red component (m_nRed), an enhancement of a green component (m_nGreen), an enhancement of a blue component (m_Blue), an enhancement of a bright component (m_nBrightness) and an enhancement of a contrast (m_nContrast).

Figure 8:
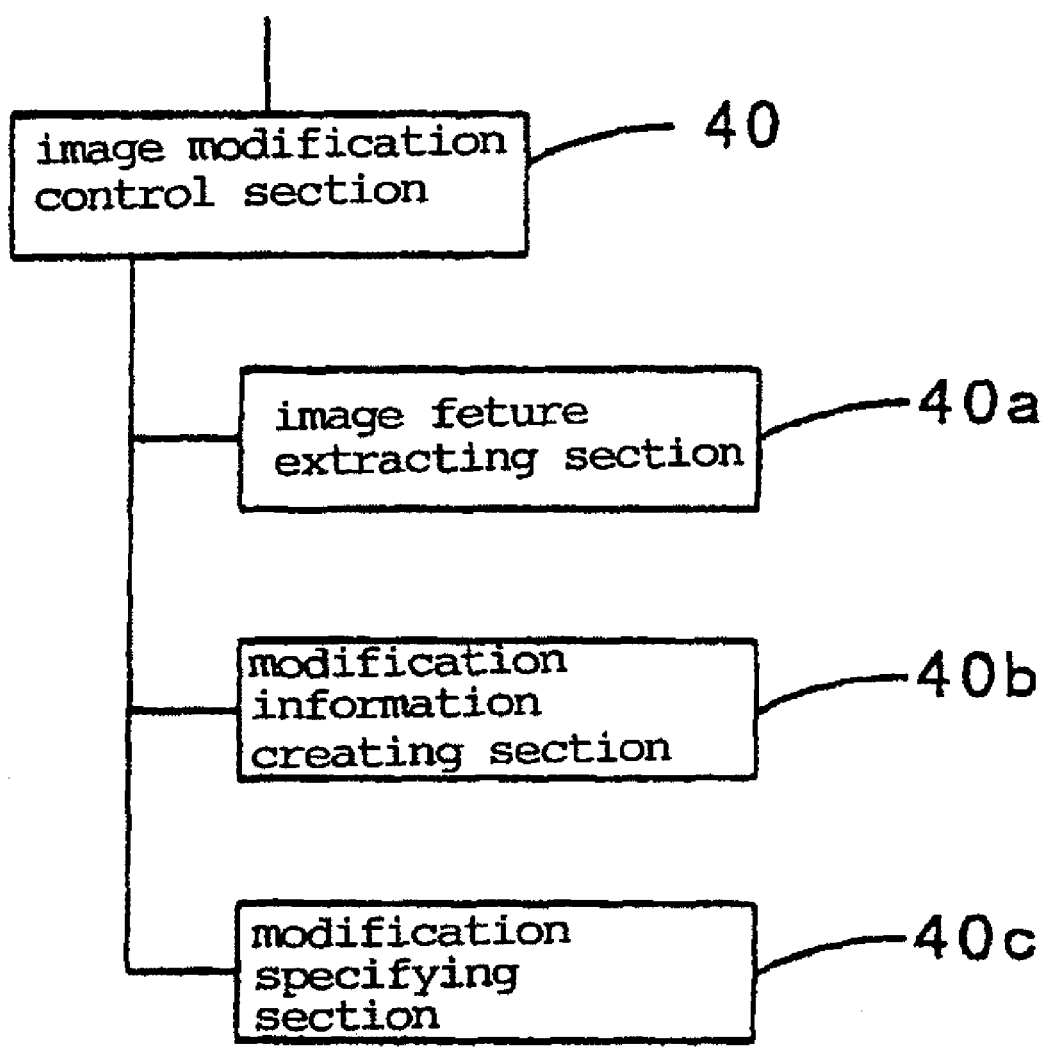
FIG. 8 is a functional block diagram showing an image modification control section.

An image processing which can be executed by the image data processing software, particularly, automatic image modification will be described below. The nucleus of the automatic image modification is an image modification control section 40 shown in FIG. 8. When an image feature extracting section 40a extracts the feature of an image based on the image data, a modification information creating section 40b creates a parameter required for modification and a modification specifying section 40c causes the image processing section 20g to execute an actual processing by using the same parameter.

Figure 9:
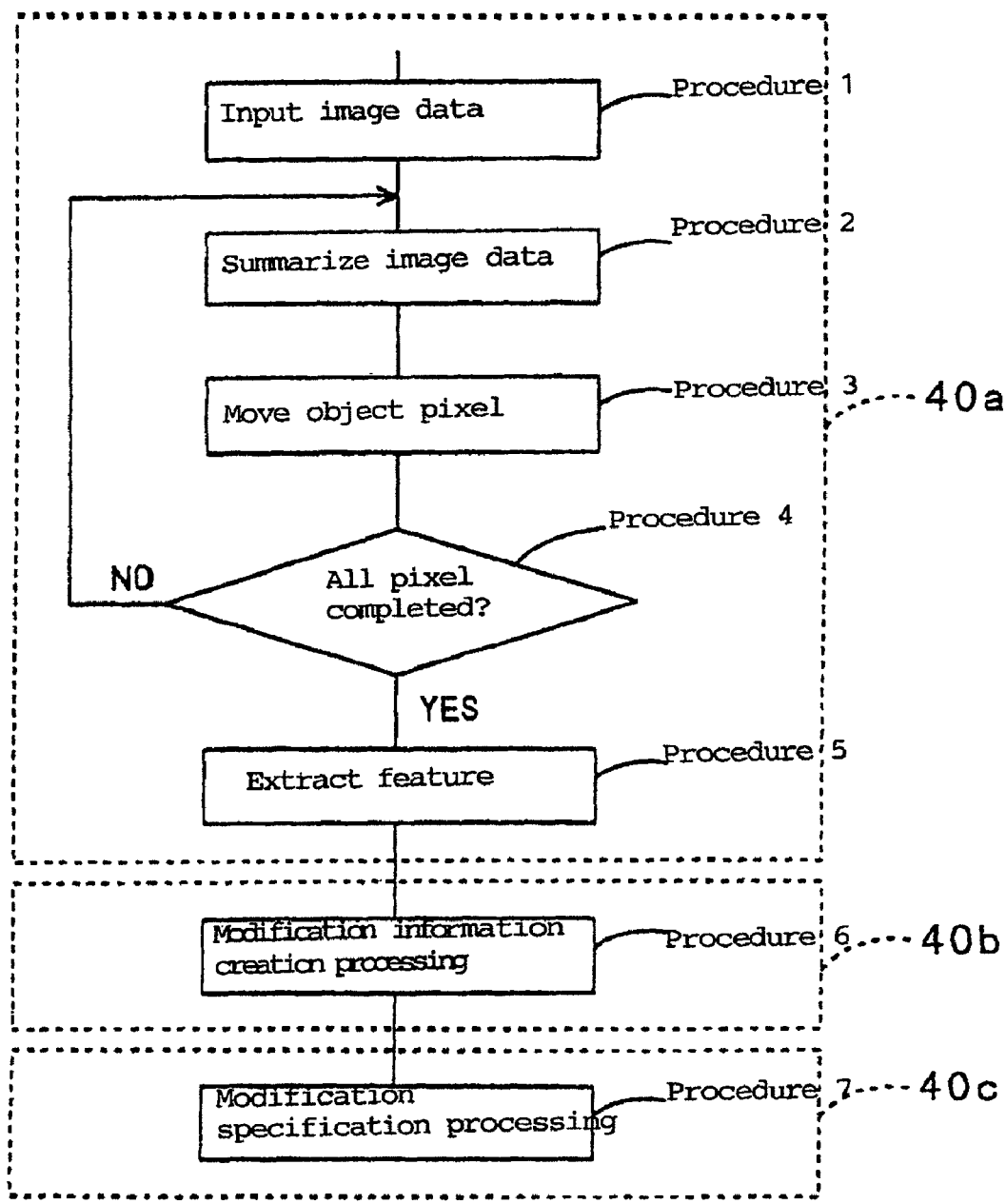
FIG. 9 is a chart showing the flow of a procedure for explaining the image modification control.

FIG. 9 typically shows a flow of the schematic procedure to be executed by the image modification control section 40. The automatic image modification processing will be described below with reference to the flow.

Figure 10:
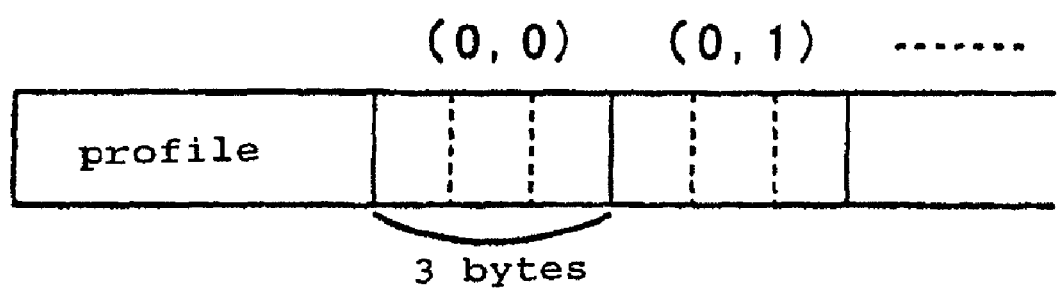
FIG. 10 is a diagram showing the structure of an image file.

In a procedure 1, image data are input. The image data are read through the operating system 12a and are saved in a predetermined work area. In the case in which thumb nail data have already been created, the thumb nail data are read from the photographic data 30b to be the image data. The feature extraction is a summarization processing for each pixel. Therefore, an operation time is changed depending on the amount of pixels. The thumb nail data are used to take an overwhelming difference in the amount of the pixels into consideration. A time required for the processing can be shortened as compared with the case in which the essential image data are used. The image data itself is one of files. As shown in FIG. 10, a head portion includes profile data such as an image size, the number of colors and the like, and a 3-byte area is then maintained for the number of pixels to express individual pixels in RGB 256 gradations.

Figure 11:
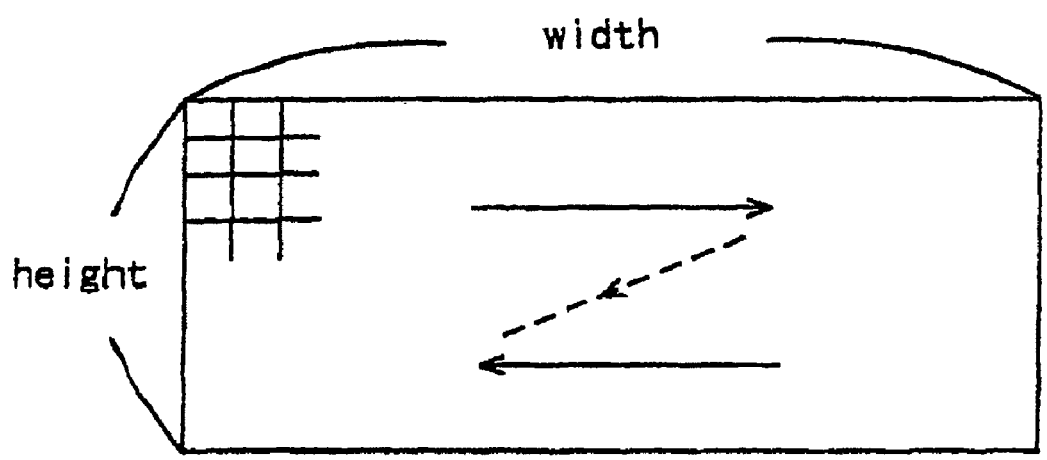
FIG. 11 is a diagram showing a state in which a pixel to be processed is moved.

When the image data are read into the work area, the summarization processing is carried out by processing the image data of an object pixel while moving the object pixel in procedures 2 to 4 as shown in FIG. 11. The summarization processing has various contents according to the feature amount of the image. In the present embodiment, the summarization processing is carried out to obtain five feature amounts of "contrast", "lightness", "Color balance", "color saturation" and "sharpness". Moreover, when the summarization processing is ended for all the pixels, the feature amount is calculated based on the result of summarization in a procedure 5. The summarization processing and the feature amount to be derived based thereon will be described below.

Figure 12:
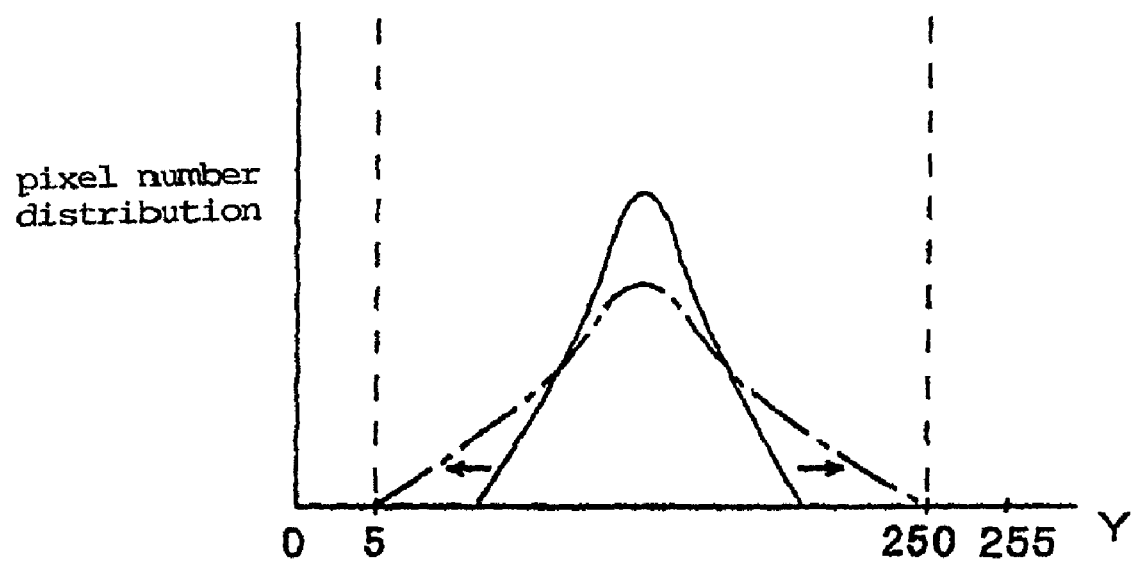
FIG. 12 is a chart showing a distribution range for the enlargement of a luminance distribution.
Figure 13:
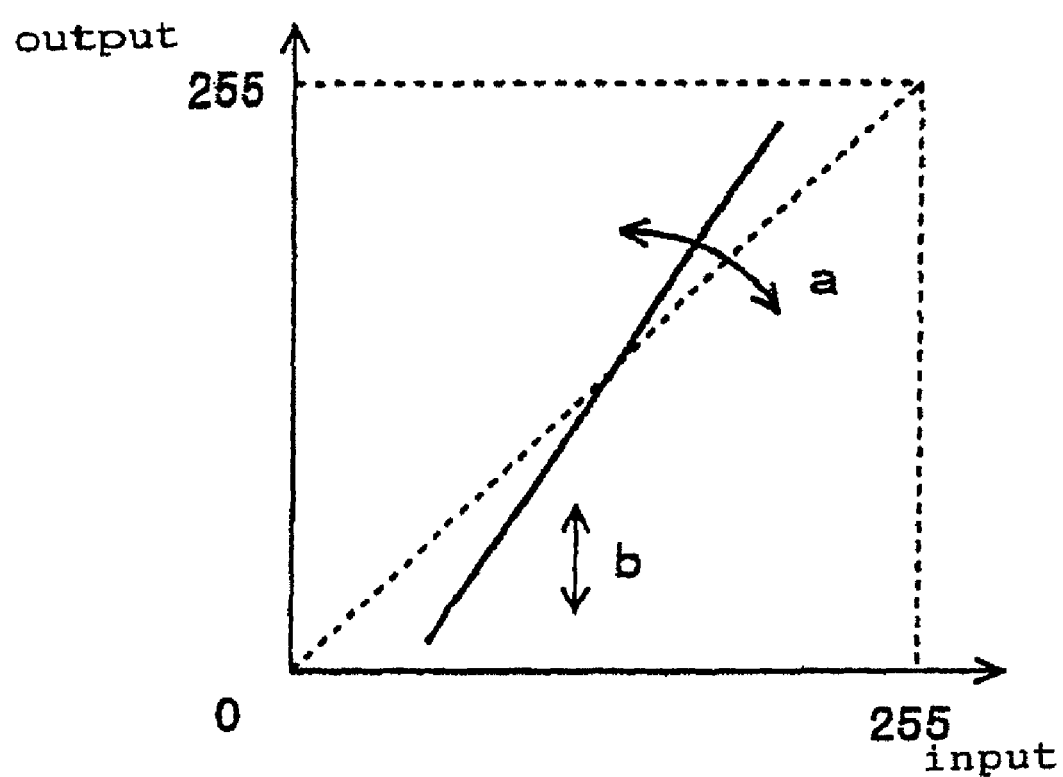
FIG. 13 is a chart showing a conversion relationship for the enlargement of the luminance distribution.

The contrast indicates the width of a luminance as the whole image. In the case in which the contrast is to be modified, a request for increasing the width of the contrast is mainly given, FIG. 12 shows, in a solid line, the distribution of a luminance in each pixel of certain image which is summarized as a histogram. In the case in which the distribution shown in a solid line is taken, a small difference is made between the luminance of a bright pixel and that of a dark pixel. If the distribution of the luminance is increased as shown in a one-dotted chain line, a great difference is made between the luminance of the bright luminance and that of the dark pixel. Consequently, the width of the contrast is increased. FIG. 13 shows a luminance conversion for enlarging a contrast. If the conversion is carried out with the following relationship between a luminance y of a conversion source and a luminance Y after the conversion, a difference in a pixel between a maximum luminance Ymax and a minimum luminance Ymin of the conversion source is increased after the conversion with a >1 so that the distribution of the luminance is increased as shown in FIG. 12.

$$Y=ay+b.$$

Accordingly, it is necessary to carry out a summarization processing by setting an interval between the maximum value of the luminance and the minimum value of the luminance as a contrast width in order to create such a histogram. In this case, the conversion of the luminance is carried out. If the image data include a luminance as an element, the summarization can directly be carried out. As described above, since the image data are expressed in RGB 256 gradations, it does not directly have a luminance value. In order to obtain the luminance, it is necessary to carry out color conversion in a Luv color specification space. However, this is not the best way in respect of an arithmetic amount and the like. Therefore, the following conversion expression for directly calculating luminance from RGB which has been utilized for a television or the like is used.

$$y=0.30R+0.59G+0.11B$$

More specifically, 3 bytes to be the image data for each pixel are read while moving an object pixel, and a luminance y is calculated based on the expression. In this case, it is assumed that the luminance y is also expressed in 256 gradations and 1 is added to the luminance y thus calculated. The luminance is preferably utilized for the conversion into black and white which can be implemented by making the gradation value of the obtained luminance with each component value of the RGB. For a single color such as a sepia tone, it is preferable that each component value of the RGB should be calculated according to a component ratio of the RGB after the gradation value of the luminance is obtained.

Figure 14:
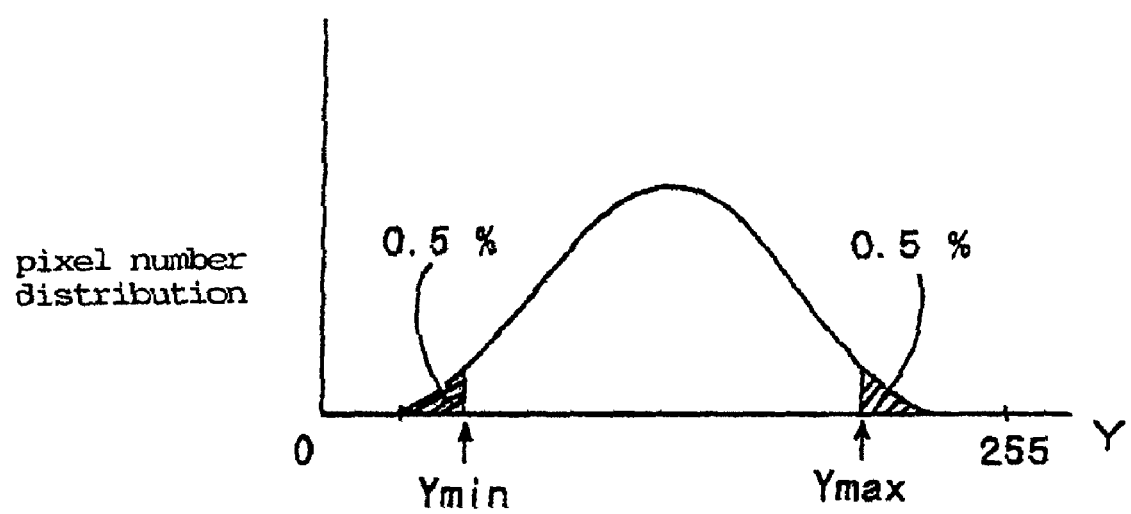
FIG. 14 is a chart showing an end processing for the luminance distribution and an end obtained by the end processing.

In the image data summarization processing of the procedure 2, the histogram of the luminance distribution is thus obtained. Based on the histogram, both ends of the luminance distribution are obtained in the feature amount extracting processing of the procedure 5. The luminance distribution of a photographic image is expressed almost in a conical shape as shown in FIG. 14. As a matter course, various positions and shapes are obtained. The width of the luminance distribution is determined depending on the positions of the both ends. It is impossible to set the both ends to a point where a bottom is simply extended to obtain a distribution number of "0". In the bottom portion, the distribution number is displaced in the vicinity of "0" in some cases. Statistically, the distribution number transits while approaching "0" as much as possible.

For this reason, a portion close to the inside by a certain distribution ratio from the maximum and minimum luminance sides within the distribution range is set to the both ends of the distribution. In the present embodiment, the distribution ratio is set to 0.5% as shown. As a matter of course, the distribution ratio can be varied properly. By thus cutting upper and lower ends by a certain distribution ratio, it is also possible to ignore white and black points caused by noises and the like. More specifically, if such a processing is not carried out, only one white or black point becomes the both ends of the luminance distribution. With a luminance value having 255 gradations therefore, a lowermost end has a gradation of "0" and an uppermost end has a gradation of "255" in many cases. By setting, to the end, a portion close to the inside by a pixel number of 0.5% from the upper end portion, the above-mentioned state is eliminated. Based on the actually obtained histogram, 0.5% for a pixel number is calculated and respective distribution numbers are accumulated from the luminance values on the upper and lower ends in a reproducible luminance distribution toward the inside in order. Consequently, a luminance value of 0.5% is set to a maximum luminance Ymax and a minimum luminance Ymin.

A width Ydif of the luminance distribution is a difference between the maximum luminance Ymax and the minimum luminance Ymin.

$$Ydif=Ymax-Ymin$$

As an image processing for enlarging a contrast, it is preferable that a gradient a and an offset b should be determined depending on the distribution of a luminance. For example, if $$a=255/(Ymax-Ymin)$$

$$b=-a \cdot Ymin \text{ or } 255-a \cdot Ymax,$$

the luminance distribution having a small width can be enlarged to a reproducible range. In the case in which the reproducible range is utilized to the maximum to enlarge the luminance distribution, a highlight portion comes off to be white or a high shadow portion is blacked out. In order to prevent such a situation, it is preferable that a luminance value of approximately "5" should be left as a range which is not enlarged to the upper and lower ends of the reproducible range. As a result, a parameter of the conversion expression is represented as follows.

$$a=245/(Ymax-Ymin)$$

$$b=5-a \cdot Ymin \text{ or } 250-a \cdot Ymax$$

In this case, it is preferable that the conversion should not be carried out with Y<Ymin and Y>Ymax.

Figure 15:
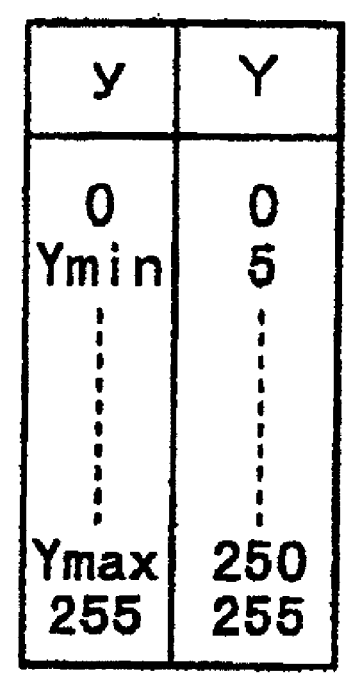

For such a conversion, calculation is not required each time. If the range of the luminance has a value of "0" to "255", the result of the conversion is predetermined for each luminance value to form a conversion table as shown in FIG. 15. In this case, the luminance conversion is carried out as a matter of course. It may be necessary to separately take the application of image data having the RGB 256 gradations into consideration. However, it is possible to actually apply the same conversion relationship as the luminance between image data (R0, G0, B0) which have not been converted and the image data (R1, G1, B1) which have been converted.

$$R1=aR0+b$$

$$G1=aG0+b$$

$$B1=aB0+b$$

The above-mentioned relationship can be obtained. As a result, it is apparent that the conversion table shown in FIG. 15 may be utilized to carry out the conversion.

More specifically, a work for calculating the maximum luminance Ymax and the minimum luminance Ymin is equivalent to the work for extracting the feature in the procedure 5, and the processing of calculating the parameters a and b of the conversion expression to create the conversion table while calculating the width Ydif of the luminance distribution is equivalent to a modification information creation processing in a procedure 6. In a modification specification processing in a procedure 7, such a conversion table is specified to generate the image data (R1, G1, B1) which have been converted from the image data (R0, G0, B0) which have not been converted.

Next, a lightness will be described. The lightness as the feature amount of an image implies an index of a contrast of the whole image, for which a median Ymed in the distribution obtained from the histogram is used. In this case, accordingly, the summarization processing is carried out simultaneously with the summarization processing for a contrast in the procedure 2.

On the other hand, a difference (Ymed_target_Ymed) from an ideal value Ymed_target of the lightness may be calculated when the feature amount is to be analyzed in the procedure 5. While "106" is used as the actual value of the ideal value Ymed_target, it is not fixed. Moreover, the value can also be varied depending on tastes.

In the case in which the feature amount is to be utilized to modify the lightness, the following operation is carried out. Whether or not an image is bright can be evaluated depending on whether or not the median Ymed is greater than the ideal value Ymed_target. For example, if the median Ymed is "85", it is smaller than the ideal value Ymed_target of "106". Therefore, an evaluation of "dark" is primarily obtained and the degree of darkness is expressed in a numerical value of "106–85" secondarily.

Figure 16:
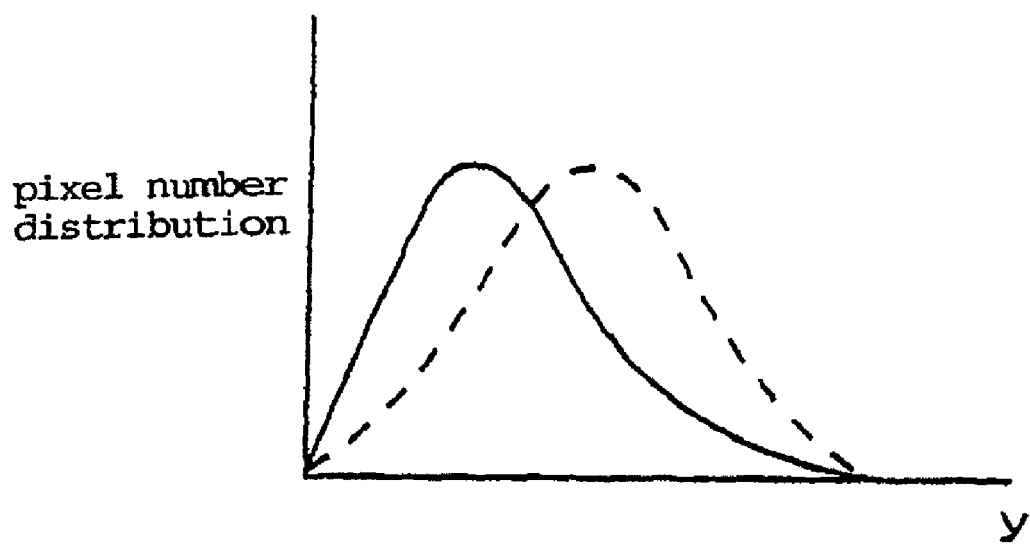
FIG. 16 is a chart showing a concept for making bright by γ correction.
Figure 17:
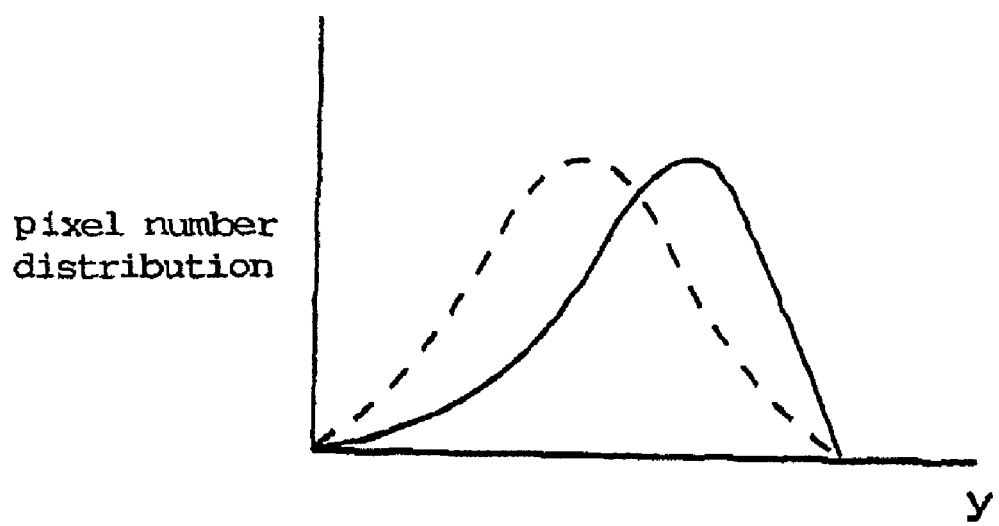
FIG. 17 is a chart showing a concept for making dark by the γ correction.
Figure 18:
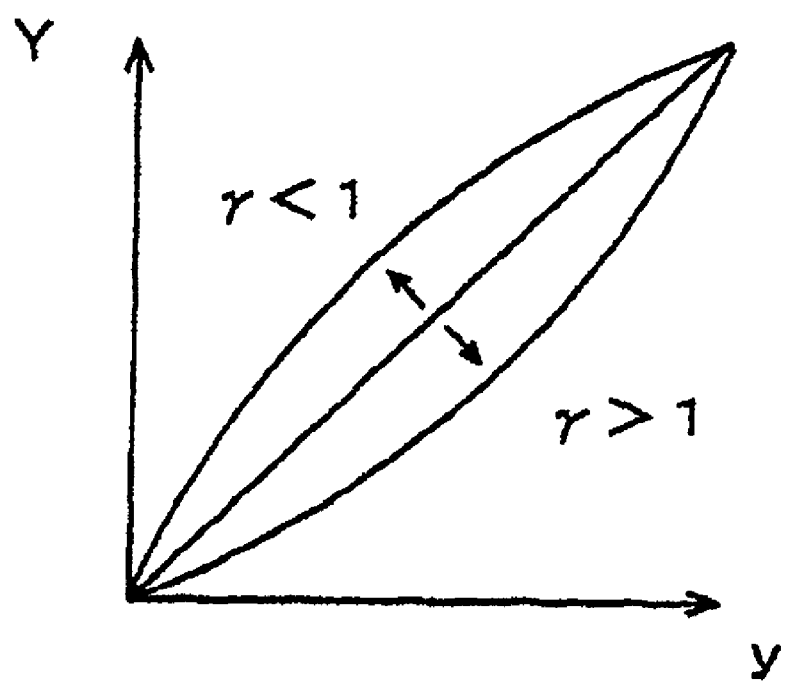
FIG. 18 is a chart showing the correspondence relationship of a luminance altered by the γ correction.

FIG. 16 shows a histogram for a luminance. In the case in which the mountain of the luminance distribution is wholly close to the dark side as shown in a solid line, it is preferable that the mountain should be wholly moved to the bright side as shown in a wavy line. To the contrary, in the case in which the mountain of the luminance distribution is wholly close to the bright side as shown in a solid line of FIG. 17, it is preferable that the mountain should be wholly moved to the dark side as shown in a wavy line. In such a case, the rectilinear luminance conversion shown in FIG. 13 is not carried out but a luminance conversion utilizing a so-called γ curve shown in FIG. 18 is preferably carried out.

In a correction using the γ curve, a brightness is wholly increased with γ<1 and is wholly reduced with γ>1. In the above-mentioned example, the median Ymed is coincident with the ideal value Ymed_target if it is increased by "21". However, it is not easy to exactly increase the median Ymed by "21" utilizing the γ curve. For this reason, it is preferable that a corresponding value of γ should be set to an evaluation value (Ymed_target_Ymed) every "5" as shown in FIG. 19. While the value of γ is varied by "0.05" corresponding to a fluctuation amount "5" of the evaluation value in this example, it is apparent that their correspondence relationship can be changed properly.

Moreover, it is also possible to automatically set the value of γ in the same manner as in the case in which the contrast modification is carried out. For example, $$\gamma = Ymed/106 \text{ or}$$

$$\gamma = (Ymed/106)^{**}(1/2)$$

may be set to calculate the value of γ. As a matter of course, it is preferable that the conversion table shown in FIG. 15 should be formed for the luminance conversion to be carried out by utilizing the γ curve.

More specifically, the work for calculating the median Ymed is equivalent to the work for extracting the feature in the procedure 5, and the work for calculating a γ correction value to create the conversion table is equivalent to the modification information creation processing in the procedure 6. In the modification specification processing of the procedure 7, such a conversion table is specified to generate the image data (R1, G1, B1) which have been converted from the image data (R0, G0, B0) of each pixel which have not been converted.

Next, a color balance will be described. The color balance indicates whether or not R, G and B components constituting the image data have constant imbalance tendency. For example, in the case in which a photograph looks red, there is no problem if an actual situation during photographing is represented. If not so, it is apparent that some bad influence is presented. Since a comparison with the actual situation should be really carried out to confirm such an imbalance, it is also supposed that postevaluation itself cannot be obtained.

In the present embodiment, it is assumed that an evaluation is carried out based on the uniformity of a frequency distribution for each color. Depending on the situation during photographing, it can be natural that the frequency distribution for each color component is ununiform. In such a case, color modification should not be carried out. However, following the result reversely, it can be decided that the frequency distribution should be uniform in a situation in which the frequency distribution of each color component is similar to some extent and the frequency distribution should not be uniform if it is not similar.

Figure 20:
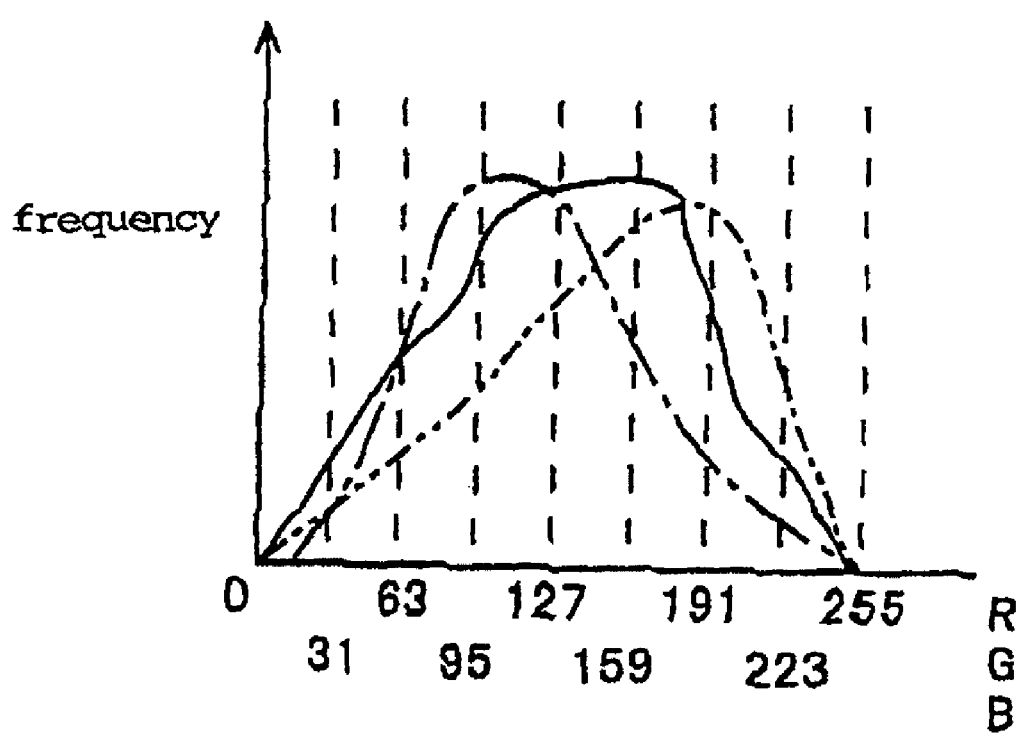
FIG. 20 is a chart showing a method for extracting an element to be a feature vector for each color component.

For this reason, a histogram for each color component is created in order to check a degree of similarity of the frequency distribution for each color component later in the image data summarization processing in the procedure 2. At this time, the frequency distribution is not obtained for all gradation values but a 256 gradation region is divided into 8 to 16 portions (n portions) to summarize a frequency belonging to each region. If the region is divided into 8 portions, the frequency distribution is obtained for eight regions of "0 to 31", "32 to 63" ... "224 to 255" as shown in FIG. 20.

On the other hand, if the above-mentioned histogram is created for each color component to be intended for all pixels, vectorization is carried out by using, as components, the pixel numbers (r1, r2 ... rn), (g1, g2 ... gn) and (b1, b2 ... bn) (n=8) belonging to each region for each color in the analysis of the feature amount in the procedure 5. For each of the RGB, feature vectors VR, VG and VB are expressed as follows.

$$VR = (r1, r2 \ldots rn) \Sigma ri = 1$$

$$VG = (g1, g2 \ldots gn) \Sigma gi = 1$$

$$VB = (b1, b2 \ldots bn) \Sigma bi = 1$$

The cross-correlation of these feature vectors is obtained. The cross-correlation is expressed as an inner product.

$$\text{corr}\_rg = (VR \cdot VG)/|VR| \cdot |VG|$$

$$\text{corr}\_gb = (VG \cdot VB)/|VG| \cdot |VB|$$

$$\text{corr}\_br = (VB \cdot VR)/|VB| \cdot |VR|$$

The inner product itself of vectors represents a degree of similarity of both vectors and has a value of "0" to "1". Herein, a color balance is evaluated based on a minimum value of corr_x.

The color balance may be modified for each of the n regions thus divided. Schematically, an image can be wholly made bright or dark for each color component. Therefore, the RGB value can be modified by utilizing the γ value.

More specifically, the work for calculating the minimum value corr_x is equivalent to the work far extracting the feature in the procedure 5, and the processing of calculating a γ correction value for modifying a balance to create a conversion table is equivalent to the modification information creation processing in the procedure 6. In the modification specification processing in the procedure 7, such a conversion table is specified to generate the image data (R1, G1, B1) which have been converted from the image data (R0, G0, B0) for each pixel which have not been converted.

Next, a color saturation will be described. The color saturation indicates the color brightness of the whole image. For example, it is evaluated that the picture having primary colors are bright or gray. Although the color saturation itself is represented by a size from a reference axis in a uv plane on the Luv color specification space, the operation amount for converting the color specification space is large as described above. Therefore, the color saturation of a pixel is simplified for calculation. Consequently, the color saturation is calculated as an alternate value X in the following manner.

$$X = |G + B - 2 \times R|$$

Originally, the color saturation has a value of "0" with R=G=B, and has a maximum value with a single color of RGB or a mixture of two of them at a predetermined ratio. Because of this property, the color saturation can directly be represented properly. However, the color saturation as a maximum value with a single color of red or a mixed color of green and blue, that is, yellow by the above-mentioned simplified equation, and has a value of "0" if each component is uniform. Moreover, the color saturation reaches approximately half of the maximum value for single colors of green and blue. As a matter of course, the above-mentioned equation can be replaced by the following equations.

$$X'=|R+B-2\times G|$$

$$X''=|G+R-2\times B|$$

Figure 21:
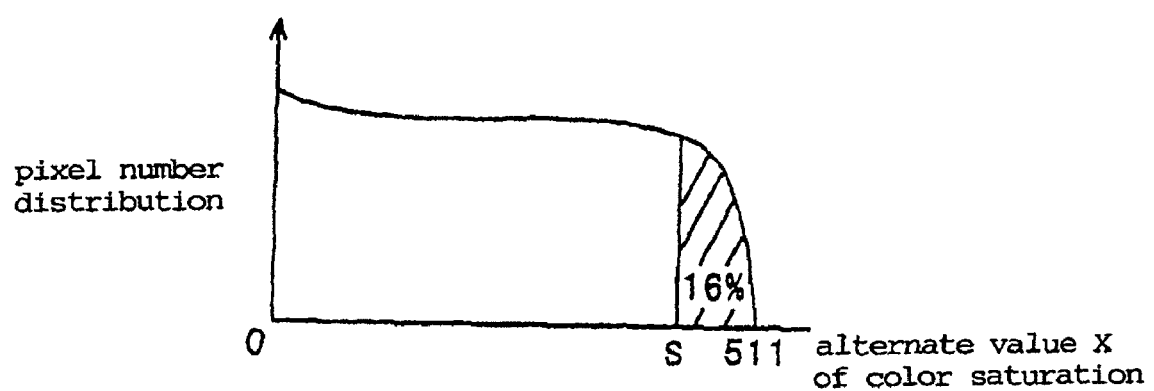
FIG. 21 is a schematic chart showing the summarization state of a color saturation distribution.

In the image data summarization processing in the procedure 2, the distribution of a histogram, for the alternate value X of the color saturation is calculated. In the case in which the distribution of the histogram for the alternate value X of the color saturation is to be calculated, a distribution is schematically obtained as shown in FIG. 21 because the color saturation is distributed within a range of a minimum value of "0" to a maximum value of "511".

On the other hand, the feature amount is to be analyzed based on the histogram in the procedure 5. Based on the summarized histogram, a color saturation exponent for the image is determined. An upper "16%" of a range is obtained from the distribution of the alternate value X of the color saturation, and a minimum color saturation "S" within this range represents the color saturation of the image.

If the color saturation "S" is low, a color saturation enhancement is desired. In the case in which automatic modification is to be carried out, the following operation is executed.

When each component has a component value of hue components having an almost equal relationship as in the RGB color specification space, a gray color having no color saturation is obtained with R=G=B. If it is supposed that the component of RGB having a minimum value simply deteriorates a color saturation without an influence on the hue of each pixel, it is apparent that the minimum value of each component is subtracted from all the component values and a difference value can be increased to enhance the color saturation. If the component value of blue (B) in each component (R, G, B) of the image data has a minimum value, a color saturation enhancement parameter Sratio can be used for the following conversion.

$$R'=B+(R-B)\times Sratio$$

$$G'=B+(G-B)\times Sratio$$

$$B'=B$$

In this example, the component of the minimum value is simply subtracted from other component values for the component having no color saturation. Other methods can also be employed for subtracting the component having no color saturation. In particular, in the case in which the conversion is to be carried out, an enhancement in the color saturation gives an increase in a luminance so that a brightness tends to be wholly increased. Accordingly, the conversion is carried out for a difference value obtained by subtracting an equivalent value of the luminance from each component value.

If the color saturation enhancement is as follows, adjustable values $\Delta R$, $\Delta G$ and $\Delta B$ are calculated based on a difference value from the luminance to the following equations.

$$R'=R+\Delta R$$

$$G'=G+\Delta G$$

$$B'=B+\Delta B$$

$$\Delta R=(R-Y)\times Sratio$$

$$\Delta G=(G-Y)\times Sratio$$

$$\Delta B=(B-Y)\times Sratio$$

As a result, the conversion can be obtained as follows.

$$R'=R+(R-Y)\times Sratio$$

$$G'=G+(G-Y)\times Sratio$$

$$B'=B+(B-Y)\times Sratio$$

The luminance is clearly saved by the following equations.

$$Y'=Y+\Delta Y$$

$$\Delta Y=0.30\Delta R+0.59\Delta G+0.11\Delta B$$

$$=Sratio\{(0.30R+0.59G+0.11B)-Y\}$$

$$=0$$

More specifically, the luminance is saved after and before the conversion, and a brightness cannot be wholly obtained even if the color saturation is enhanced. Moreover, when an input is gray (R=G=B), a luminance Y=R=G=B obtained. Therefore, the adjustable value $\Delta R=\Delta G=\Delta B=0$ is obtained. Consequently, a color is not attached to an achromatic color.

It is preferable that the color saturation enhancement parameter Sratio should be increased if an evaluation value Psatu is decreased. Based on the relationship with the above-mentioned lowest color saturation "s", a color saturation enhancement exponent S' is determined as follows.
If S<92, $$S'=-S\times(10/92)+50$$

If $92\leqq S<184$, $$S'=-S\times(10/46)+60$$

If $184\leqq S<230$, $$S'=-S\times(10/23)+100$$

If $230\leqq S$, $$S=0$$

A conversion from the color saturation exponent S' into the color saturation enhancement exponent Sratio is preferably calculated as follows.

$$Sratio=(S+100)/190$$

Figure 22:
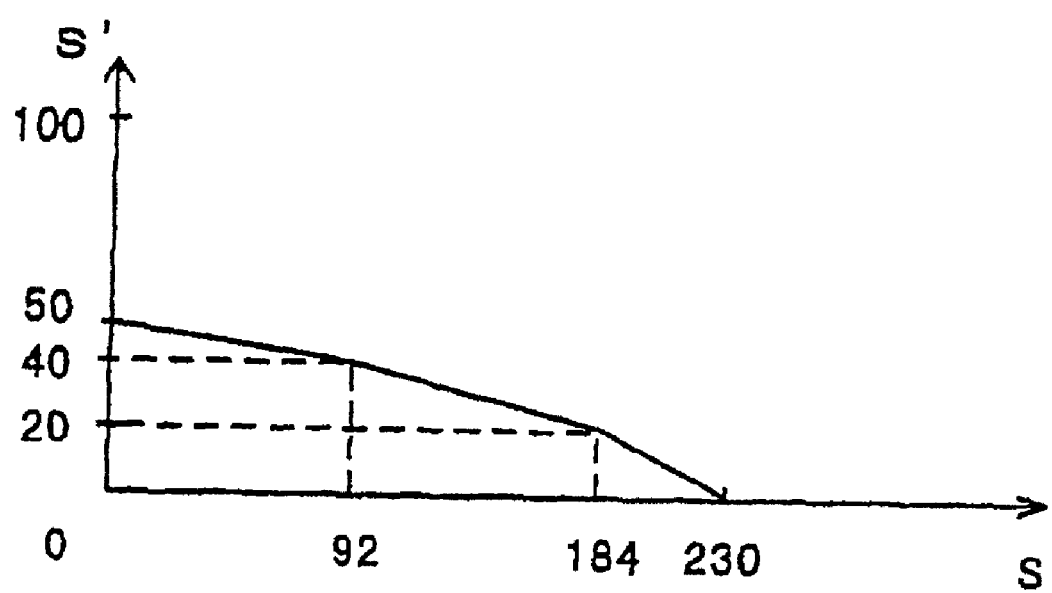
FIG. 22 is a chart showing the relationship between a color saturation and a color saturation enhancement exponent.

In this case, when the color saturation enhancement exponent S=0 is set, the color saturation enhancement parameter Sratio=1 is set, resulting in no color saturation enhancement. FIG. 22 shows the relationship between the color saturation "S" and the color saturation enhancement exponent S'.

More specifically, the work for calculating the color saturation "S" is equivalent to the work for extracting the feature in the procedure 5, and the processing of calculating the color saturation enhancement exponent Sratio through the color saturation exponent S' is equivalent to the modification information creation processing in the procedure 6. In the modification specification processing in the procedure 7, such a color saturation enhancement exponent Sratio is used to generate the image data (R1, G1, B1) which have been converted while calculating a luminance from the image data (R0, G0, B0) for each pixel which have not been converted.

Figure 23:
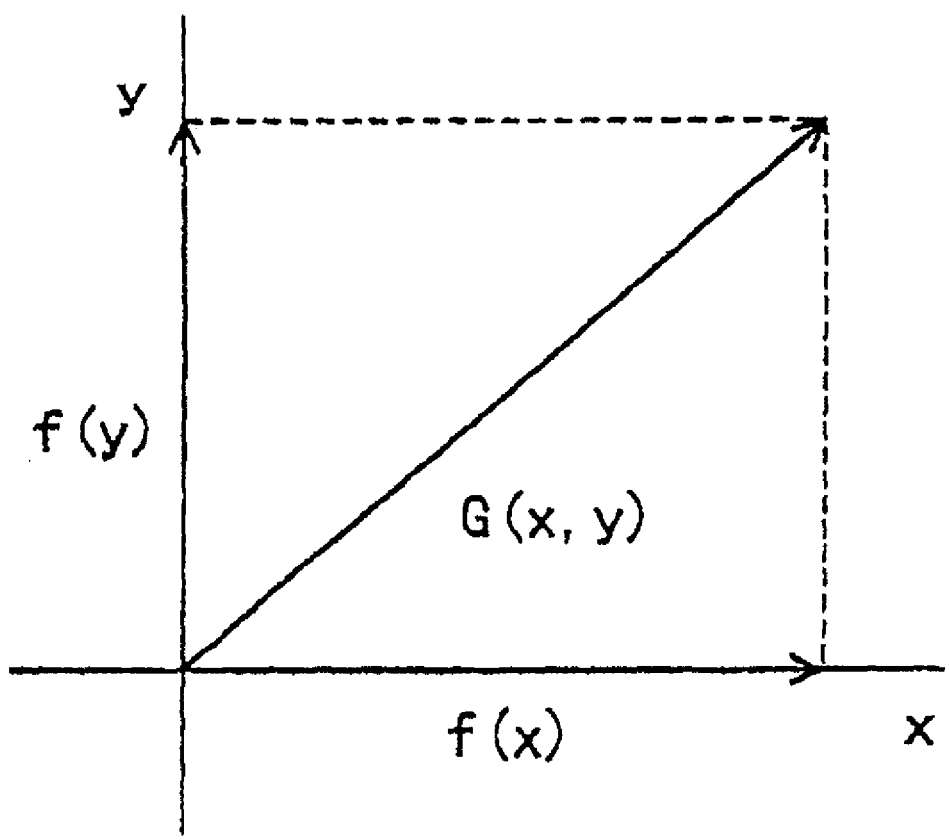
FIG. 23 is a chart illustrating the case in which a degree of change of an image is represented by each component value of orthogonal coordinates.
Figure 24:
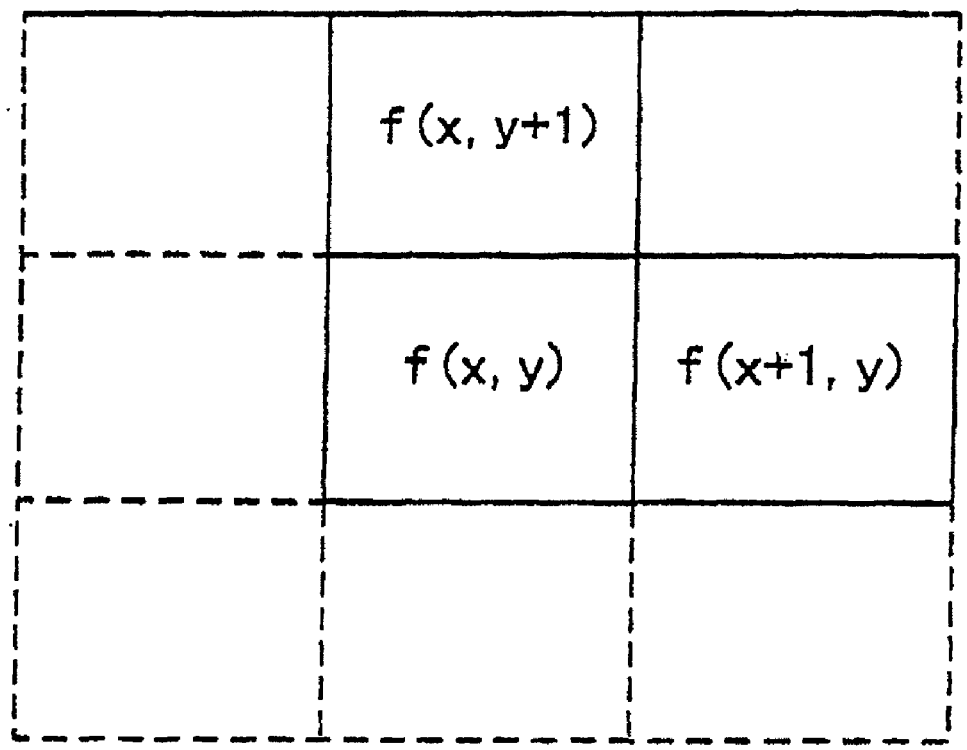
FIG. 24 is a diagram illustrating the case in which the degree of change of an image is obtained with a difference value in adjacent pixels in the directions of an axis of ordinate and an axis of abscissa.

Finally, a sharpness will be described below. The sharpness as the feature amount of an image is evaluated based on an edge degree which will be described below. If image data are constituted by pixels in a dot matrix, a difference in the image data between the adjacent pixels is increased in the edge portion of the image. The difference has a luminance gradient which will be hereinafter referred to as an edge degree. In the case in which an XY orthogonal coordinate shown in FIG. 23 is taken into consideration, a vector representing a degree of change of the image can be operated by calculating components in the directions of X and Y axes. In a digital image having pixels in a dot matrix, the pixels are adjacent to each other in the direction of an axis of ordinate and an axis of abscissa as shown in FIG. 24, and a brightness is represented as f (x, y). In this case, f (x, y) may be Y (x, y) which is a luminance or R (x, y), G (x, y) and B (x, y) which are the luminance of RGB. In FIG. 24, a difference value fx in the X direction and a difference value fy in the Y direction are represented as follows.

$$fx=f(x+1,y)-f(x,y)$$

$$fy=f(x,y+1)-f(x,y)$$

Accordingly, a vector g (x, y) having these components has the following size Ddif.

$$Ddif=|g(x,y)|=(fx^{}2+fy^{}2)^{**}(1/2)$$

The edge degree is represented by Ddif. Originally, the pixel is arranged like a measure in all directions as shown in FIG. 25. Noting a central pixel, there are eight adjacent pixels. Accordingly, a difference in the image data between the adjacent pixels is similarly represented by a vector. The sum of the vectors may be decided as a degree of change of the image. Furthermore, the operation amount can be reduced by a comparison only between simply lateral pixels.

Figure 26:
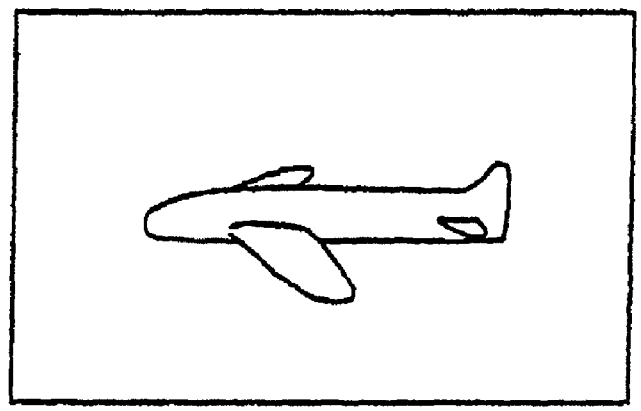
FIG. 26 is a diagram showing an example of image data.

Even if the edge degree for each pixel is calculated as described above, a degree of sharpness of the image cannot be obtained by simply calculating and averaging the edge degrees of all the pixels, FIG. 26 shows a photograph of an airplane flying in the sky. It is easily apparent that the degree of change of the image is not high for the sky as a background. In such a case, it is assumed that the sky portion is subjected to trimming. Even if the image data of the airplane which is a central subject are not changed, an average value is decreased to obtain no sharp image when the number of empty pixels is increased and is increased to obtain a sharp image when the number of the empty pixels is decreased. In such a case, the sharpness of the image is usually decided based on the sharpness of the airplane which is an original subject. Therefore, averaging is not suitable.

Consequently, the edge degrees of all the pixels are not averaged but an edge degree or only a contour portion is averaged in order to decide a degree of sharpness of the contour portion in the image, more specifically, when the image data are to be summarized in the procedure 2 while moving an object pixel, the edge degree is calculated as described above to carry out a comparison with a certain threshold Th1, thereby deciding whether or not the pixel is an edge portion. Only in the case in which the pixel is the edge portion, the edge degree Ddif is integrated (ΣDdif) and the number of pixels in the edge portion is integrated (ΣEdge_Pixel).

On the other hand, when the feature is to be extracted in the procedure 5, the edge degree (ΣDdif) integrated in the procedure 2 is divided by the number of pixels (ΣEdge_Pixel) to calculate an average value Ddif_ave of the edge degree in the edge portion. As a matter of course, if the average value Ddif_ave of the edge degree is increased, the sharpness of the image is more enhanced. If the average value Ddif_ave of the edge degree is small, an edge enhancement is desired. In the present embodiment, the following calculation is carried out. First of all, an edge enhancement Eenhance is calculated from the average value Ddif_ave of the edge degree. As an example, the following operation expression can be used.

$$Eenhance=4\times Ddif\_ave/100$$

The edge enhancement processing itself utilizes an unsharp mask shown in FIG. 27.

If the edge enhancement Eenhance is obtained, the edge enhancement processing is executed by utilizing the unsharp mask shown in FIG. 27 for all the pixels. For a luminance Y of each pixel which is obtained before the enhancement, a luminance Y' obtained after the enhancement is calculated as follows.

$$Y'=Y+Eenhance\cdot(Y-Yunsharp).$$

The Yunsharp is obtained by performing an unsharp mask processing for the image data of each pixel. The unsharp mask sets a central value of "100" to the weighting of a pixel Y (x, y) to be processed in the image data like a matrix, and is utilized for carrying out weighting corresponding to a numeric value in the measure of the mask for a peripheral pixel and integration. If the unsharp mask shown in FIG. 27 is utilized, the integration is carried out based on the following operation expression.

$$Yunsharp(x,y)=(1/396)\Sigma(Mij\times Y(x+i,y+j))\ ij$$

In the above expression, "396" is the sum of weighting factors. Moreover, Mij is a weighting factor described in the measure of the unsharp mask, Y (x, y) is image data for each pixel and ij is indicated by coordinate values in lateral and vertical columns in the unsharp mask.

The edge enhancement operation to be carried out by utilizing the unsharp mask has the following meaning. Yunsharp (x, y) is obtained by reducing the weighting of the peripheral pixel for an attentional pixel for addition. Therefore, so-called "unsharp" image data are obtained. Thus, the "unsharp" has the same meaning as the application of a so-called low pass filter. Accordingly, "Y (x, y)–Yunsharp (x, y)" has the same meaning as the application of a high pass filter with a subtraction of a low frequency component from all the original components. If a high frequency component passing through the high pass filter is multiplied by the edge enhancement Eenhance to which "Y (x, y)" is added, the high frequency component is increased in proportion to the edge enhancement Eenhance. Consequently, the edge is enhanced.

The degree of the enhancement in the edge is also varied depending on the size of the unsharp mask. Wherefore, the edge enhancement Eenhance may be classified and the unsharp mask having a corresponding size may be prepared, thereby utilizing the unsharp mask having a corresponding size. As a matter of course, the edge potion of the image requires the edge enhancement. Therefore, an operation may be carried out in only a place where the image data are greatly varied between the adjacent pixels as described above. Thus, it is not necessary to carry out the operation of the unsharp mask in most image data portions which are mot the edge portions. Consequently, the processings are rapidly decreased.

The sharpness will be summarized below. The work for calculating the average value Ddif_ave of the edge degree is equivalent to the work for extracting the feature in the procedure 5, and the processing of calculating the edge enhancement Eenhance is equivalent to the modification information creation processing in the procedure 6. In the modification specification processing in the procedure 7, such an edge enhancement Eenhance is used to generate the image data (R1, G1, B1) having a luminance enhancement which have been converted from the image data (R0, G0, B0) for each pixel which have not been converted.

The processing in the image modification control section 40 according to the present embodiment has been schematically described above. By the similar modification processing, the result of modification is varied by changing a target value. Accordingly, it is also possible to select an automatic image codification processing for causing a color to approximate to a stored color to obtain "beauty" and a "DPE" tone automatic image modification processing of increasing the sharpness enhancement and the color saturation enhancement in addition to a standard automatic image modification processing. In the automatic image modification to match with the stored color, it is also possible to carry out the automatic image modification in which each person feels "clear" by setting the user's taste as a standard value.

The image modification control section 40 is utilized as a so-called image modification engine. In the present image data processing software, a main control section 60 serves to generally control the image modification processing according to flowcharts shown in FIGS. 28 to 30 while using such an image modification engine. In the data format having a JPEG method, picture quality is deteriorated every time rewriting is carried out. The reason is that the processing is based on an 8×8 block peculiar to the JPEG. A processing of reducing a distortion caused by the block is also carried out. More specifically, a filter for a smoothing processing is applied. For an edge portion, this method does not carry out the smoothing. By slightly carrying out such an edge saving smoothing processing, the portion of an edge is enhanced, while the 8×8 block distortion and noises are smoothed. Even if the 8×8 block distortion is reduced, the saving using the JPEG method for deterioration causes the distortion again. In a method having no deterioration such as AMP (bit map), a recording size is increased. On the other hand, in a method of managing a parameter according to the present embodiment, the reducing processing is carried out for an output such as display or print. Therefor, it is possible to obtain image representation having the highest picture quality.

Figure 34:
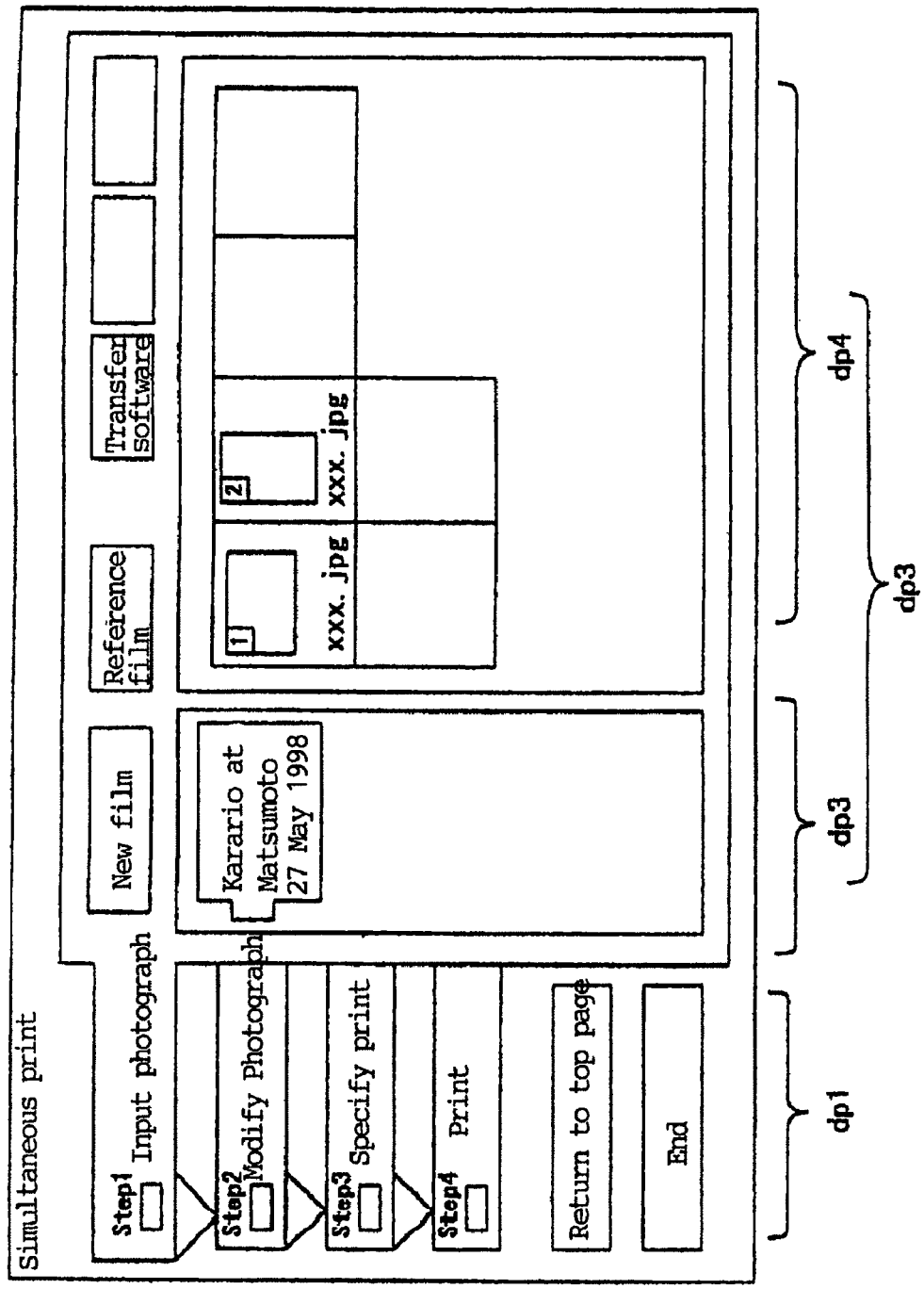
FIG. 34 is a diagram showing an operation screen for a simultaneous print processing.

A series of image data managing processings to be carried out by the main control section 60 include a simultaneous print processing. FIG. 34 shows screen display in the simultaneous print processing. In this case, the main control section 60 properly outputs an instruction to the display specifying section 20b of the common function section 20 to display the same screen on the display 17a and to accept the operation input of the keyboard 15a or the mouse 15b.

In the simultaneous print processing screen, a left portion on the screen is an operation display area, wherein a tab is displayed along the flow of a series of data processings. In this example, tabs of "input a photograph" "modify a photograph" "specify print" and "print" are displayed and a downward "Δ" mark is displayed therebetween. As a matter course, the data processing is carried out through the "input a photograph" processing, the "modify a photograph" processing, the "specify print" processing and the "print" processing in this order. Thus, desirable image data can be printed clearly. Conventionally, the same processing has been able to be executed. In that case, however, the work should have been advanced by assuming the flow of the procedure by itself.

More specifically, 1: image data are opened from a file menu, 2: an image modifying operation is specified from a tool menu to display a necessary palette and the like and to carry out desirable modification thereon for late saving, 3: a format to be printed in a print layout is specified from the file menu, 4: confirmation is carried out with a print preview in the file menu, and 5: print in the file menu is finally executed. As a matter of course, in the case in which a plurality of image data are to be printed, it is necessary to carry out a work for determining a print object from the file menu in this processing.

On the other hand, in the case in which a photograph picked up by the digital still camera 11b is to be printed, DPE simultaneous print is specified as compared with the usual photographing. A series of data processings are advanced corresponding to the simultaneous printing work. Even if an application is not well known, a series of data processings can be carried out.

On a simultaneous print processing screen shown in FIG. 34, "input a photograph" is displayed. Substantially, image data management is carried out by the film data managing section 30. A left portion in a display area is an operation display area dp1, and the residual display area is a main display area dp2, a left portion thereof is a group display region dp3 for grouping and displaying image data and the residual portion is an image display region dp4 for displaying, with a thumb nail, image data belonging to a group to be selected.

The group display region dp3 serves to display a film metaphor corresponding to the folder unit described above, and displays a patrone of a film as a frame, and furthermore, displays a film name, a comment, a date and the number of housed image files. As a matter of course, if the property of each film metaphor is displayed, all information such as a film name, a link destination, a date, a comment, a medium attribute, a medium label, a film attribute and the number of housed image files are displayed. Moreover, the group display region dp3 can properly increase or decrease the display region by using the GUI. If the display cannot be sufficiently carried out in the display region, a scroll display is added or a contracted display is obtained. As a matter of course, an image file 30a saved in the folder corresponding to the selected film metaphor is displayed with a thumb nail in the image display region dp4 by selectively operating any one of the displayed film metaphors.

In the present embodiment, the hierarchical structure of the folder employed by the operating system 12a is utilized to manage image data. Therefore, an operator can directly operate the computer system 10 to house the image file 30a in the folder. In this case, a deviation is sometimes generated between the presence of the image file 30a in the folder and the photographic data 30b. In this case, priority is given to the presence of the image file 30a in the folder to properly increase or decrease the photographic data 30b.

Also in this sense, it is decided whether or not there is the corresponding photographic data 30b based on the image file 30a present in the folder corresponding to the film metaphor. If there is the photographic data 30b, thumb nail data are used to perform a display. If there is not the photographic data 30b, thumb nail data are created in the thumb nail creating section 20i and the display is then carried out. A photograph itself is longitudinally or laterally long and one thumb nail display region is a square which can house both of them and displays a serial number and an actual file name outside a frame.

Figure 35:
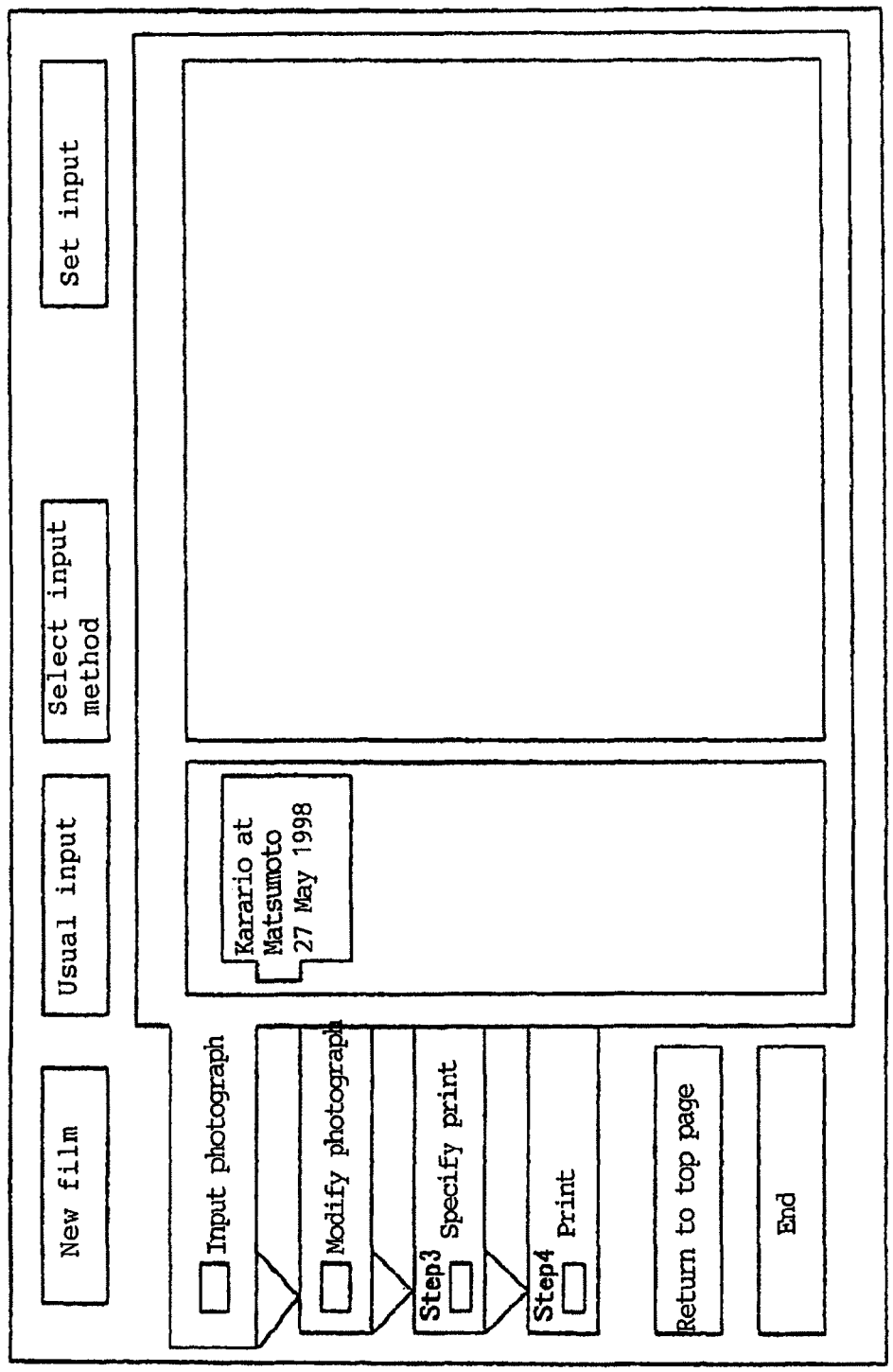
FIG. 35 is a diagram showing an operation screen for newly fetching image data.

In the case in which the simultaneous print is to be selected, it is supposed that image data which have just been picked up are fetched and printed and the image data themselves are previously fetched in a constant storage region to newly start data management as well as the case in which the data management has already been carried out. A method of fetching image data which have just been picked up includes the case in which the image data are fetched by cable connection from the digital still camera 11b and the case in which a predetermined exchangeable recording medium is utilized, for example. In any case, a "new film" prepared as a command button in the upper portion of a main display area on a screen shown in FIG. 34 is executed. Consequently, two command buttons of "usual input" and "select an input method" can be executed and a command button of "set an input" can be executed as shown in FIG. 35. If a general operator has a single digital still camera it is supposed that image data are fetched uniformly. A method of transferring image data which have been previously selected with the "set an input" is executed. As a matter of course, the operator has a plurality of digital still cameras 11*b* or the image data unexpectedly need to be fetched in another method in some cases. Therefore, if a command button of "select an input method" is executed, a plurality of methods capable of executing the fetch are displayed and selected. In these cases, external applications should be executed in some cases. By setting an input, these are properly executed. It is apparent that a method of specifying an input and the like can properly be changed.

In such a state, the operator displays image data in the image display region while viewing a display in a patrone in the group display region to decide the group, and further selects the image data to be printed. The selecting operation is accepted by the image selecting section 20*a*. For the selected image data, the color of the frame portion of the thumb nail display region is changed to display the selected image data. Consequently, the presence of the selection can be decided easily. The result of the selection is reflected as an output object in the processings of "print" through "specify print" in addition to "modify a photograph". In these cases, physical arrangement information is referred in each processing, and an actual processing is not carried out by moving image data to be selected to a provisional region.

Figure 36:
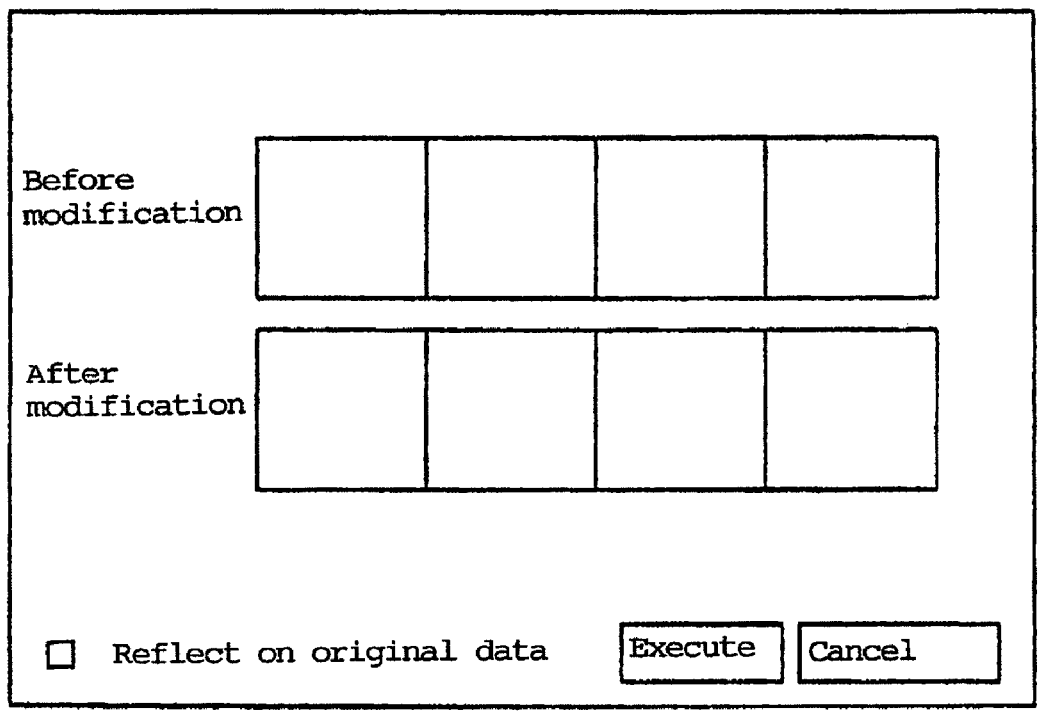
FIG. 36 is a diagram showing an operation screen for carrying out an automatic image modification processing.

It is quite obvious that the processing of "modify a photograph" should be then carried out according to the display in an operation display area by selecting the image data to be printed in the "input a photograph". In the "modify a photograph", an image can be modified for only the selected image data. FIG. 36 shows a display in a main display area which is obtained when the automatic image modification is to be carried out. In FIG. 36, the image of the selected image data which has not been modified is displayed with a thumb nail in an upper stage and an image which has been subjected to the automatic modification is displayed with a thumb nail in a lower stage. The operator views and compares both of them and selects either of them which is better. As a matter of course, the selection can be carried out by clicking the thumb nail on the favorite side by means of the mouse 15*b*, and the clicked side can be decided by causing the display specifying section 20*b* to invert and display a frame portion. The default which has not been modified is set in a selection state. Only the side clicked by the mouse may be set to the selection state after the modification. In most cases, the default which has been modified May be set to the selection state on the assumption that the picture quality which has been modified would be selected.

In this scene, a command button of "execute" and a command button of "cancel" are prepared in the lowermost portion. When the command button of "execute" is clicked by the mouse, the modified information of the photographic data 30*b* prepared for each image data is updated. As shown in FIG. 7, the management parameter of the automatic image modification (m_nApf) is prepared. When the image data obtained after the modification are selected and the command button of "execute" is clicked, a flag is set to the management parameter of the automatic image modification (m_nApf). More specifically, even if the image data obtained after the modification are selected, the modified image data are not overwritten in place of the original image data but the flag of the management parameter is simply set. In subsequent processings, however, the management parameter is referred and it can be decided that the processing should be executed for the automatically modified image data. In some cases, the image data should be read and the image should be automatically modified by the image modification control section 40. The thumb nail data in the photographic data 30*b* may be updated to thumb nail data based on the modified image data and it is sufficient that the thumb nail data may be displayed. A check box of "reflect original data" is prepared under the screen. When the check box is checked, the original image data are overwritten by the modified image data.

In this example, the automatic image modification is selectively carried out. It is preferable that such a function should be utilized. In the case in which an operation is poor, particularly, a selecting operation cannot be known even if such a function is provided. Accordingly, it is also convenient that the automatic image modification is carried out with the default when inputting a photograph and a processing of modifying the photograph is not displayed.

Figure 37:
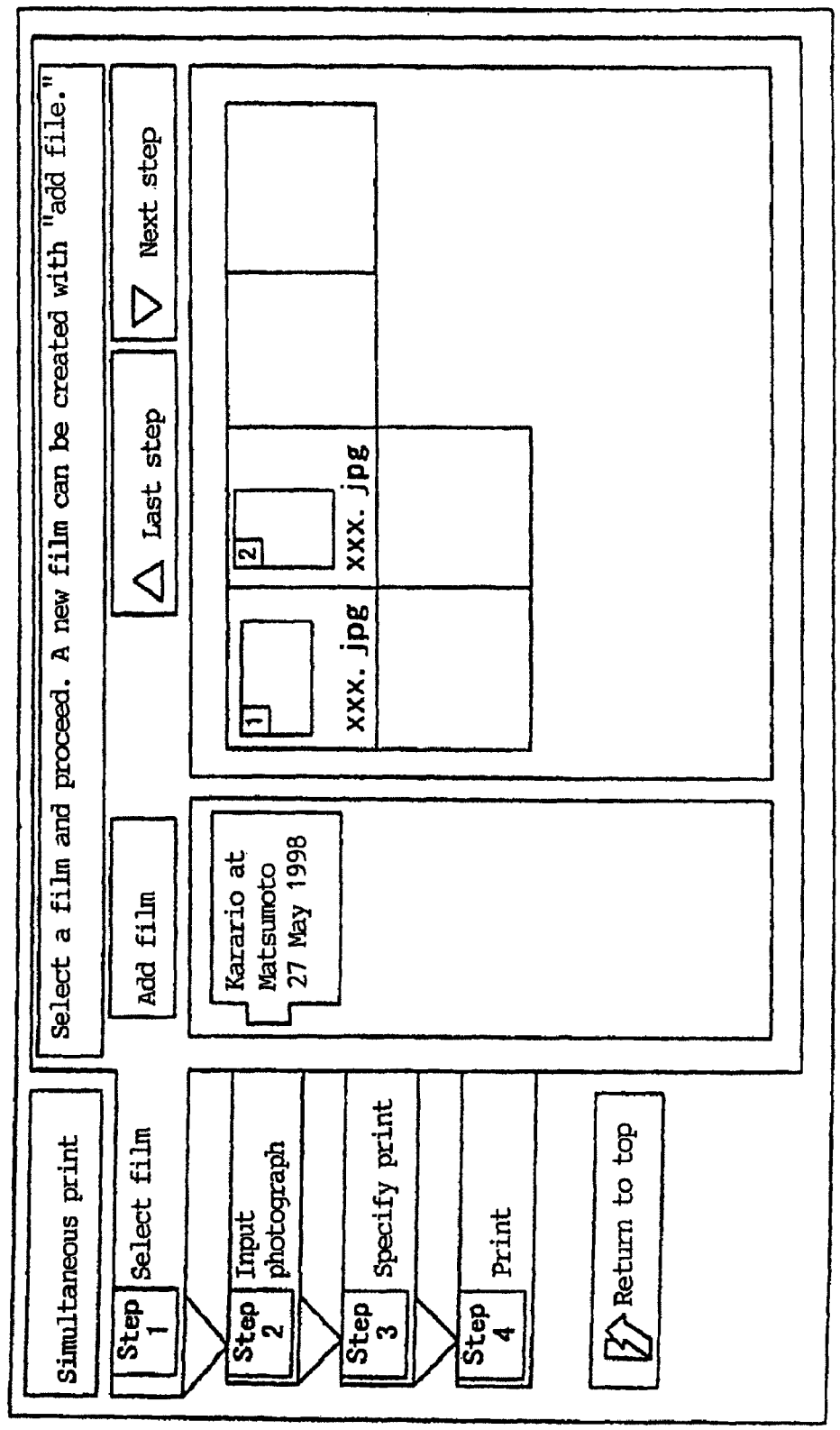
FIG. 37 is a diagram showing an operation screen for executing the automatic image modification in default.

FIG. 37 shows an example of the screen display in that case. As shown, a processing of "select a film." is added before the "input a photograph" as an operation and a processing of "specify print" is executed after the "input a photograph". As shown in FIG. 34, it is also possible to select a photograph while selecting a new film in the processing of "input a photograph". In FIG. 37, the screen display of the "select a film" is first carried out and photographic data are selected in a patrone unit or a new film is selected earlier for easy understanding. Moreover, command buttons of "last step" and "next step" are prepared in an upper stage on the right portion of the screen in order to give an instruction for advancing or returning the processing in the screen display. When the "last step" is executed, the processing is returned. When the "next step" is executed, the processing is advanced. Furthermore, the simple description of the processing in each step can be displayed in the upper stage portion of the screen. For example, "Please select a film and proceed. A new film can be created in "add a film"" is displayed in the stage of the "select a film".

On the other hand, manual image modification can also be selected. The degree of modification is designated by utilizing the GUI. More specifically, the GUI display is operated by means of the mouse 15*b* to reflect the result of the manual modification. In the present embodiment, a stepwise enhancement processing can be executed for a brightness and a contrast in the image processing section 20*g*. Based on the premise, a parameter indicative of each enhancement degree is prepared. A parameter representing the selected result of modification is reflected by the management parameter of an enhancement of a brightness component (m_nBrightness) and the management parameter of an enhancement of a contrast (m_nContrast).

The manual image modification is not restricted to the brightness and the contrast but the enhancement processing can be executed for a red component, a green component and a blue component. Parameters representing respective enhancement degrees are reflected by the management parameter of an enhancement of the red component (m_nRed), the management parameter of an enhancement of the green component (m_nGreen) and the management parameter of an enhancement of the blue component (m_nBlue), respectively.

Figure 38:
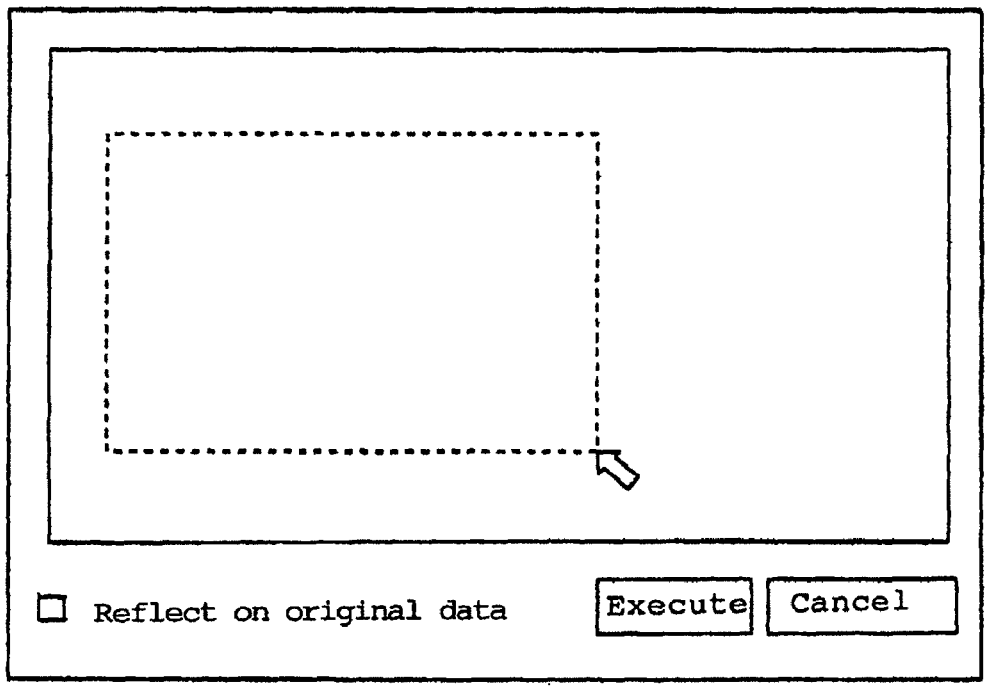
FIG. 38 is a diagram showing an operation screen for carrying out a trimming processing.

The image modification includes various processings to be reflected on the display of the image data, and also includes image trimming and rotation in a broad sense. When the trimming is executed with the image data selected, image data based on the management parameter at the present time is displayed in a frame having a predetermined size as shown in FIG. 38. When the mouse 15*b* is operated to specify a trimming start position and a trimming end position and the command button of "execute" is clicked, the display is carried out in a portion other than a rectangular region having the trimming start position and the trimming end position diagonally. As a matter of course, in this case, a part of the original image data is not deleted but coordinate values are simply set to the management parameters of a trimming start X coordinate (m_x1), a trimming start Y coordinate (m_y1), a trimming end X coordinate (m_x2) and a trimming end Y coordinate (m_y2). Based on the coordinate values, the thumb nail creating section 20$i$ newly creates a thumb nail and carries out update only in the photographic data 30$b$.

Figure 39:
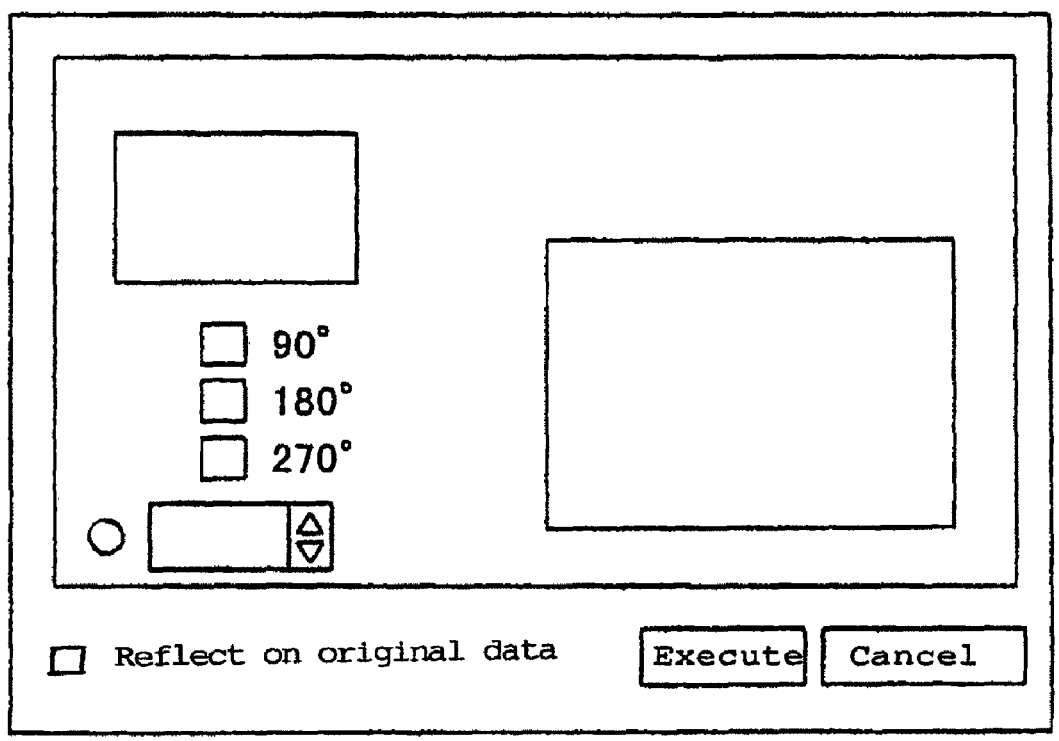
FIG. 39 is a diagram showing an operation screen for carrying out a rotation processing.

On the other hand, the rotation of the screen is also referred to as image modification in a broad sense and is utilized in the case in which a vertical photograph picked up by setting a camera sideways is made vertically long on the display. FIG. 39 shows the display screen of a main display area for such a rotation processing. Original image data are displayed with a thumb nail in an upper left portion and operation input buttons for selecting three rotating angles every 90 degrees and an optional rotating angle are prepared under the upper left portion. Moreover, a thumb nail which is obtained with rotation by the selected rotating angle can be displayed in a right central portion. As matter of course, the selected rotating angle is set to the management parameter of the rotating angle (m_nRotation).

Figure 40:
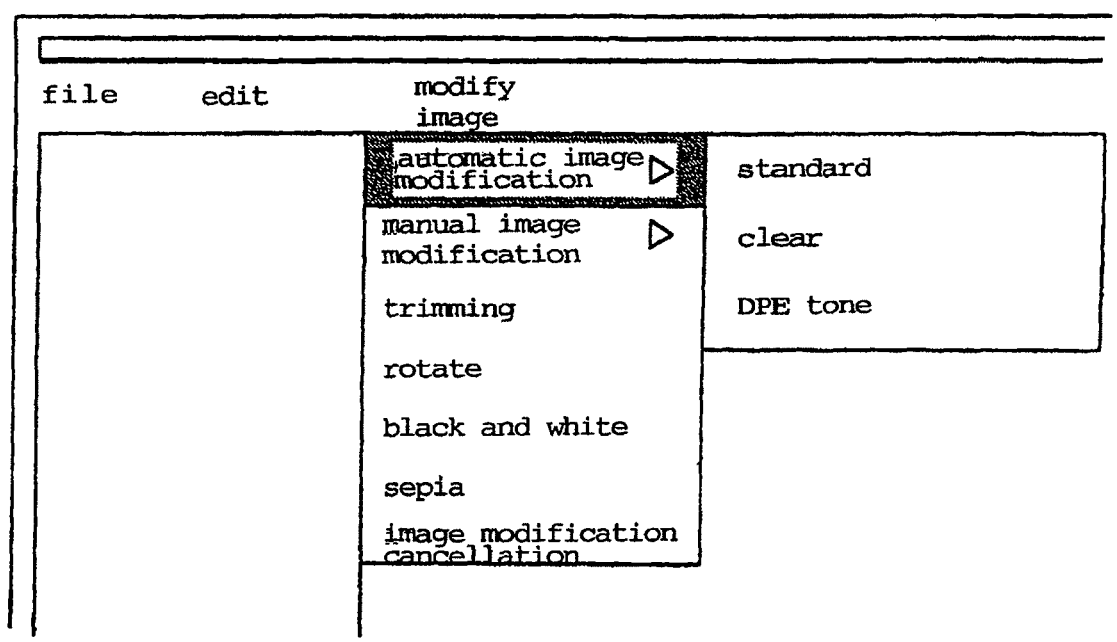
FIG. 40 is a diagram showing an operation screen for carrying out an automatic image adjustment processing.
Figure 41:
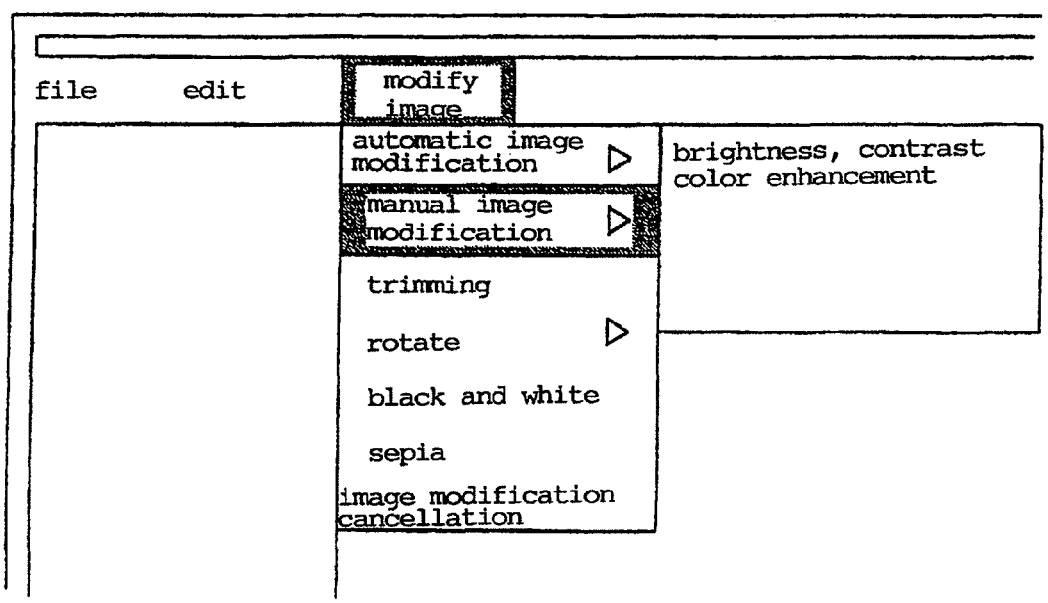
FIG. 41 is a diagram showing an operation screen for carrying out a manual image adjustment processing.

FIGS. 40 and 41 show a menu operation to be carried out when specifying the image modification. FIG. 40 is an example of the gem operation in the case in which the automatic image modification is to be carried out. When the image modification is clicked on a menu bar, a drop down menu is displayed. When the automatic image modification is selected, a more detailed option is displayed. At this time, if "clear" is clicked, the automatic image modification is activated with an option of "clear". This case, all the selected image data are displayed as shown in FIG. 36. Moreover, FIG. 41 shows an example of a menu operation in the case in which the manual image modification is carried out. When the manual image modification of the drop down menu is selected while clocking the image modification, it is possible to select modification for "brightness/contrast" or "modification for "color enhancement". It is supposed that the manual image modification which has not been improved by the execution of the automatic image modification is often executed individually. Only in the case in which the image data to be intended for the manual image modification are selected for activation, the manual image modification can be executed.

Moreover, trimming, rotation, black and white conversion and sepia conversion are also executed by selecting image data and then selecting an image processing from the drop down menu. Although the black and white conversion and the sepia tone conversion are individually carried out, the results of the conversion are uniform. The operator's subjectivity is not necessary for adjustment differently from the manual image modification. Accordingly, the management parameter of the automatic image modification (m_nApf) actually set for the black and white conversion and the sepia tone conversion.

There has been described the situation in which the parameter is set in the process of carrying out various modifications for the image data when selecting the simultaneous print processing. Next, description will be given to a processing in the computer system 10 for actually implementing such an operation.

Figure 28:
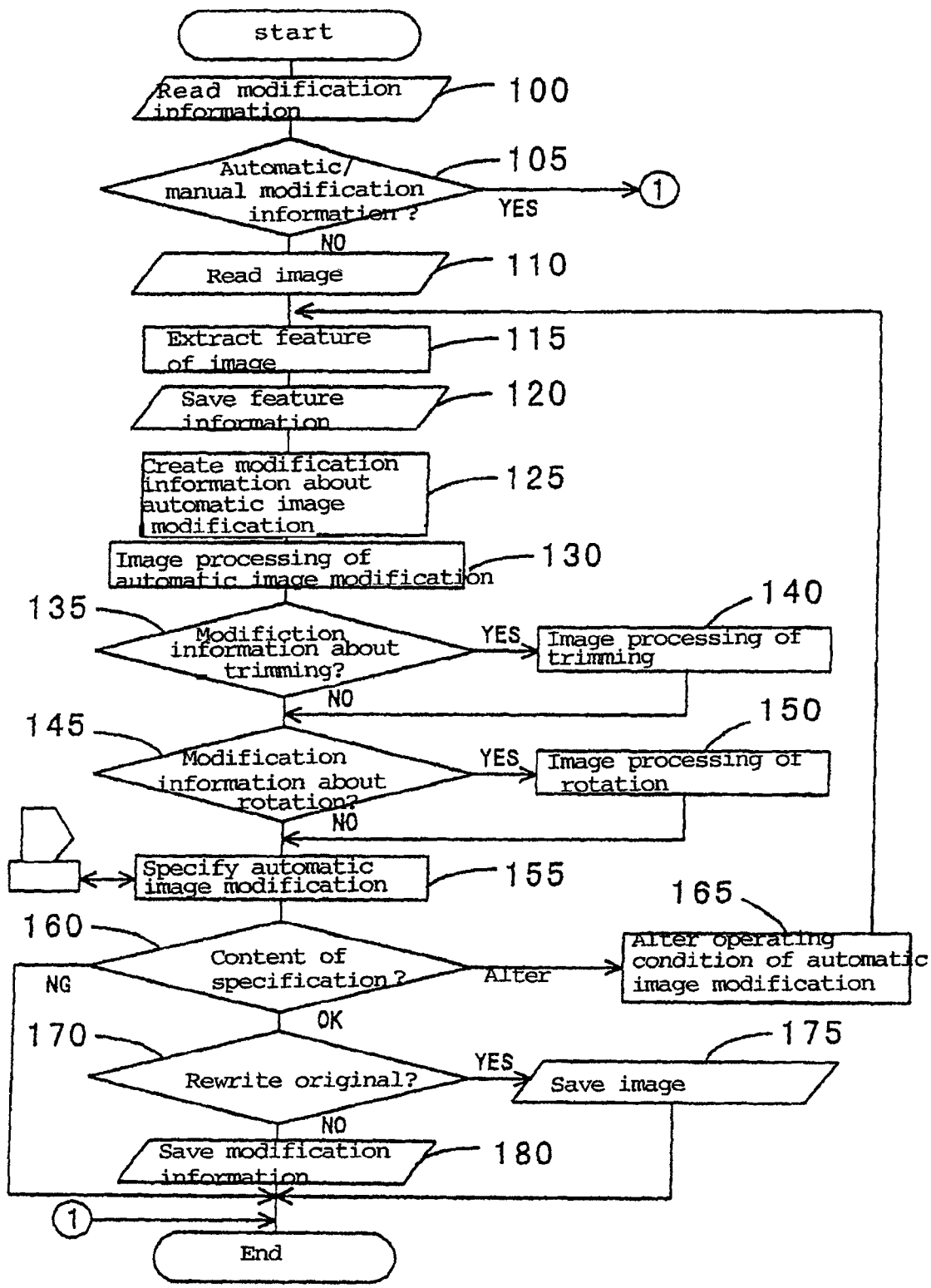
FIG. 28 is a flowchart showing the case in which automatic image adjustment is specified.

FIGS. 28 to 31 are flowcharts showing each processing. FIG. 28 shows sa processing of executing the automatic image modification, in which the database structure of the photographic data 30$b$ is referred to read modification information when reading image data for executing the automatic image modification at Step 100. The modification information implies various parameters described above. If the automatic image modification or the manual image modification is to be executed by these parameters, the present processing is ended without carrying out the following automatic image modification. The reason is that the automatic image modification does not need to be executed repeatedly and the automatic modification cannot be carried out if the tastes are reflected by the manual image modification.

Next the image data are read at Step 110, the feature of the image is extracted at Step 115, feature information is saved at Step 120, the modification information about the automatic modification is created at Step 125, and the image processing of the automatic modification is executed at Step 130. As a matter of course, these are equivalent to the procedures 1 to 6 as describe with reference to FIG. 9. On the other hand, in the case in which the position information about the trimming is set to the management parameters of a trimming start X coordinate (m_x1), a trimming start Y coordinate (m_y1), a trimming end X coordinate (m_x2) and a trimming end Y coordinate (m_y2), an image processing for trimming is executed at Step 140 through the decision of Step 135. If the modification information about the rotation is set to the management parameter of a rotating angle (m_nRotation) is set, the rotation image processing of rotating an image is executed at Step 150 through the decision of Step 145.

Through the above-mentioned processings, an image can be obtained after the automatic image modification. Therefore, a thumb nail is displayed before and after the modification as shown in FIG. 36 at Step 155, and whether or not the result of the automatic image modification processing is employed is waited to be input. More specifically, if the result of the automatic image modification is desirable, it is set to the selection state and the command button of "execute" is clicked. In this case, a selection situation in the check box of "reflect original data" is fetched at Step 170. If it is decided that the check has been carried out, image data are overwritten and saved at Step 175.

If the original is to be rewritten, it is not necessary to refer to the modification information. Only if the original is not rewritten, the modification information is saved at Step 180. On the other hand, in the case in which an automatic image processing of "standard" is insufficient, the operating condition value of the automatic image processing is changed in advance at Step 165 in order to execute the automatic image modification corresponding to the setting when "clear", "us tone" or the like is selected as shown ins FIG. 40. The above-mentioned processing is repeated at Step 115. When the command button of "cancel" is clicked, it is decided that "termination" is desired and the present processing is ended.

As a matter of course, the automatic image modification can correspond to various other conditions. Accordingly, the above-mentioned operating condition value can be changed according to the user's designation of "this portion should be more bright . . . " "the whole should be more yellow" in addition to the selection of the "DPE tone" and the like which are prepared in advance and the above-mentioned processing can also be repeated. The operating condition value is not only set later at Step 165 but also reflected when the modification information about the automatic image modification is first created at the step 125 as a matter of course.

Figure 29:
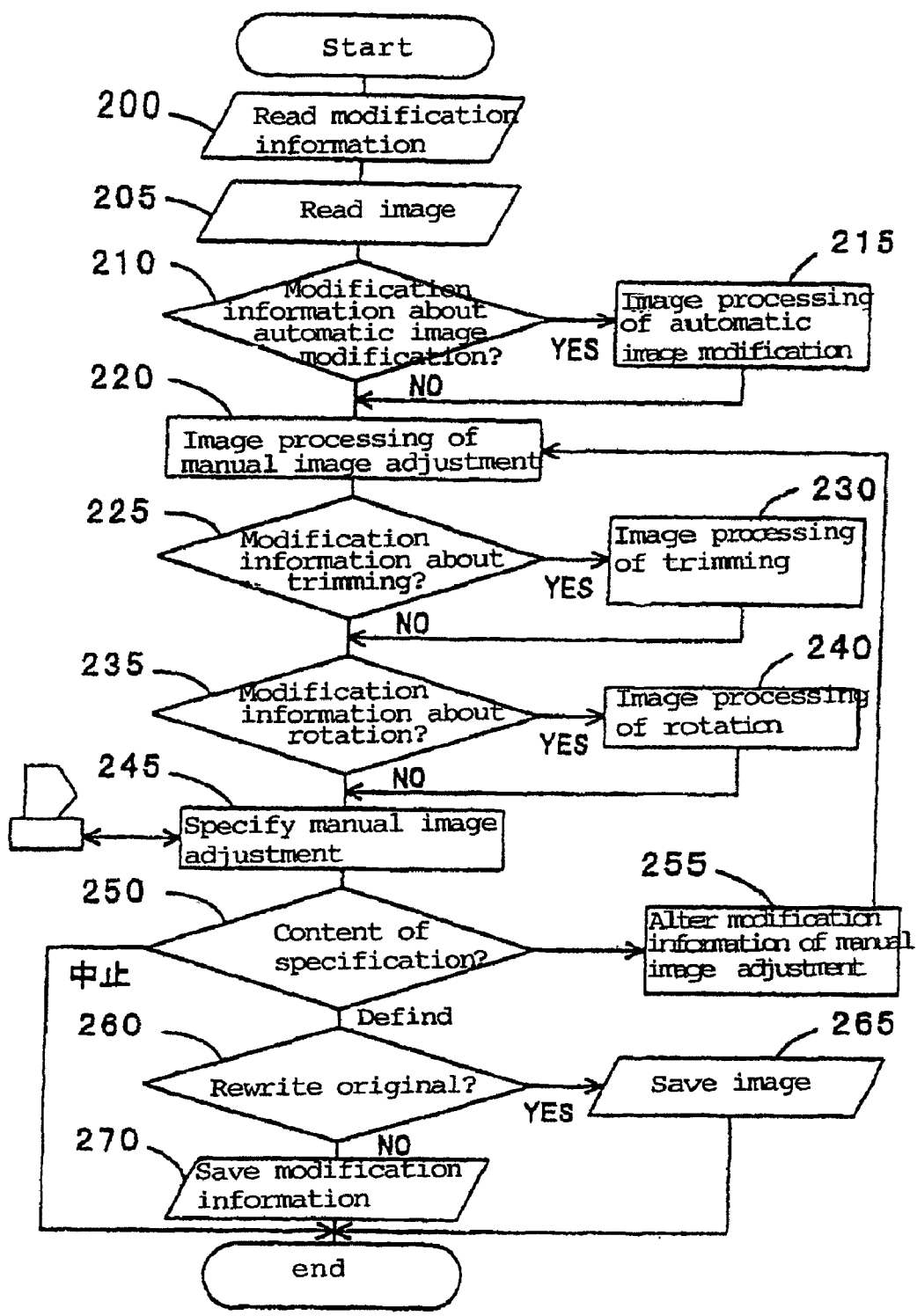
FIG. 29 is a flowchart showing the case in which manual image adjustment is specified.

Next, description will be given to a processing to be carried out for executing the manual image modification. FIG. 29 shows the manual image modification processing. When the manual image modification is executed, modification information is read at Step 200 before image data to be processed are read and the same image data are then read at Step 205. Subsequently, the management parameter of the automatic image modification (m_nApf) is referred at Step 210. If the management parameter is set, the image processing of the automatic image modification is executed at Step 215 through the decision of the Step 210.

At Step 220, then, the management parameter for the manual image modification which has already been set is read and an image processing is executed according to the designation. Thereafter, the processings for the taming and the rotation are executed based on management parameters respectively at Steps 225 to 240.

Through the above-mentioned processings, an image can be obtained after the manual image adjustment which has already been set. Therefore, if the manual adjustment operation is further executed as described above at Step 245, the modification information is changed at Step 255 and the image modification is executed through the Steps 220 to 240.

Figure 30:
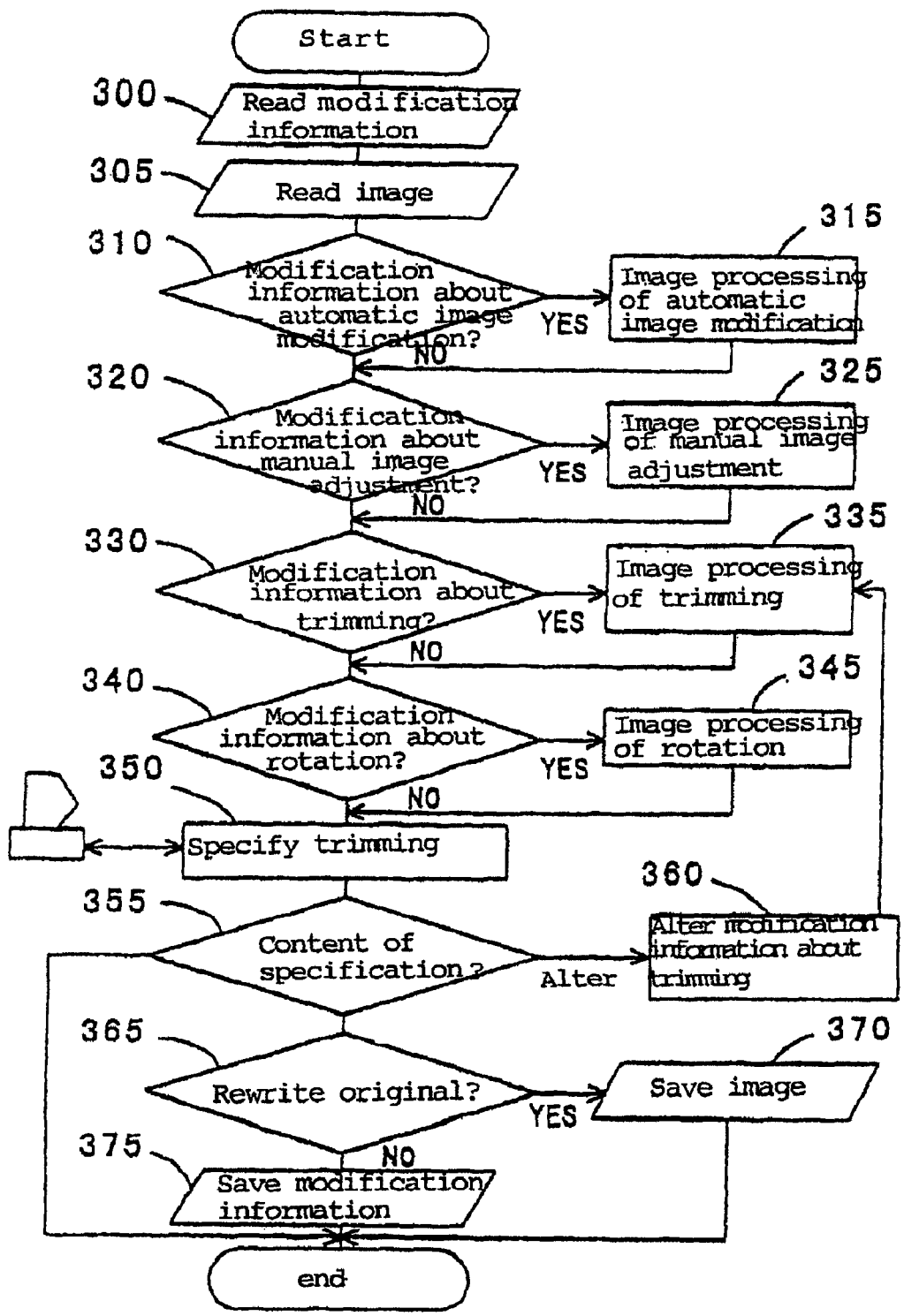
FIG. 30 is a flowchart showing the case in which trimming is specified.

Moreover, when the command button of "execute" is clicked, it is decided that "defined" is indicated. Consequently, the original image data are rewritten at Step 265 or a management parameter representing final modification information is rewritten at Step 270 depending on the selection situation in the check box of "reflect original data". When the command button of "cancel" is clicked, it is decided that the "terminate" is decided and the present processing is ended.

next, description will be given to a processing to be carried out for executing the trimming. FIG. 30 shows the processing of the trimming. Before image data to be processed are read, modification information is read at Step 300 and the image data are then read at Step 305. Subsequently, the management parameter of the automatic image modification (m_nApf) is referred at Step 310. If the management parameter is set, the image processing of the automatic image modification is executed at Step 315. Moreover, various management parameters for the manual image modification which have already been set are referred at Step 320. If the management parameters are set respectively, a corresponding image processing is executed at Step 325.

Then, the management parameter for the trimming which has already been set is referred at Step 330, the image processing of the trimming is executed at Step 335, the management parameter for rotation which has already been set is referred at Step 340, and the image processing of the rotation is executed at Step 345.

Through the above-mentioned processings, images can be obtained after the modification of all the images which have already been set. Therefore, a trimming operation is accepted on a screen display shown in FIG. 38 at Step 355. In the case in which the trimming operation is newly carried out, the modification information is changed at Step 360 and the image modification is executed through the processing of the Step 335. In this case, the management parameter for the rotation is referred at the Step 340, and it is decided whether or not the rotation is redundant. Redundant rotation is not carried out.

Also in this case, if the command button of "execute" is clicked, it is decided that the "defined" is selected. Depending on the selection situation in the check box of the "reflect original data", the original image data are rewritten at Step 365 or a management parameter representing the final modification information is rewritten at Step 370. When the command button of "cancel" is clicked, it is decided that the "terminate" is selected and the present processing is ended.

Figure 31:
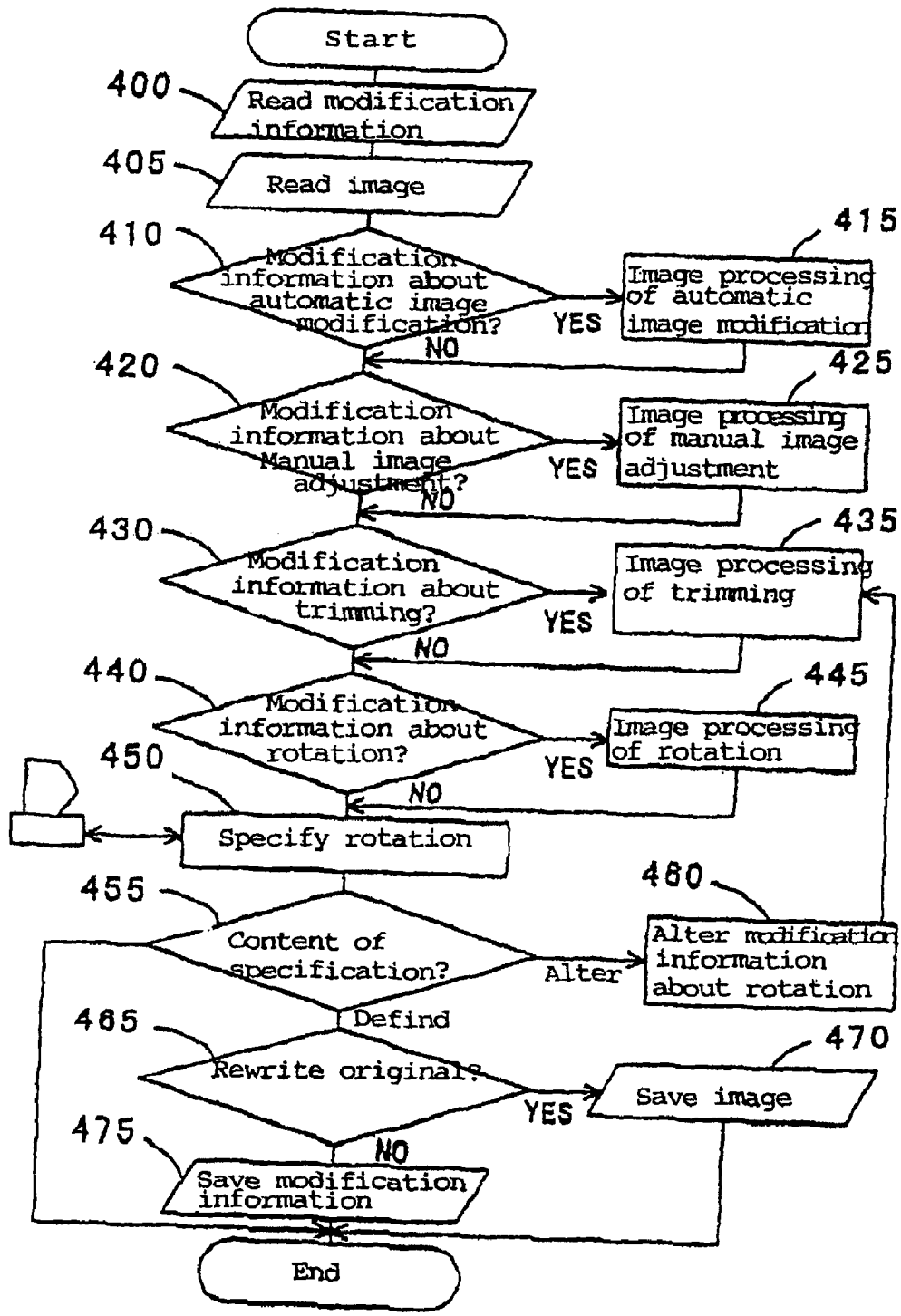
FIG. 31 is a flowchart showing the case in which rotation is specified.

Finally, description will be given to a processing to be carried out for executing the rotation. FIG. 31 shows the processing of the rotation. Before image data to be processed are read, modification information is read at Step 400 and the image data are then read at Step 405. Subsequently, the management parameter of the automatic image modification (m_nApf) is referred at Step 410. If the management parameter is set, the image processing of the automatic image modification is executed at Step 415. Moreover, various management parameters for the manual image modification which have already been set are referred at Step 420. If the management parameters are set respectively, a corresponding image processing is executed at Step 425.

Then, the management parameter for the trimming which has already been set is referred at Step 430, the image processing of the trimming is executed at Step 435 the management parameter for a rotating angle (m_nRotation) which has already been set is referred at Step 440, and the image processing of the rotation is executed at Step 445.

Through the above-mentioned processings, images can be obtained after the modification of all the images which have already been set. Therefore, a rotating operation is accepted on a screen display shown in FIG. 39 at Step 455. In the case in which the rotating operation is newly carried out, the modification information is changed at Step 460 and the image modification is executed through the processing of the Step 445.

Also in this case, if the command button of "execute" is clicked, it is decided that the "defined" is selected. Depending on the selection situation in the check box of "reflect original data", the original image data are rewritten at Step 465 or the management parameter for the rotating angle (m_nRotation) which represents the final modification information is rewritten at Step 470. When the command button of "cancel" is clicked, it is decided that "terminate" is selected and the present processing is ended.

Thus, it is not necessary to add the change to the original image data as one of advantages obtained by utilizing the management parameter. In order to make the best of the original image data, it is necessary to modify the management parameter.

Figure 32:
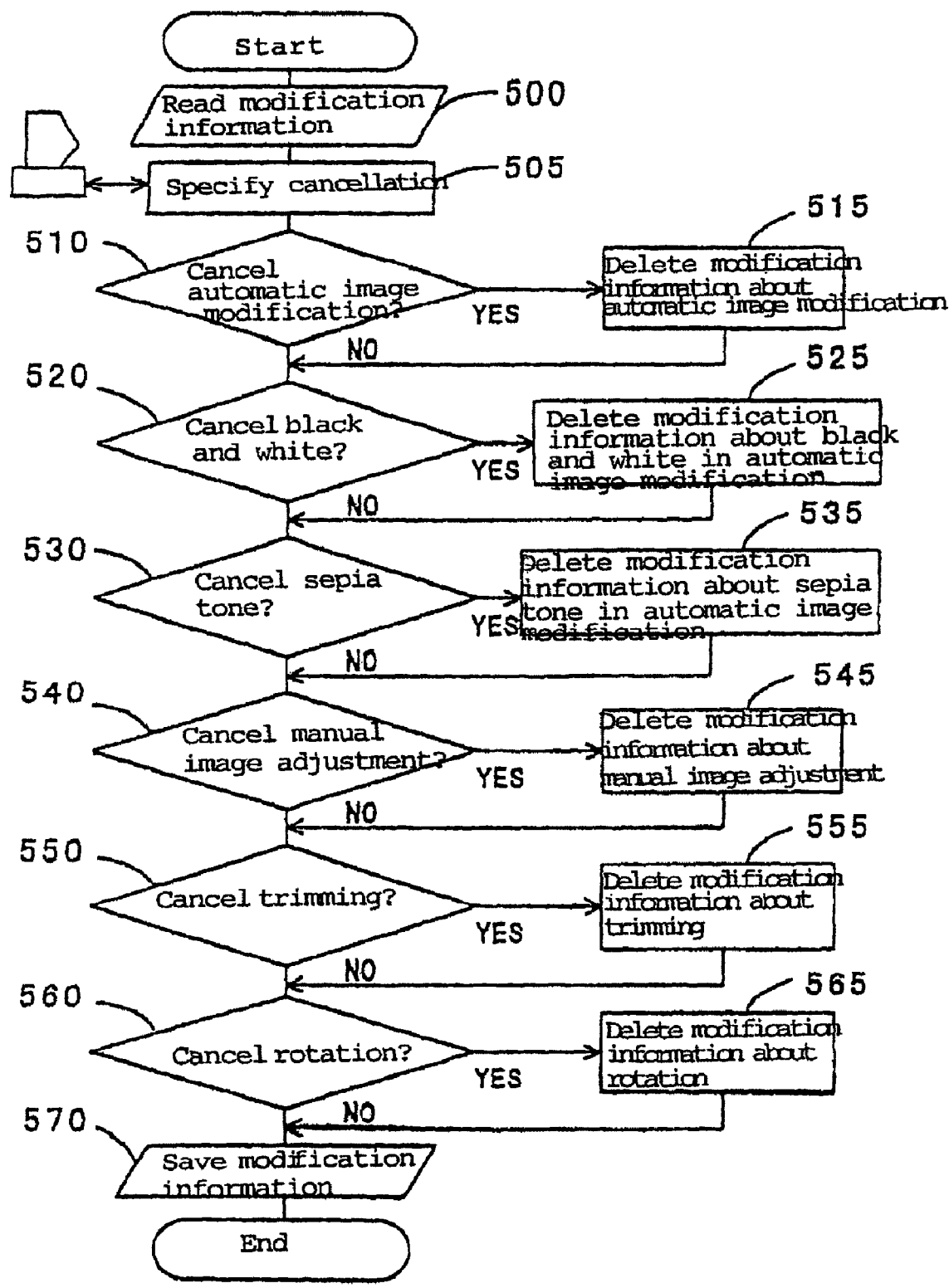
FIG. 32 is a flowchart showing the case in which modification cancellation is specified.

As shown in FIGS. 40 and 41, a command of image modification cancellation is prepared in the lowermost stage of a drop down menu to be displayed when selecting the image modification of a file menu. When the same command is selected and executed, a processing is executed according to the flowchart shown in FIG. 32.

Figure 42:
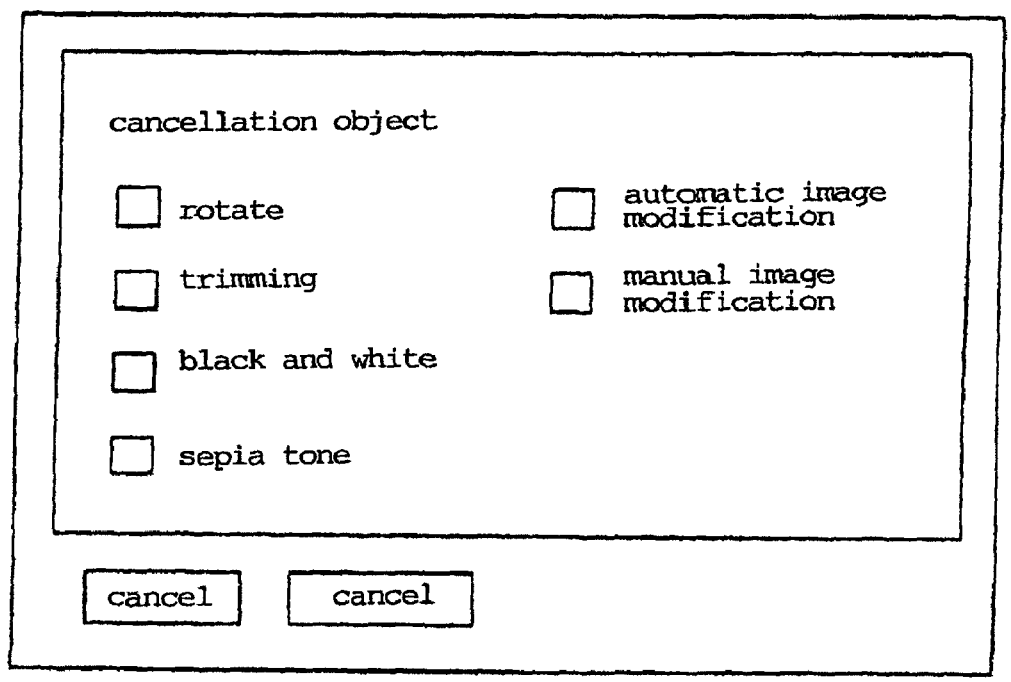
FIG. 42 is a diagram showing an operation screen for carrying out a modification cancellation processing.

Also in this case, the image modification cancellation is executed in a state in which the image data are selected. The modification information of the photographic data 30b about the image data are read at Step 500 and an operation menu shown in FIG. 42 is displayed on a main display area and an operation input is waited at Step 505. In the operation menu, "automatic image modification", "manual image adjustment", "rotation", "trimming", "black and white" and "sepia tone" are displayed as the items of a cancellation object and a check box is displayed before each of the items. When the operator clicks the check box provided before the image modification item to be canceled by means of the mouse 15b, a check mark is toggle displayed and the presence of the respective check marks is represented by a flag and is stored internally. In the lower stage, a command button of "execute" and a command button of "cancel" are prepared. After checking the necessary check box, the operator clicks the command button of "execute".

Consequently, corresponding modification information is deleted while deciding whether or not a check mark is attached to each check box at and after Step 510. As a matter of course, the deletion of the modification information implies the modification of the management parameter. It is not necessary to process the original image data at all. More specifically, it is decided whether or not the check mark is attached to the item of "automatic image modification" at Step 510. If the check mark is attached, the modification information of "automatic image modification" is deleted at Step 515. Next, it is decided whether or not the check mark is attached to the item of "black and white" at Step 520. If the check mark is attached, the modification information of "black and white" is deleted at Step 525. Then, it is decided whether or not the check mark is attached to the item of "sepia tone" at Step 530. If the check mark is attached, the modification information of "sepia tone" is deleted at Step 535. Thereafter, it is decided whether or not the check mark is attached to the item of "manual image modification" at Step 540. If the check mark is attached, the modification information of "manual image modification" is deleted at Step 545. The manual image modification includes a lightness, a contrast and a color enhancement. While all of them are canceled in this example, they may be canceled individually.

Next, it is decided whether or not the check mark is attached to the "item of trimming" at Step 550. If the check mark is attached, the modification information of "trimming" deleted at Step 555. Subsequently, it is decided whether or not the check mark is attached to the item of "rotation" at Step 560. If the check mark is attached, the modification information of "rotation" is deleted at Step 565.

In the state in which some of the modification information are deleted through the above-mentioned results, the modification information are saved at Step 570. The paving work implies the update of the photographic data 30b. By giving access to the database structure of the photographic data 30b shown in FIG. 5, the newest modification information is obtained by updating. When the command button of "cancel" is clicked on the operation menu shown in FIG. 42, all the check marks are internally deleted and the above-mentioned processings are executed. Therefore, the present processing is ended without deleting any of the modification information after all. While this example has employed the method of deleting the modification information once created to return the original information, information about a date is added to the modification information itself to manage a plurality of modification information corresponding to one image data in time series. Consequently, the modification information is simply deleted to return the original data, and furthermore, it is possible to delete the modification information by going back to an optional stage and it is also possible to reconstitute the results of the modification which have been good in the middle stage.

Figure 33:
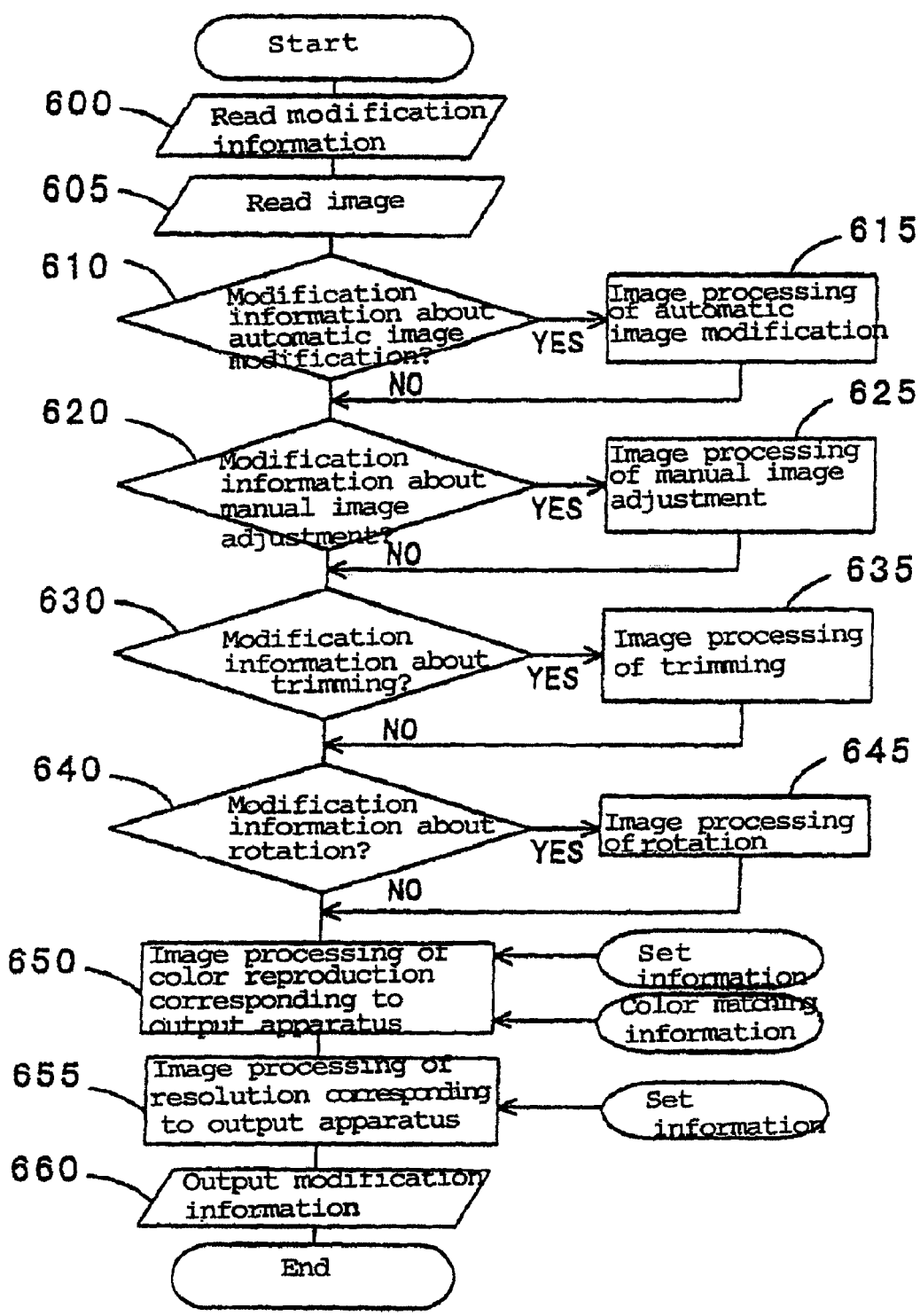
FIG. 33 is a flowchart showing a processing capable of utilizing modified image data.

While the description has been given to the work for setting or canceling the management parameter prepared corresponding to each image data, a processing capable of utilizing actually modified image data by using the management parameter will be described with reference to the flowchart shown in FIG. 33.

The modified image data are utilized in the case in which the thumb nail creating section 20i updates a thumb nail according to an instruction given from the display specifying section 20b and carries out a screen display, the case in which the data format style of the image data is converted and output by the image output section 20k, the case in which the original print data are created when print is to be carried out by the DPE print control section 50 as will be described below and the like. Accordingly, although respective processings have slight differences, they are almost coincident with the flowchart of FIG. 33.

The modification information of object image data are read at Step 600 and image data are read at Step 605 to perform image modification based on the image data according to the modification information in the following processings. Consequently, new image data are created without rewriting the image data. It is decided whether or not there is modification information about the automatic image modification at Step 610. If there is the modification information, the automatic image modification is carried out at Step 615. In this case, the management parameter of the automatic image modification (m_nApf) includes the information about the automatic image modification, and furthermore, decides whether or not the automatic image modification such as "standard", "clear" and "DPE tone" is carried out and then advances the processing. Moreover, since there is only one result of modification, the conversion to the black and white and the sepia tone is represented by the management parameter of the automatic image modification. Thus, the processing is carried out simultaneously or alternatively.

Subsequently, it is decided whether or not there is modification information of manual adjustment at Step 620. If there is the modification information, the image processing of manual adjustment is carried out at Step 625. As described above, the modification information of the manual adjustment includes an enhancement of a bright component (m_nBrightness), an enhancement of a contrast (m_nContrast), an enhancement of a red component (m_nRed), an enhancement of a green component (m_nGreen) and an enhancement of a blue component (m_Blue). If there is any of the modification information, a corresponding image processing is carried out. If there are the modification information about a brightness and a contrast and modification information about a color enhancement, the former is modified and the latter is then modified. As a matter of course, in the case in which the result of the reflection on such a modification order is obtained, the modification can also be carried out only once.

Then, it is decided whether or not there is the modification information about the trimming at Step 630. If there is the modification information about the trimming, the image processing of the trimming is carried out at Step 635. In the image processing of the trimming, an area surrounded by a trimming start X coordinate (m_x1), a trimming start Y coordinate (m_y1), a trimming end X coordinate (m_x2) and a trimming end Y coordinate (m_y2) is left and the peripheral image data are deleted.

Moreover, it is decided whether or not there is the modification information about rotation at Step 640. If there is the modification information about rotation, the image processing of the rotation is carried out at Step 645. In the image processing of the rotation, a rotating angle is referred based on the management parameter of the rotating angle (m_nRotation) and the processing of rotating the image data is carried out.

Referring to the above-mentioned image processings, the original image data are first saved in a work area again and the image data on the work area are altered. Accordingly, the original image data are not altered.

While an optional image processing which is executed or is not executed depending on the user's selecting operation has been described above, essential image processings are executed based on a difference in a hardware environment at Steps 650 and 655. At the Step 650, an image processing of color reproduction depending on an output apparatus is carried out. It cannot be denied that a color output reproducing apparatus has a deviation from a reference. In many cases, a difference is made on the result of an output by the input of the same image data. In respect of a simple expense to cost, it is impossible to make the deviation uniform such that the image data and the result of the output are always coincident with a standard state. It is better that color matching information for modification is utilized by the anticipation of the deviation.

In the above-mentioned image data, it is apparent that a great color deviation is not generated in the result of the output if there are color deviation information on the photographing side and color deviation information on the output side. In the present embodiment, the former color deviation information is managed as the color matching automation in the database structure of the photographic data 30b and is managed, in set information, as color deviation information generated in the computer system 10 and the color printer 17b. At the Step 650, the image data on the work area are modified based on the both color deviation information.

At the Step 655, the image processing having a resolution corresponding to the output apparatus is executed to carry out corresponding resolution conversion by comparing the resolution of the image data with a resolution for output. For example, in the case in which a display on the color display 17a has a resolution of 70 dpi and printing is to be carried out according to the size, it is necessary to perform resolution conversion 10 times as much in all the directions if the color printer 17b has a resolution of 720 dpi.

Returning to the description of the simultaneous print processing shown in FIG. 34, the "specify print" processing is carried out after the modification of a photograph. The "input a photograph" and "modify a photograph" have been passed, and the image data to be printed have been selected and the image processing for the printing has been selected. In the "specify print", a format for printing the selected image data is specified.

Figure 43:
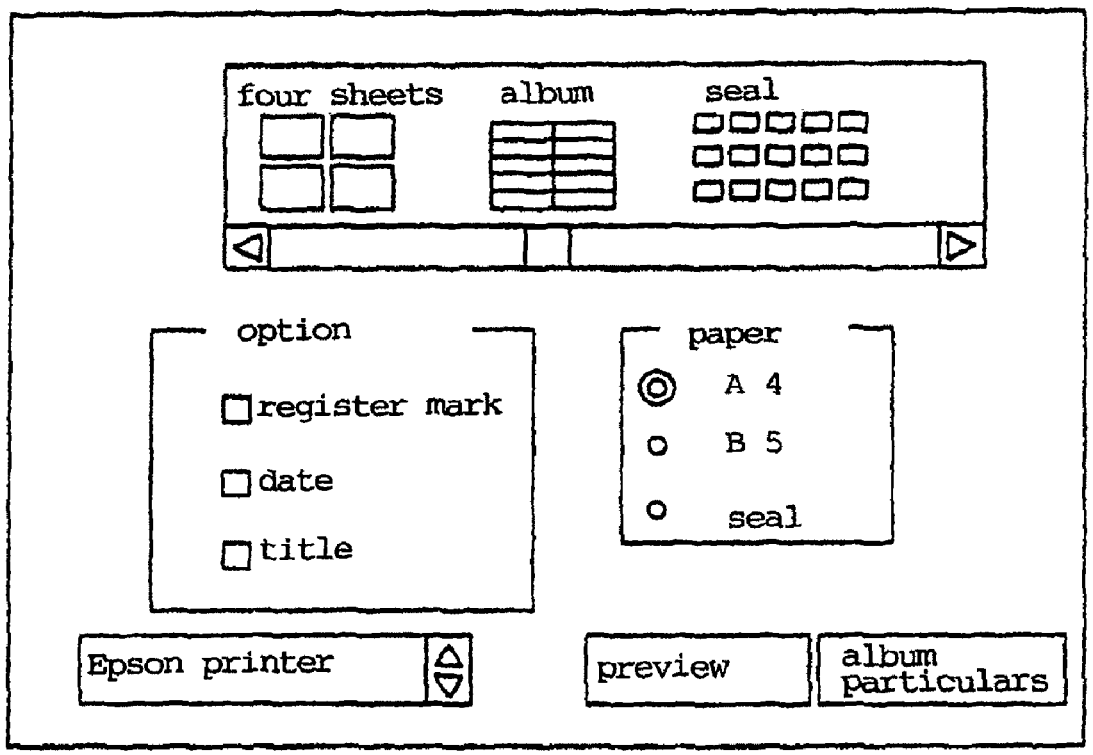
FIG. 43 is a diagram showing an operation screen for carrying out a print specification processing.

FIG. 43 shows a display in the main display area for the "specify print". In an upper stage portion, a display area which can be scrolled in the transverse direction is provided so that a layout pattern can be displayed. In FIG. 43, layouts of "a layout every four pieces", "album print" and "seal print" are displayed. As a matter of course, it is possible to mount other layout patterns. Moreover, a check box is provided as an option in order to select the print of a register mark to be a target of a position for cutting, the print of a date and the print of a title. Furthermore, a paper corresponds to "A4", "B5", "seal" and the like, any of which can be selected exclusively by means of a radio button.

When printing is to be carried out, it is necessary to generate print data depending on the type of the color printer 17b. Therefore, the selection display area of a printer device is provided on the left in the lower stage. By selecting the printer device, corresponding set information are read respectively to modify the above-mentioned color deviation or to cause the output resolutions to be coincident with each other.

Figure 44:
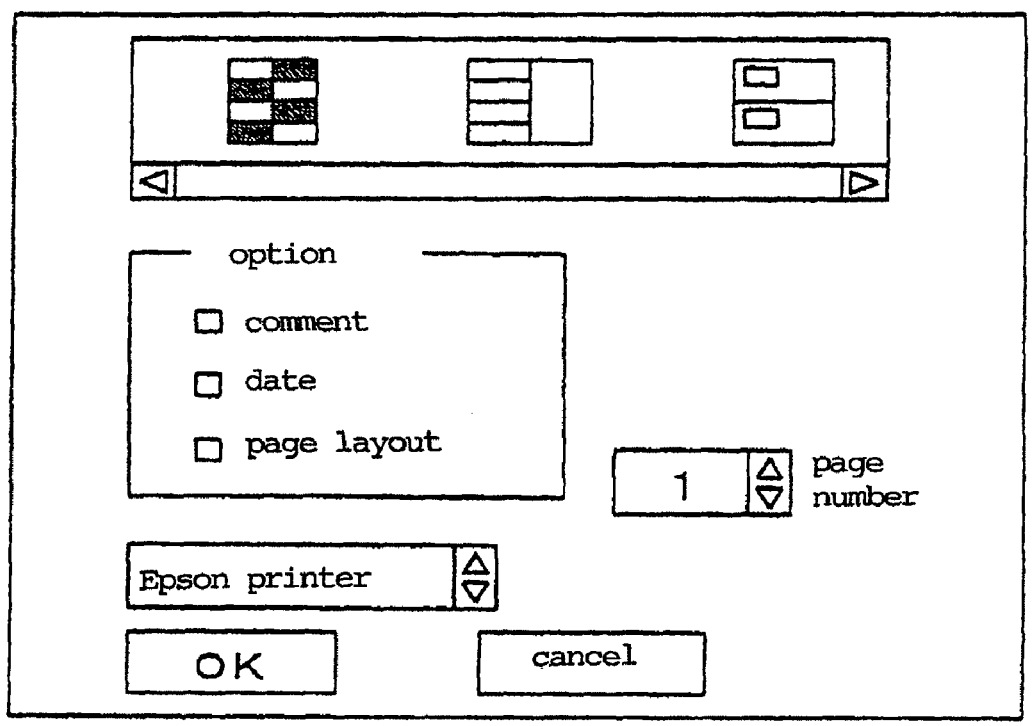
FIG. 44 is a diagram showing an operation screen for carrying out an album print processing.

The layout of "album print" is prepared in the layout. When a command button of "album particulars" is clicked, an operation screen shown in FIG. 44 is displayed in the main display area. Also in the display screen, a display area which can be scrolled in the transverse direction is provided in the upper stage portion and the pattern of the album can be displayed. In this example, the A4 paper is provided in two lateral columns and four vertical stages to print an image checkerwise, is provided on the left half in the four vertical stages to print an image and is divided into vertically upper and lower stages to print an image. Moreover, a check box is provided such that the print of a comment, the print of a date or that of a page title can be selected as options for album printing, and a specification column for a page number is also provided such that a serial page number can be printed because the printing is sequentially carried out day by day for the album print. For the page number, the succeeding page number of the last album print may be set automatically. If the exact display is enough, a command button of "OK" is clicked. If the display is not satisfied, a command button of "cancel" is clicked.

The final processing of the simultaneous print shown in FIG. 34 is "print". In the main display area, a message for confirmation is displayed including the type of the printer device, which is being specified, the size of a print paper, and the necessary number of sheets as shown in FIG. 45, and furthermore, a command button of "execute" for starting the print and a command button of "cancel" are prepared. As a matter of course, when the command button of "execute" is clicked in this state, the print is started. Depending on the color printer 17b, a long time is often required for the printing. Therefore, if all the operations to be specified in advance are completed and the button of "execute" is clicked, the print can easily be completed after taking the bath.

Figure 46:
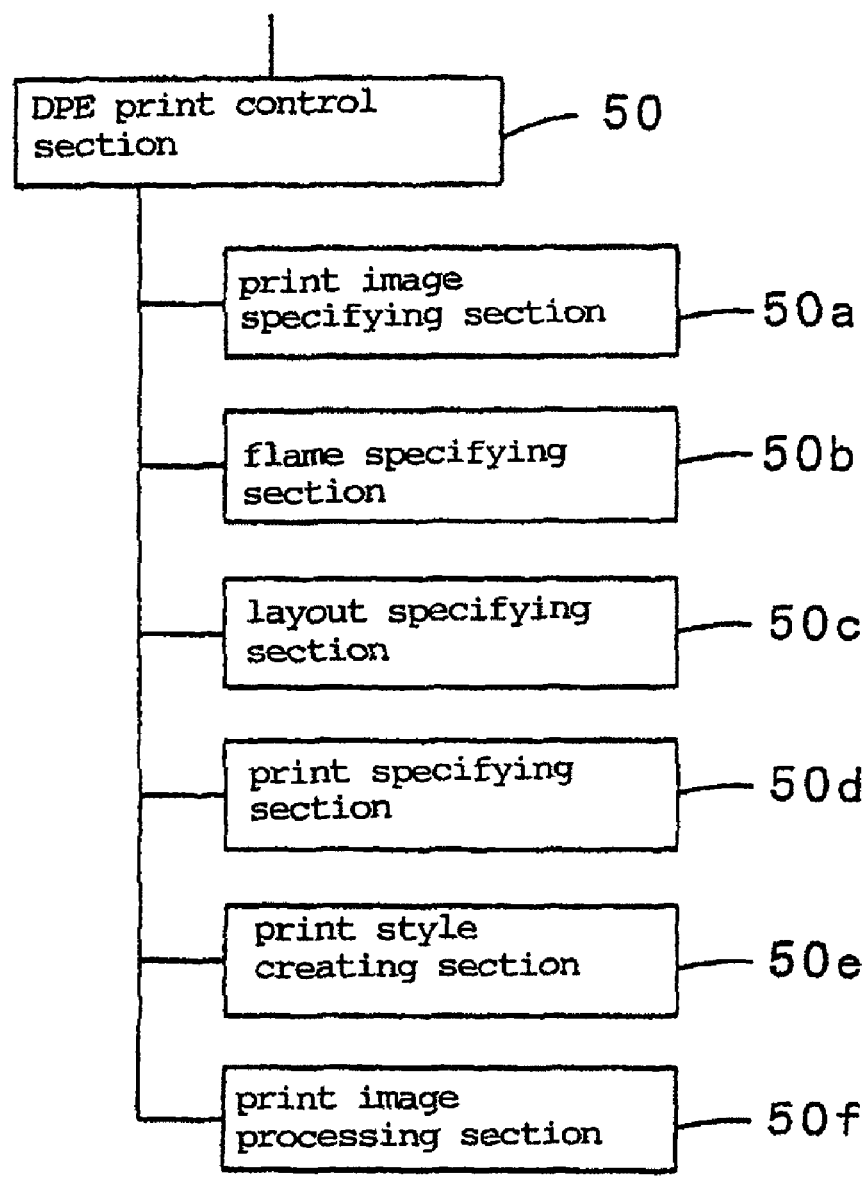
FIG. 46 is a functional block diagram showing a DPE print control section.

FIG. 46 shows the specific structure of the DPE print control section 50 for executing such "print specification" and "print" processings. The print image specifying section 50a takes over the specification of image data selected as described above, and the processing of "print specification" is executed by the frame specifying section 50b and the layout specifying section 50c. Consequently, actual print data are generated by a print style creating section 50e and a print image processing section 50f under the control of the print specifying section 50d. In general, the image data are displayed in multigradation display of RGB. On the other hand, the print is often carried out in two gradation display of CMYK. Consequently, the print image processing section 50f executes the image processing corresponding to the above-mentioned specification, changes a color space of RGB→CMYK and executes a multigradation→two gradation conversion processing.

It the case in which a plurality of modification information are saved in time series for one image data, it is sufficient that a history is displayed when deleting the modification, thereby carrying out the deletion by going back one by one. As a matter of course, in the case in which there are modified data in case aeries, the image processing is sequentially carried out from the oldest data to reproduce image data to be utilized. Moreover, in the case in which the modification is to be added, modification information is newly generated and the previous modification information is left and saved.

Second Embodiment

Figure 47:
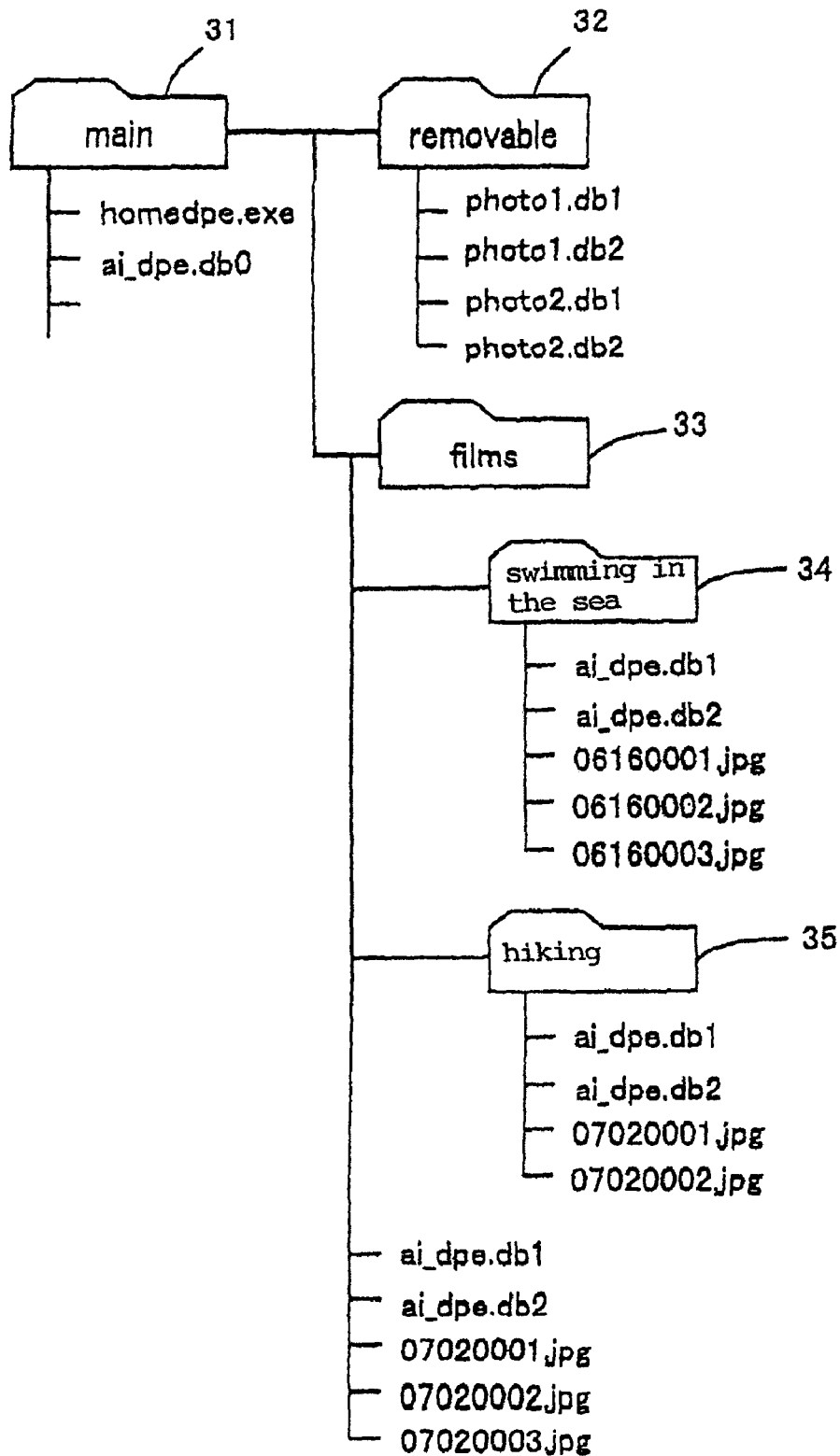
FIG. 47 is a diagram showing a directory structure.

On the other hand, FIG. 47 shows the above-mentioned hierarchical structure in a folder unit more specifically. First of all, film data 30c are saved as a database file ai_dpe.db0 of a "main" folder 31 in which a main program of an image data processing apparatus is stored. Since the same folder as in the main program is used, a correspondence of a patrone to a folder is important information to be a nucleus. It is possible to prevent the resultant dissipation by changing a place according to a user's optional designation. Next, an image file 30a saved in an exchangeable storage region such as a CD-ROM 13c-1 is saved as database files photo1.db1, photo1.db2, photo2.db1 and photo2.db2 in a "removable" folder 32 having photographic data 30b formed in the "main" folder 31 in order to manage the photographic data 30b in a patrons unit. The names of photo1 and photo2 are attached to one patrone and two files having extensions of db1 and db2 attached thereto are generated respectively. Any of the two database files which has the extension of db2 is a special file for a thumb nail in the photographic data 30b, and the residual photographic data 30b are stored in the file having the extension of db1. In this example, accordingly, one set of database files photo1.db1 and photo1.db2 constitute the photographic data 30b.

On the other hand, in the case in which the image file 30a is to be saved on a hard disk 13b, it is saved in a "films" folder 33 formed in the "main" folder 31. One folder is further formed for each patrone in the "films" folder 33. When "swimming in the sea" is set as the name of the patrone, a "swimming in the sea" folder 34 is obtained. When "hiking" is set as the name of the patrone, a "hiking" folder 35 is obtained. Database files ai_dpe.db1 and ai_dpe.db2 are created as the photographic data 30b in the respective folders and individual image files 30a are saved with unique names. As described earlier, the thumb nail data are saved in either of the two database files which has the extension of db2, and the residual photographic data are saved in the database file having the extension of db1. Moreover, information about only the image file 30a saved in the same directory is stored in the database file and so is the "hiking" folder 35 as a matter of course.

For the reasons of the processing, it is convenient that there is a patrons which saves temporarily inseparable data, and a patrone having the name of "others" is prepared. The image file 30a classified for the patron of "others" is saved in the same column as the above-mentioned "swimming in the sea" folder 34 and "hiking" folder" which are provided under the "films" folder 33. Similarly, database files ai_dpe.db1 and ai_dpe. db2 which are intended for the image film present in the same directory are created.

Thus, the image files 30a are present on an exchangeable recording medium or the hard disk 13b, and are managed in a patrone unit respectively and the places of presence are intensively managed in a database file ai_dpe.db0 of the "main" folder 31. The information is stored as a link destination in the database file ai_dpe.db0. If the link destination is on the hard disk 13b, one directory is kept and the image file 30a is saved together with the photographic data 30b. If the link destination is on the exchangeable recording medium, only the photographic data 30b are intensively saved in one directory. In the case in which the photographic data 30b and the image file 30a are not present in the same directory, that is, are on the exchangeable recording medium, the names of the database files of photo1. db2 to be the photographic data 30b are also saved in the film data 30c. The reason is that the photographic data 30b having a plurality of patrones are saved on one directory. On the other hand, in the case in which the photographic data 30b and the image file 30a are in the same directory, the names of ai_dpe.db1 and ai_dpe.db2 to be the photographic data 30b are not particularly important. The reason is that one directory is kept for each patrone and only one set of database files ai_dpe.db1 and ai_dpe.db2 are present. As a matter of course, the name of the directory corresponds to that of the patrone. Therefore, the location is also specified with the name of the patrone.

Figure 48:
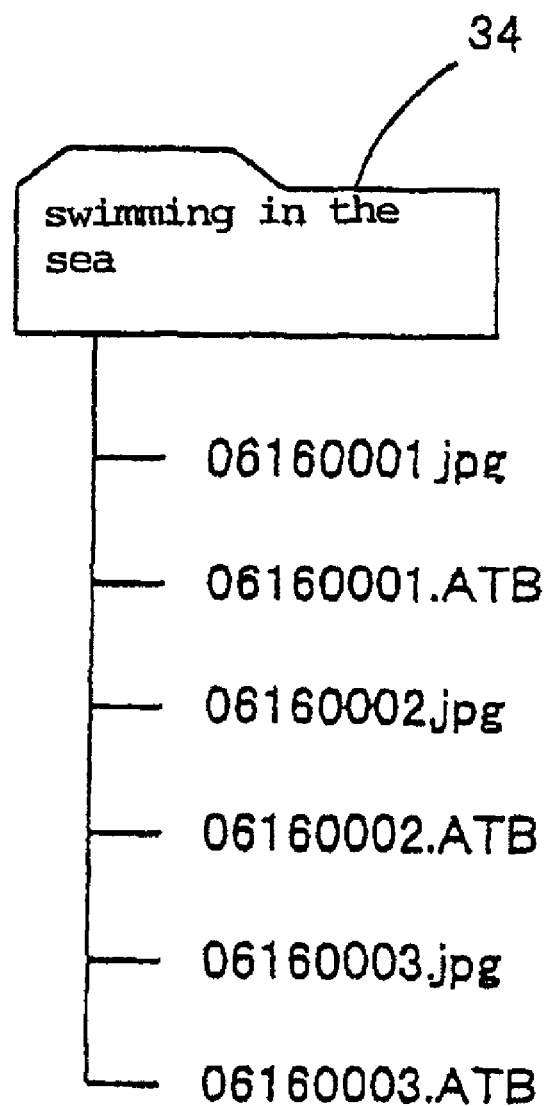
FIG. 48 is a diagram showing a variant of a file structure.

There are various methods of linking the image file 30a to the photographic data 30b. While one set of database files are formed for a plurality of image files 30a in the above-mentioned example, it is also possible to carry out dispersion in a file unit. In FIG. 48, one attribute file "0616000x.ATB" including the above-mentioned modification information, feature information, color matching information and the like is generated as the photographic data 30b for one image file "0616000x.jpg". In this case, one directory is generated for one patrone; and an image file 30.a group and an attribute file 30d group are saved in each directory. When treating the image file 30a, first of all, it is decided whether or not the attribute file 30d and the image file 30a in each directory correspond at a ratio of one to one. If they are coincident with each other, the thumb nail data in the attribute file 30d are used to execute simple display and various operation processings. In this case, the attribute file 30d is specified by the location of the director written to the file data 30c and the name of each image file 30a. Therefore, these information constitute link information of the image file 30a and the modification information.

As another example in which the database file is not generated, it is also possible to generate a file in which the image file 30a and the photographic data 30b are integrated. FIG. 49 (a) shows an example of a directory structure obtained in that case. On the premise that one image file "0616000x.jpg" is present, one file "0616000x.PHT" including the photographic data 30b is generated. In this case, the photographic data 30b belong on the premise that the image file 30a is present. Therefore, the correspondence is coincident differently from the case of other files.

Moreover, version up for a modification processing is anticipated and spare information to cope with other changes which cannot be anticipated are required. FIG. 49 (b) shows an example in which information indicative of the version of an image modifying engine is included corresponding to the version up of the modification processing. Herein, there is generated a file "xxxx.PHT" integrated by an image file "xxxx.jpg" and an information file "xxxx.ENG" indicative of the version of an image modifying engine in addition to photographic data "xxxx.ATB".

Figure 50:
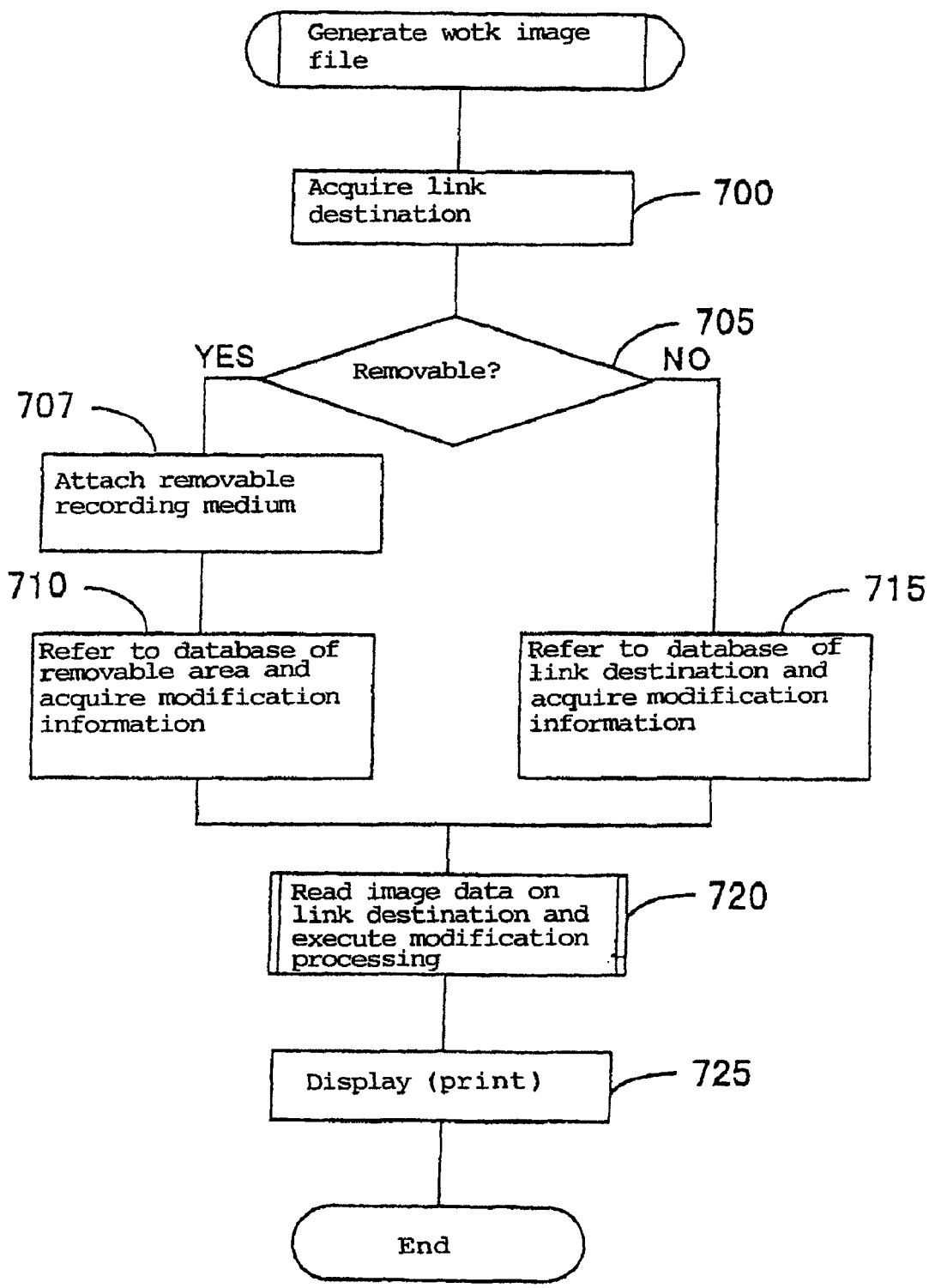
FIG. 50 is a flowchart showing a processing of generating a work image file.

FIG. 50 shows a specific example to be carried out in the case in which such a folder structure is employed. As described above, the usual result of a modification processing is reflected on only the thumb nail and the original image file 30a is not modified. Accordingly, it is necessary to carry out the modification processing on the actual image file 30a in the case of equal magnification display and enlargement display or print. As a matter of course, temporary work image data 30a are obtained as the result of the modification.

On the premise of the above-mentioned file structure, description will be given to a work image file generation processing shown in FIG. 50. When the simultaneous print processing in FIG. 34 is being executed, it is necessary to display the image file with an equal magnification or with enlargement in order to check the result of the modification during the execution. In the case in which the print is finally executed, the image file reflected on the result of the modification is required. In the work image file generation processing shown in FIG. 50, a work image file is generated in such a case.

Figure 51:
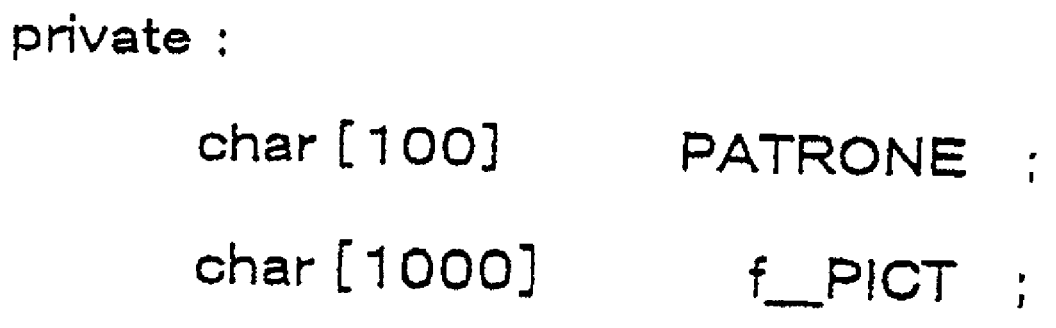

This processing is implemented as one module or the like. In order to call the module, an image file is specified under the selection of a certain patrone. As shown in FIG. 51, accordingly, the selection information about the patrone is prepared in a variable PATRONE and a variable f_PICT indicative of the presence of the selection for the image file 30a held in each patrone is prepared. The variable f_PICT is a 1000-byte character region. Each byte is selection information for each image file 30a, and the presence of the selection of approximately 1000 image files 30a can be specified. An argument can be given to refer to one byte in an optional location. Based on the information, the presence of the selection of each image file 30a is decided.

First of all, the film data 30c of the patrons selected from the variable PATRONE is referred with the database file ai_dpe.db0 of the "main" folder 31 at Step 700. The film data 30c includes a medium attribute and a link destination for the patrone. At the Step 700, accordingly, the lint destination is acquired. At Step 705, it is decided whether or not a recording medium is exchangeable from the medium attribute, that is, is removable and the processing is branched. In the case in which the recording medium is removable, a corresponding removable recording medium is first attached at Step 707. More specifically, a path name to be the link destination of the removable recording medium and a medium label are acquired to promote the user to set the recording medium to a predetermined drive. If the recording medium is set, whether or not the setting is correct is confirmed. If the setting is incorrect, the user is promoted to try it again. If the setting is completed, a corresponding database file in a "removable" folder 32 is referred at Step 710. With the database files photo1.db1 and photo1.db2, the modification information of each image file specified based on the specification information based on the variable f_PICT is acquired therefrom.

In the case in which the recording medium is not removable based on the medium attribute, a folder having the name of the patrone is searched in the films folder 33 at Step 715 and the data base files ai_dpe.db1 and ai_dpe.db2 in the corresponding folder are referred. Then, modification information of each image file specified based on the specification information in the variable f_PICT is acquired from the database file.

Thus, the location of the image file 30*a*, the modification information corresponding thereto and the like can be acquired. At Step 720, the modification processing is executed by the image modifying engine corresponding based on the specified modification information at Step 720, and furthermore, an original enlargement display or print processing is executed at Step 725. The Step 725 may be executed from the module or the processing may be carried out after it is once returned to a high order module.

Figure 52:
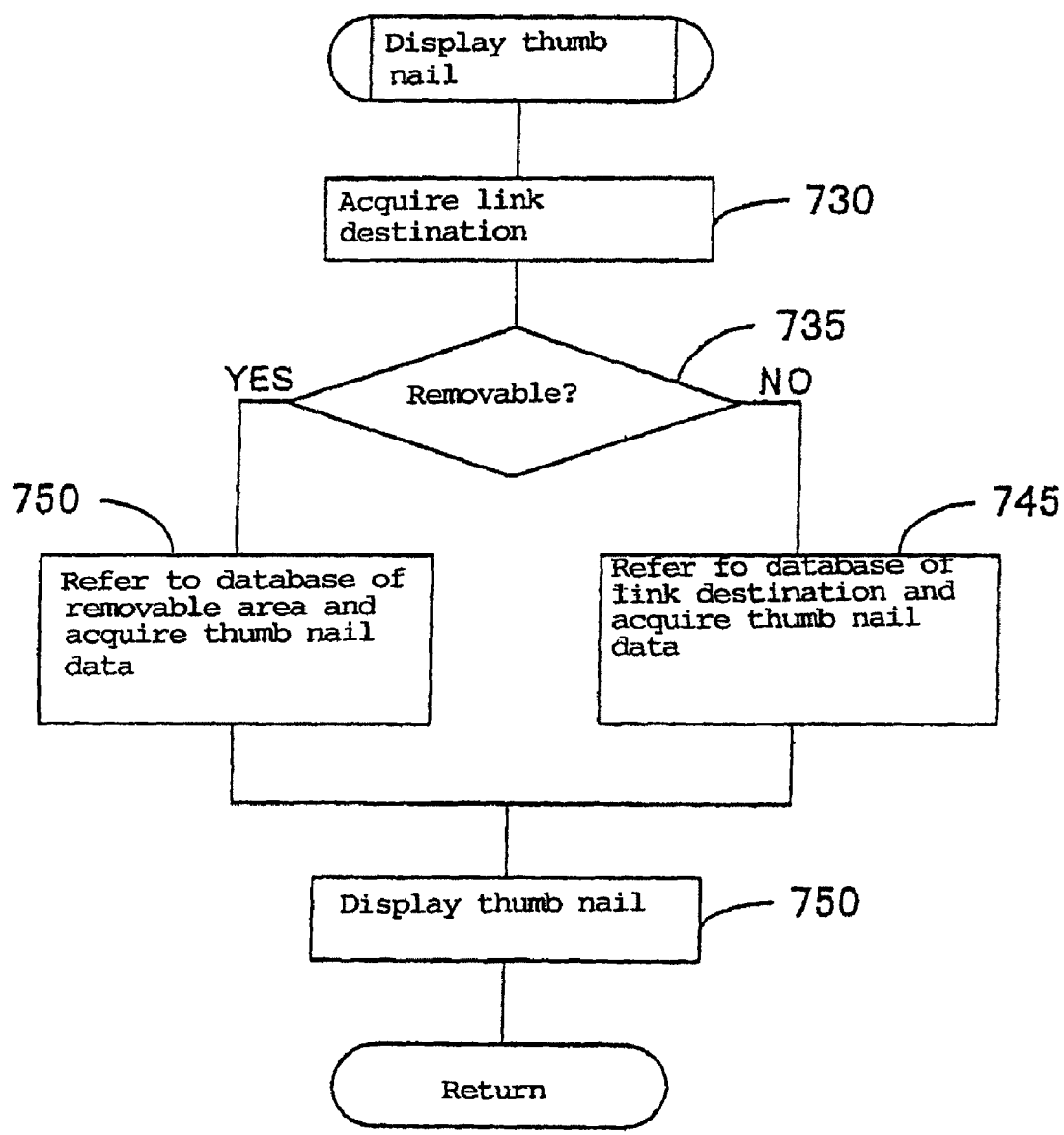
FIG. 52 is a flowchart showing a thumb nail display processing.

On the other hand, a thumb nail image is displayed in an image display region dp4 in a state in which the patrone is selected. In this case, a thumb nail display processing shown in FIG. 52 is carried out. Also in this case, first of all, the film data 30*c* of the patrone selected based on the variable PATRONE at Step 730 are referred in the database file ai_dpe.db0 of the "main" folder 31, and a medium attribute and a link destination about the patrone are acquired from the film data 30*c*. It is decided whether or not a recording medium is exchangeable from the medium attribute, that is, removable. If the recording medium is removable, thumb nail data are acquired from the database file photo1.db2 in the "removable" folder 32 at Step 740. If the recording medium is not removable based on the medium attribute, a folder having the name of the patrone is searched in the films folder 33 at Step 745, thereby acquiring the thumb nail data from the database file ai_dpe.db2 in the corresponding folder. Then, the thumb nail data thus acquired are displayed in an image display region dp4 at Step 750.

Next, description will be given to a processing capable of optionally changing the order of an image processing. FIG. 53 shows the contents of the modification information in the photographic data 30*b* in this case. The contents of the processing include "automatic image adjustment", "brightness", "contrast", "red (enhancement)", "green (enhancement)" and "blue (enhancement)" as shown in the leftmost column. For each processing, individual specified information to be set include "version of modifying engine", "order (execution order information)" and "processing intensity" as shown in the uppermost column.

The "automatic image modification" has a fixed execution order of the each processing content. Therefore, only if the "automatic image modification" is not selected, the order is effective in the other processings. In FIG. 53 (*a*), "1" is set to the order of the automatic image modification and "0" is set to the other processings which implies no selection. On the other hand, in FIG. 53 (*b*), "0" is set to the order of the automatic image modification which is not selected. The order of "1" to "5" is set to the other processings.

Figure 54:
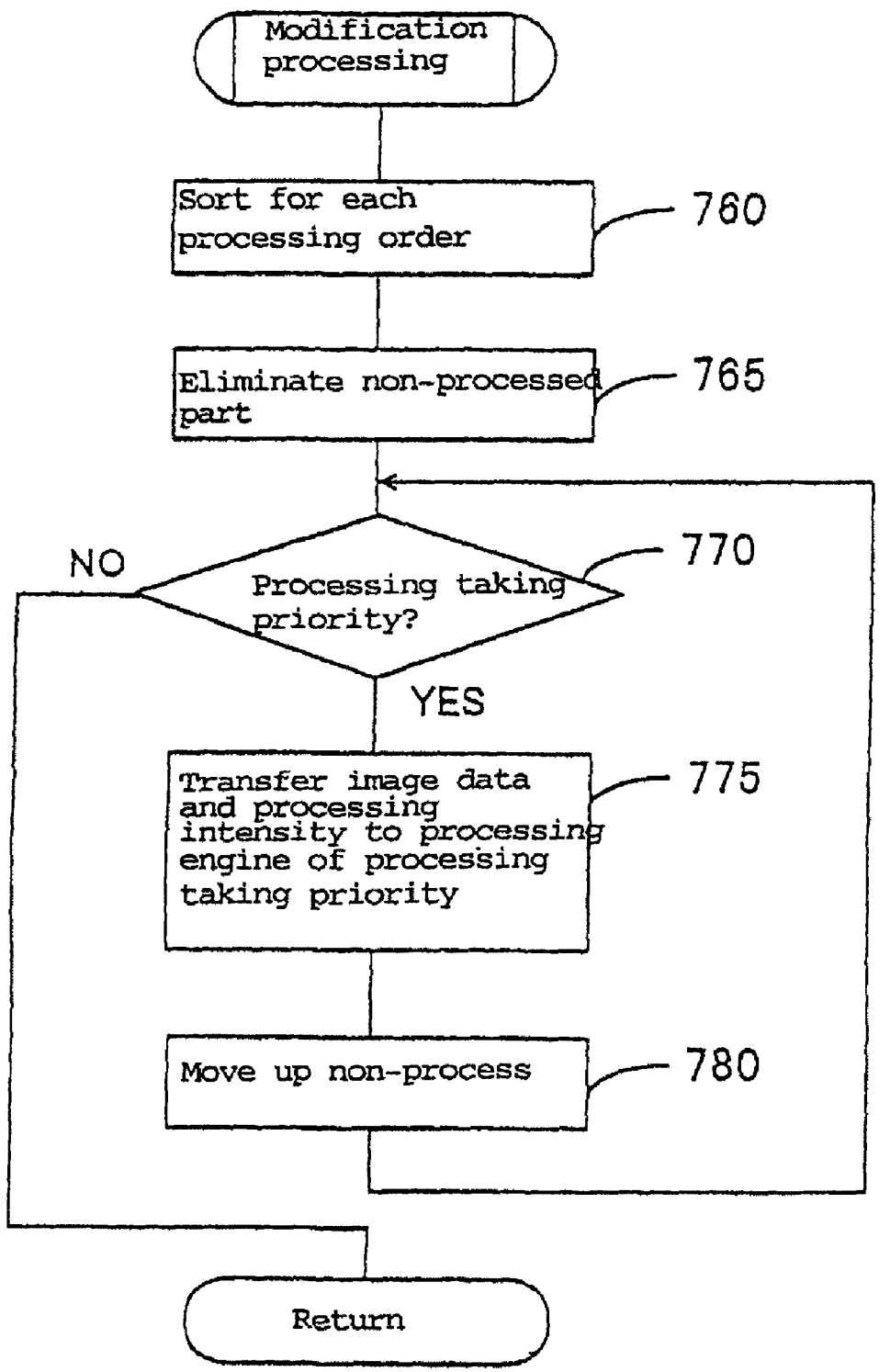
FIG. 54 is a flowchart showing an example of a modification processing.

FIG. 54 is a flowchart for executing the modification processing of an image in the case in which such a processing order is attached. At Step 760, first of all, a sort for each processing order is executed. As described above, if the processing is not selected, "0" is attached. As a result of an ascending order sort, therefore, a processing which is not selected comes up to the head. At Step 765, "0" is attached to the column of order and the processing arranged on the head is eliminated. For example, only the automatic image processing is left in FIG. 53 (*a*) and only the automatic image processing is eliminated in FIG. 53 (*b*). The processing objects are arranged in order of a red enhancement, a green enhancement, a blue enhancement, a brightness and a contrast.

At Step 770, it is decided whether or not the loop is ended. If there is not a processing object, the modification processing is ended. If there is a processing object, processings are executed at Steps 775 and 780. At the Step 775, the image data and the parameter of the processing intensity are transferred to a processing engine for a processing taking a priority, thereby executing the modification processing. The processing taking a priority is sorted and arranged on the head and is a first processing for the read enhancement in the example of FIG. 53 (*b*).

After the processing is carried out, processings which have not been carried out are moved up at Step 780. First of all, the processing for the red enhancement takes a priority. When the processing is terminated, the processing for the red enhancement is eliminated and a second processing for a blue enhancement takes a priority. Similarly, the succeeding processings are moved up. By the processings thus moved up, the processings are executed in order until a final processing is ended. The processing to be executed is finally gone and the loop processing is ended.

Figure 55:
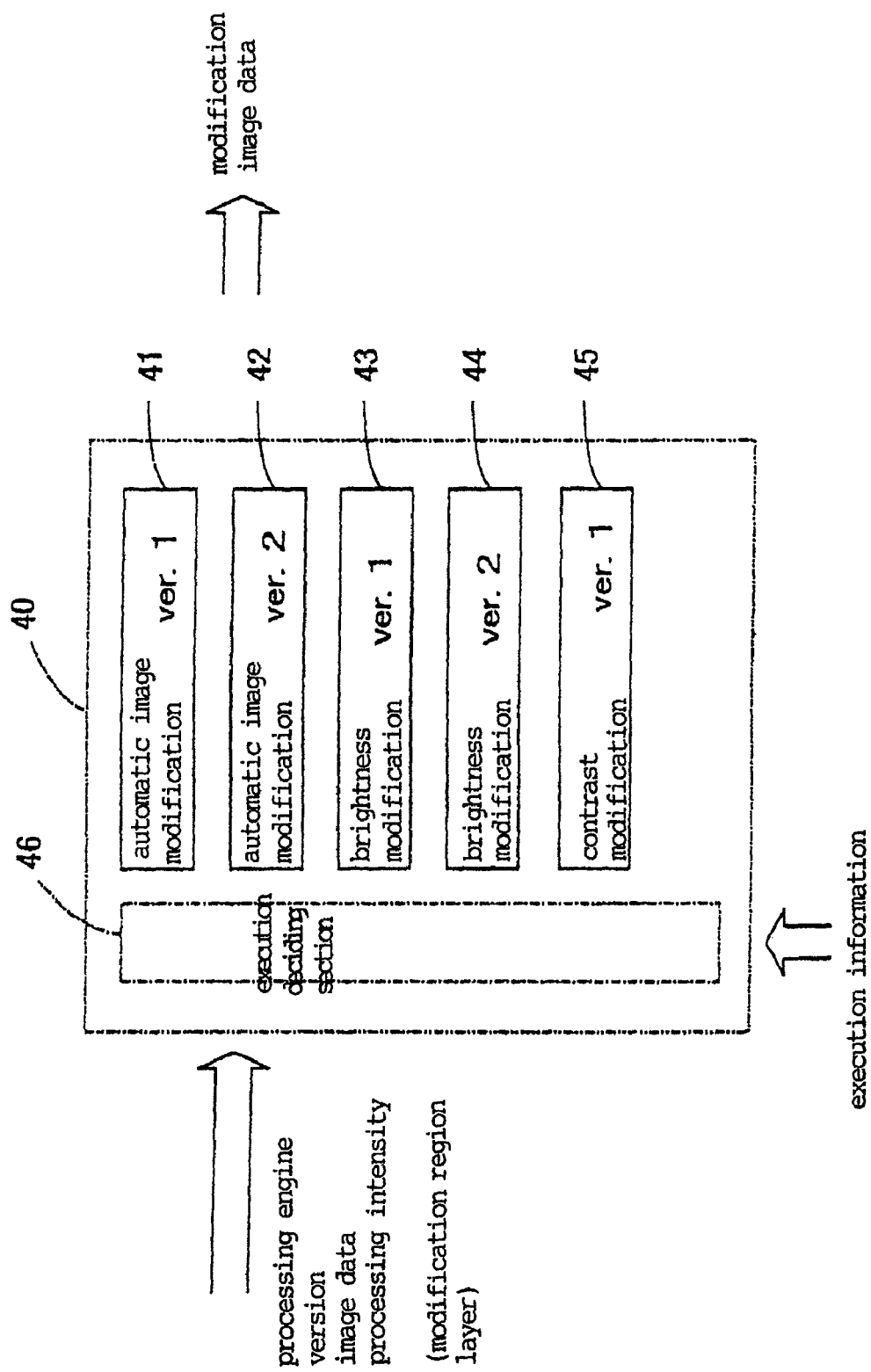
FIG. 55 is a conceptual diagram showing the modification processing.

FIG. 55 conceptually shows the processing to be carried out at the Step 775. The image modification control section 40 includes a plurality of image modifying engines on the premise that it is utilized as a so-called image modifying engine. As shown, a version 1 (41) and a version 2 (42) are provided as a modifying engine for the automatic image modification, a version 1 (43) and a version 2 (44) are similarly provided as a modifying engine for the brightness modification, a version 1 (45) is provided as a modifying engine for the contrast modification and so are others. As shown in FIG. 55 at the Step 775, when the version of the processing engine, the image data and the processing intensity are specified as parameters for the image modification control section 40, the image modification control section 40 executes, on the image data, the image modification as specified to output the image data thus modified.

More specifically, modifying engines 41 to 45 . . . corresponding to the contents of the parameter are selected in the image modification control section 40 and the parameter is given thereto, thereby executing the image modification. As a matter of course, the image modification control section 40 itself is constituted as a module aggregate of a large number of modules, and a module for a specific modifying engine is executed through a branch processing.

Thus, the element of the order is set as one of parameters of the modification information and sorting is executed. Consequently, the modification processing can be carried out in desirable order without executing unnecessary processings.

On the other hand, the respective processings of "automatic image modification", "brightness", "contrast", "red (enhancement)", "green (enhancement)" and "blue (enhancement)" can be grouped and used separately. For example, they can be formed into three groups, that is, a first group having the "automatic image modification", a second group having the "brightness" and the "contrast" and a third group having the "red (enhancement)", the "green (enhancement)" and the "blue (enhancement)". The first group originally requires a feature extraction processing, a modification information creation processing, and a modification specification processing and should be implemented as a series of processings. Moreover, the second group has a main object to convert a luminance as the contents of the processing and has a community. Furthermore, the third group implements an enhancement processing for each color component and has common processing contents.

Accordingly, in the case in which an execution environment has a margin, for example, a CPU has a high processing capability, the specification of all the groups can be executed and the third group can be implemented depending on the execution environment, while the first and second groups cannot be implemented. Whether or not the first to third groups can be executed is determined by environment setting or the like and whether or not each of the modifying engines 41 to 45 . . . can be executed is referred based on execution information by an execution deciding section 46 of the image modification control section 40. Although the modifying engine is executed for the processing of the group which can be executed, the modifying engine is not executed for the processing of the group which cannot be executed and the processing is ended in the mane manner as the completion of the processing.

While a set of photographic data 30b have been mainly described above, it is also possible to employ a structure having plural sets as in the above-mentioned history information. FIG. 56 shows an example of the contents of the photographic data 30b in the case in which plural sets of modification information are provided. For the contents plural sets of modification information shown in FIGS. 53 (a) and 53 (b) are provided.

Figure 57:
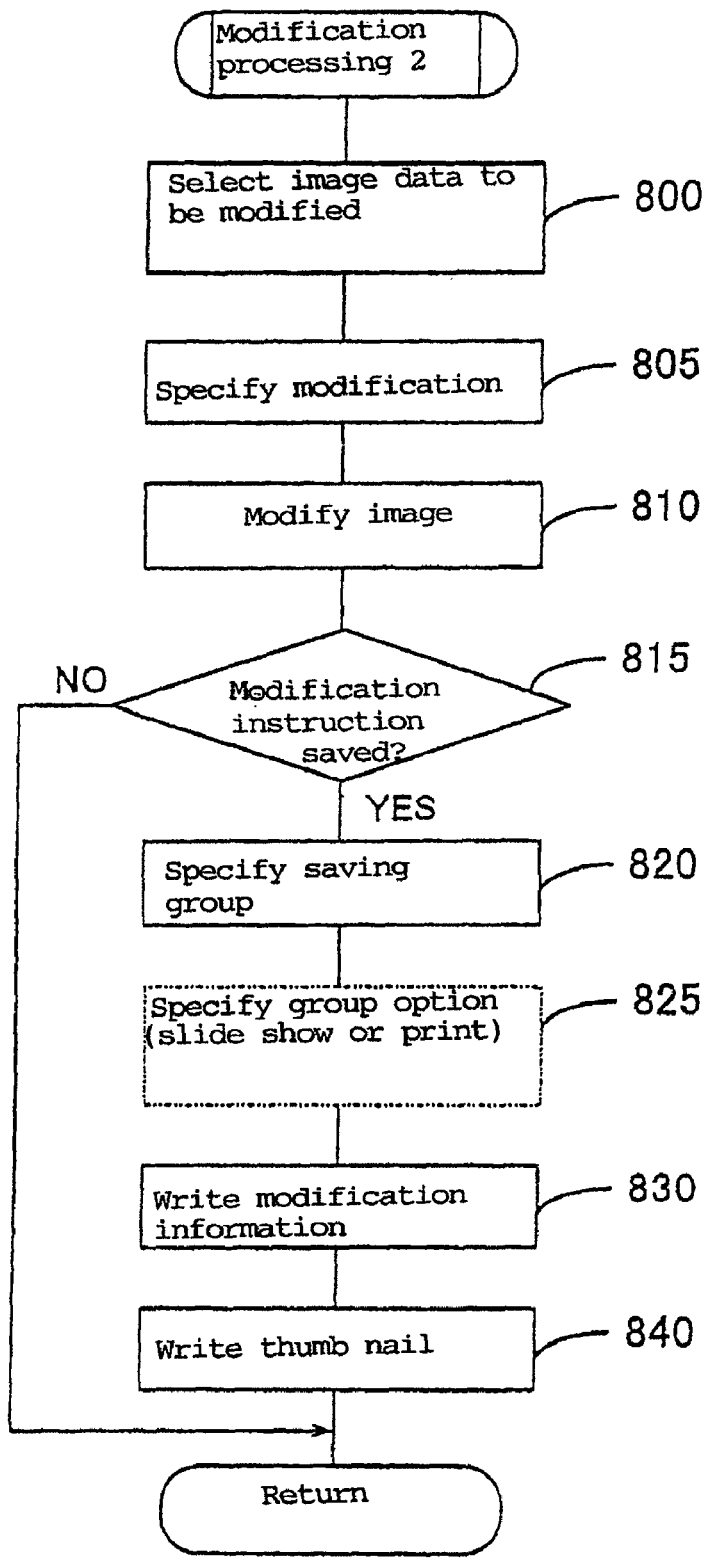
FIG. 57 is a flowchart showing a modification processing to be carried out when plurality of groups have modification information.

Each set is referred to as a first group. FIG. 57 is a flowchart showing a processing to be carried out in the case in which the photographic data 30b have a plurality of groups. First of all, it is necessary to save a plurality of groups because only one specification of the modification is provided.

Image data to be modified are selected at Step 800, modification to be executed is concretely specified at Step 805 and the specified modification is executed at Step 810. As a matter of course, the image modification at the Step 810 is executed for thumb nail data representing the original image file 30a. The way of giving an instruction is the same as described above.

Next, an inquiry is made to a user as to whether or not the instruction for modification given at the Step 805 is saved at Step 815. The inquiry is displayed on a display 17a by using a GUI and causes a mouse 15b or a keyboard 15a to respond. If the instruction for modification is to be saved, the specification of a saving group is input at Step 820. Five saving groups are previously set to be selected, any of which is input through the GUI. As a matter of course, the number of the saving groups is optional. It is also possible to add the saving group in order without determining a constant upper limit.

When the saving group is determined, the modification information is written at Step 830. As such a manner that the number of the groups is determined in advance, a predetermined case may be caused to correspond to each group. For example, the first group corresponds to a modification processing for a slide show and the second group corresponds to a modification processing for printing. Moreover, when each group is to be selected, specification may be given individually, for example, the group is set to the slide show or the printing. Step 825 represents a processing of causing the group to correspond to the conditions for execution, and is not essential.

When the modification information is written, the thumb nail data are also written at Step 840. The thumb nail data are necessary for each group, and are additionally written to the database file of the photographic data 30b which as an extension of db2.

Figure 58:
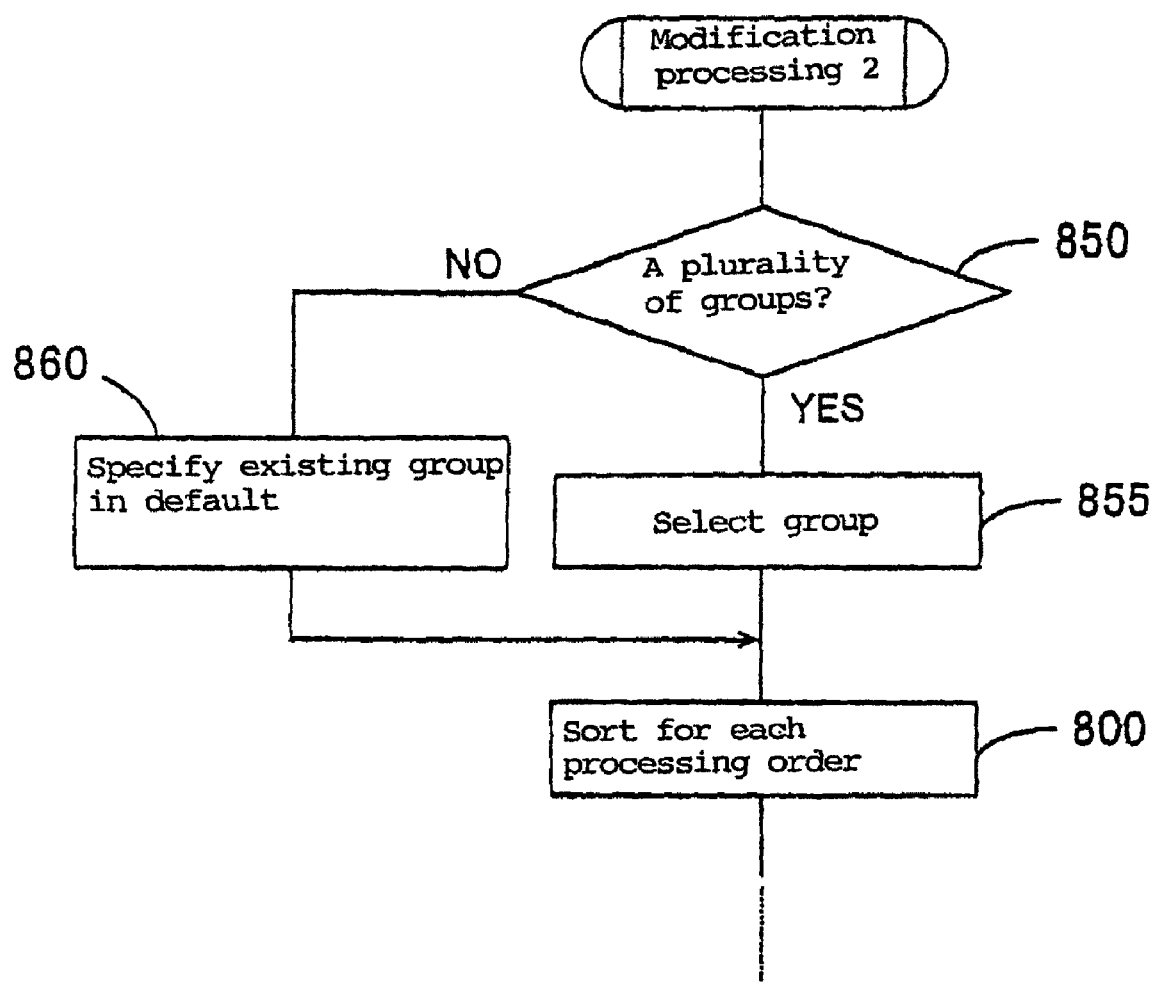
FIG. 58 is a part of the flowchart showing a modification processing to be carried out when a plurality of groups have modification information.

FIG. 58 shows the modification processing to be carried out when a plurality of groups are registered as described above. On the premise of the modification processing shown in FIG. 54, it is decided whether or not the modification information of a plurality of groups are saved at Step 850 and any of the groups is selected at Step 855 only if there are a plurality of groups. If there are not a plurality of groups, default specification is given to the existing group at Step 860. At Step 855 or Step 860, one group is specified as modification information. Therefore, processings at and after the Step 800 shown in FIG. 57 are executed.

In this example plural sets of whole parameters are prepared and any of the sets is selected. However, the plural sets of whole parameters are not always prepared but a plurality of processing patterns can also be prepared for a part of the image processings as a matter of course. For example, a plurality of columns for the processing intensity are prepared in FIGS. 53 and 56 and the column to be set is specified in the same manner as in the specification of the saving group at the Step 820. When reading, the set for reading is selected at Step 855 if a plurality of values are set to a plurality of columns at the Step 850.

Figure 59:
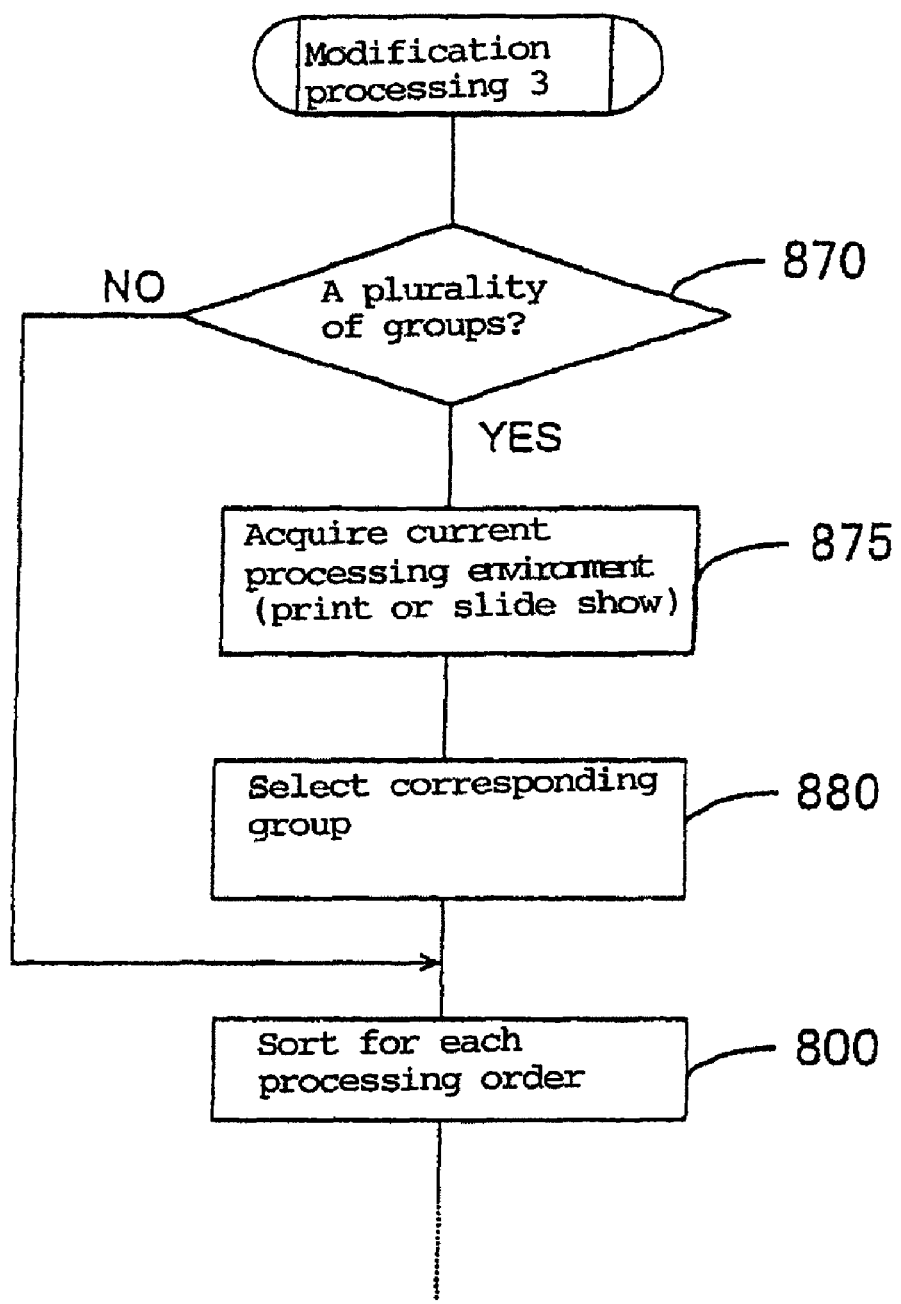
FIG. 59 is a part of a flowchart showing a modification processing to be carried out by causing the group to correspond to an environment.

On the other hand, the condition of execution is sometimes attached to the group to be saved as described above. In this case, the modification processing is executed according to a flowchart shown in FIG. 59. More specifically, it is decided whether or not there are a plurality of groups at Step 870 and a current environment is acquired at Step 875 if there are a plurality of groups. This environment corresponds to the above-mentioned conditions. More specifically, it is decided whether the slide show or the print processing is being executed by referring to a predetermined variable or a flag. Any variable can be referred. As an example, a global variable JOKEN may be set. If the current condition is acquired, a group corresponding to this condition is selected at Step 880. In the following, processings at and after the Step 800 shown in FIG. 57 are executed.

Thus, when the modification processing is executed, the condition of the execution is set. Consequently, when a processing such as display or print is activated, the environment is automatically decided. If the modification processing is previously set for the environment, a corresponding modification processing is automatically carried out. For example, in the slide show, it is necessary to prevent an original display interval from being exceeded during the modification of an image. Accordingly, it is desirable that a time required for the processing should be shortened and the processing is to be simplified. On the other hand, high picture quality is desired even if a long time is required for the printing. Therefore, the desirable modification processing can be carried out.

From such a background, effectively, a group for modifying only a brightness and a contrast which can be processed comparatively simply is registered in place of the automatic image modification in the slide show and a group is registered to execute the automatic image modification in the printing.

Figure 60:
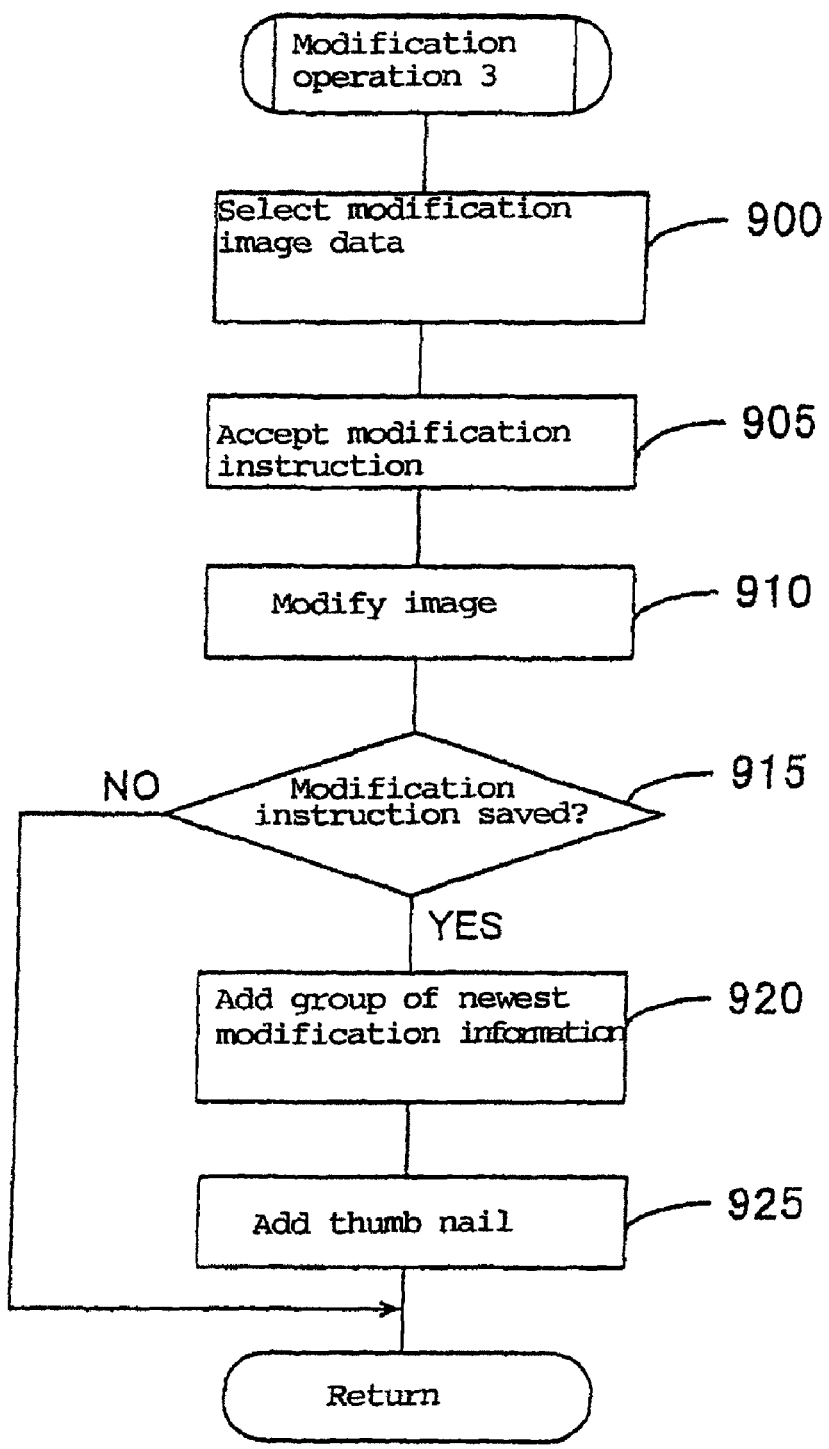
FIG. 60 is a flowchart showing a modification operation to be carried out when a plurality of groups have history modification information.

Next, FIG. 60 is a flowchart to be utilized for a history by using such a plurality of groups. At Steps 900 to 910, predetermined image data are selected and modified in the same manner as in the above-mentioned Steps 800 to 810. Then, whether or not the modification instruction is saved is selected at Step 915. If the modification instruction is saved, a group of the newest modification information is added at Step 920. For example, if there are three existing groups, the group is saved as a fourth one. At this time, a modification date or the like may be added as one of the information. At Step 925, corresponding thumb nail data are added to a predetermined database file in the same manner as in the Step 840 and the like.

Figure 61:
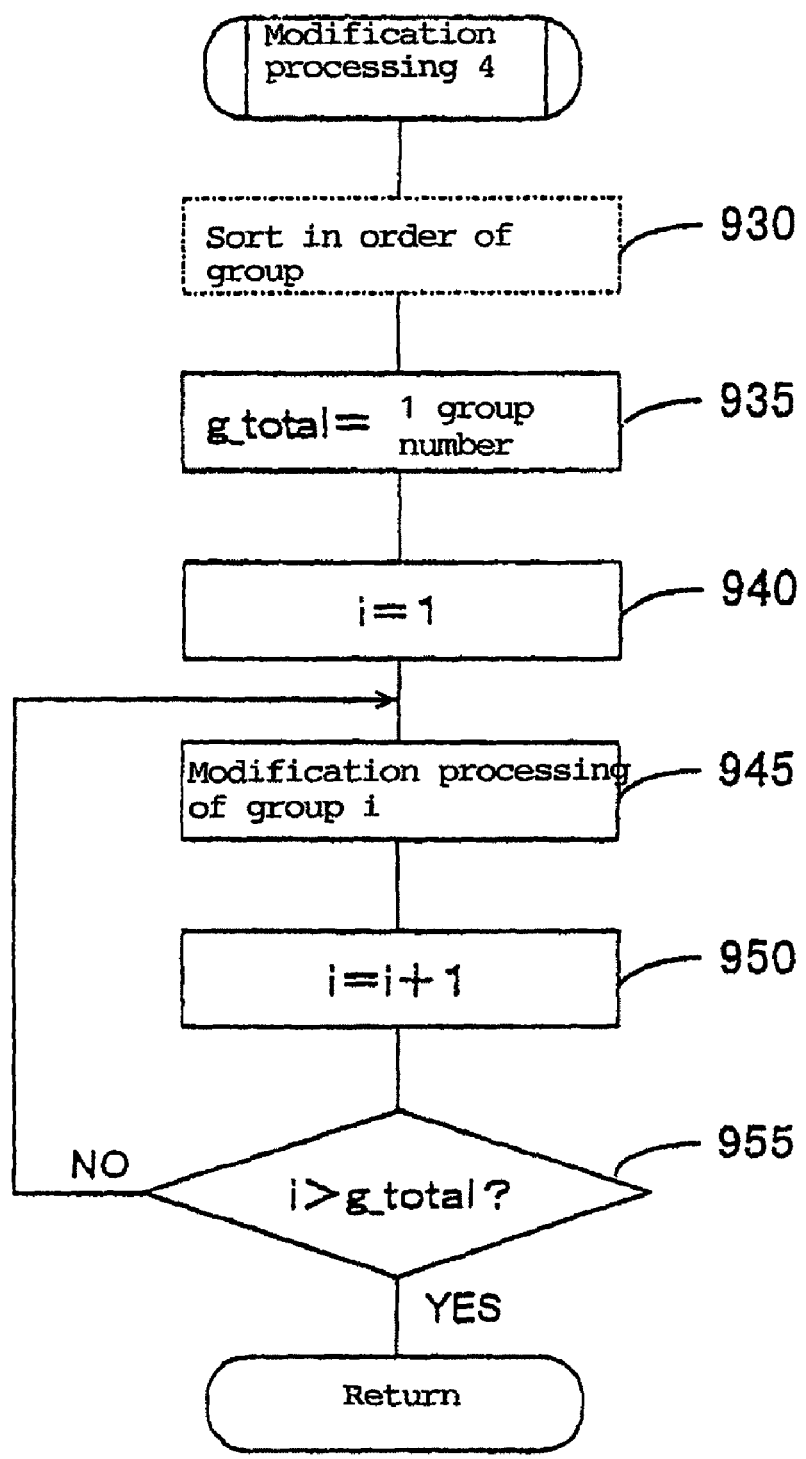
FIG. 61 is a flowchart showing a modification processing to be carried out when a modification history is implemented by a plurality of groups.

For the history, new modification should be executed on the past modification. FIG. 61 is a flowchart for a modification processing to be carried out when there is modification information for the history. First of all, a sort is executed in order of the execution of a group at Step 930. Usually, a group having a greater number is newer modification information and is not essential. However, a specification may be altered or the information about the modification date may be saved as described above. Therefore, it is significant that the sort can be executed.

If the sort is completed, the number of groups is set to a variable g_total at Step 935, and "1" is set to a loop pointer i at Step 940. Then, the modification processing is carried out based on the modification information of a group i indicated by the loop pointer i at Step 945. "1" is sequentially added to the loop pointer i at Step 950. Therefore, the modification processing is carried out in order from a smaller group number and a newer history is reproduced in order. At Step 955, it is decided whether or not the loop pointer i exceeds the number of existing groups. As long as the loop pointer i does not exceed the number of groups, a loop is repeated on the assumption that there are unprocessed modification processings.

On the other hand, it is not the premise that the modification processing is executed for only a part of the image data. As a matter of course, the modification processing can also be executed for a part of the image data in addition to the whole image data. A part of the image data implies a part of an image region or a part of layers if the image is constituted by a plurality of layers.

Figure 62:
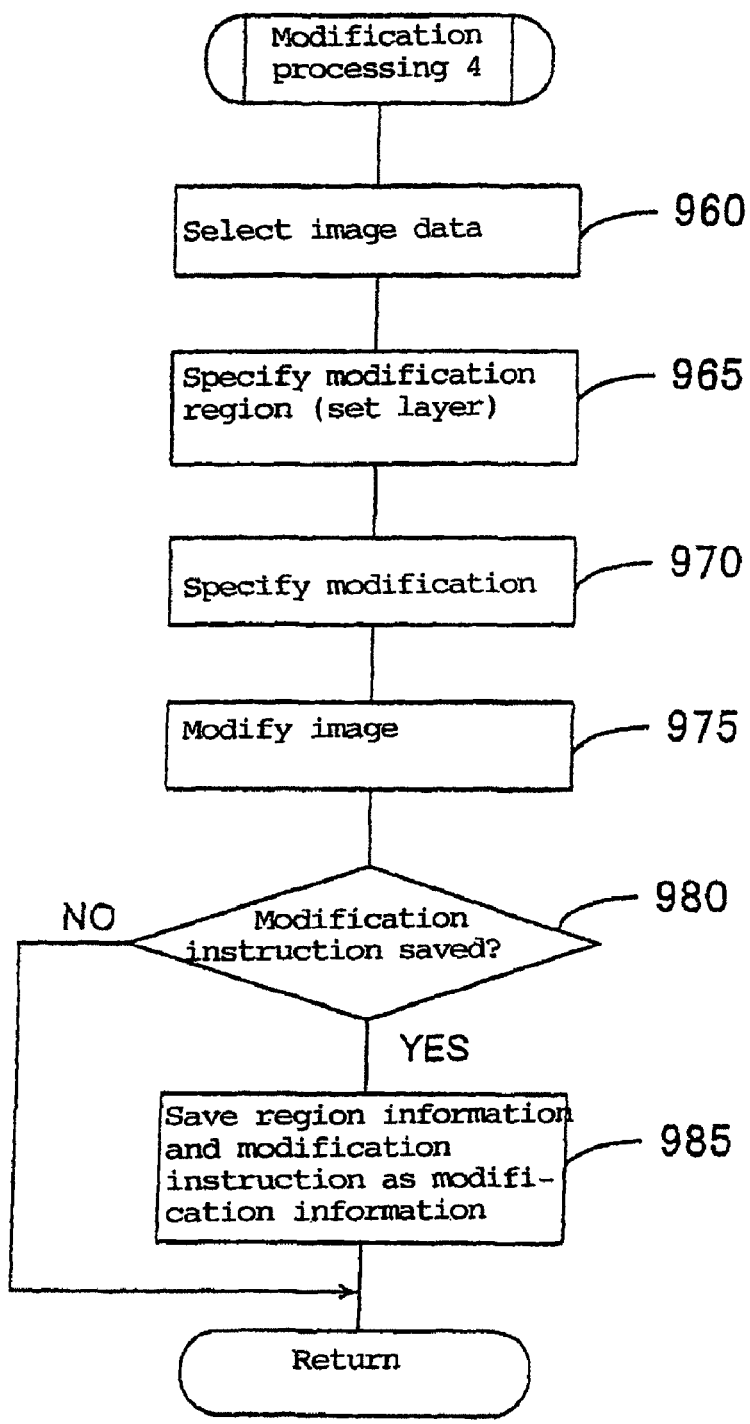
FIG. 62 is a flowchart showing a modification operation to be carried out when a part of an image is modified.

FIG. 62 is a flowchart showing the case in which such a modification region is specified to implement image modification. When image data to be processed are selected at Step 960, a modification region is specified at Step 965, an instruction for the modification is given at Step 970 and an image is modified at Step 975. The specification of the region and the contents of the modification properly repeat trial and error in many cases. Therefore, the order of the processings at Steps 965 to 975 represents only the relative order of execution.

At Step 980, whether or not an instruction for modification is saved is inquired. If the instruction for modification is to be saved, it is saved as modification information together with information about a region, at Step 985.

It is apparent that the modification region thus saved is only one parameter for the modifying engine. As shown in FIG. 55, accordingly, modification is partially added corresponding to a region and a layer on the modifying engine side, and modified image data are output.

In the case in which a concrete specific region is to be designated for the specification of the modification region; the coordinate values of two diagonal corners can be designated or every object in a rectangular region or a desirable region can be designated in an optional curve, for example.

Moreover, it is also possible to designate a central part, an upper half or a lower half of the whole region.

On the other hand, it is also possible to specify the color of an image to correspond to an image processing. For example, a chromaticity which is rarely influenced by a brightness can also be designated to correspond to an image processing, for example. It is supposed that most objects are human faces in a skin color region. The blurred human face looks more beautiful than the sharp human face. Accordingly, the chromaticity of the skin color is specified in place of the region information and an instruction for decreasing a sharpness (blurring) is given as an instruction for modification. On the modifying engine side, the chromaticity of a pixel to be processed is identified and the processing intensity is made unsharp as designated with an object chromaticity.

As another example of each chromaticity, it is also suitable that the chromaticity of a blue sky should be specified to make an unsharpness. Moreover, it is also suitable that a processing of enhancing red should be specified in consideration of the bright colors of the sunset.

If image data of each pixel are expressed by (R, G, B), the chromaticity is represented as follows $r=R/(R+G+B)$ $b=B/(R+G+B)$ The chromaticity is rarely affected even if a human skin looks dark or bright, and has a constant distribution. More specifically, the decision can be carried out by the following expression.

$0.33<r<0.51$ $|0.74r+b-0.57|<0.1$

If this condition can be applied to each pixel, the chromaticity belongs to the skin color region. In consideration of a greater fluctuation width of the blue sky than the skin color, it is preferable that the following expression should be established.

$0.17<r<0.30$ $|1.11r+b-0.70|<0.2$

In order to execute the optimum image processing depending on the situation of a pixel, for example, the position of a pixel, the color of a pixel and the like, a parameter corresponding to the situation of the pixel is related and saved. When the parameter is acquired, an image processing corresponding to the situation of the pixel is executed to reproduce an image.

Thus, image data are housed in a folder to be managed as a film metaphor and the database of the photographic data 30b corresponding to each image data is prepared. When a desirable image processing is selected for desirable image data, the selected image processing is updated as modification information in the database structure. When display, output or print is actually required, the modification information is referred on only a work area with original image data left, thereby executing various image processings. Therefore, it is possible to easily execute the image modification and the like with image data left as an original.

INDUSTRIAL APPLICABILITY

As described above, the present invention can provide an image data processing apparatus capable of easily utilizing a result of an image processing while leaving original image data when carrying out the image processing on image data.

According to the second aspect of the present invention, moreover, an image data set relating at least the parameter to the image data can be created. Recording to the third aspect of the present invention, if such an image data set is present, it is possible to reproduce the desirable result of the image processing which is set.

According to the fourth aspect of the present invention, the contents of the image processing can be represented more specifically. Consequently, the reproducibility can also tee maintained easily.

According to the fifth aspect of the present invention, moreover, the results of reproduction of a plurality of correspondences can be substantially prepared and the results of the reproduction can be selected depending on the situation.

According to the sixth aspect of the present invention, furthermore, it is possible to provide an optimum image processing result in consideration of execution conditions and the like.

According to the seventh aspect of the present invention, moreover, it is possible to increase variation by an irreversible image processing with the reproduction of execution order or to reproduce an image processing process.

According to the eighth aspect of the present invention, furthermore, a plurality of results of the image processing can be obtained by only the individually prepared parameters. Therefore, it is possible to provide a plurality of image data without greatly increasing a file capacity.

According to the ninth aspect of the present invention, moreover, it is possible to apply a more proper image processing depending on the situation of a pixel.

According to the tenth aspect of the present invention, furthermore, it is possible to easily carry out relating by utilizing the hierarchical structure.

According to the eleventh aspect of the present invention, moreover, the burden of the processing can be relieved by utilizing the thumb nail data.

According to the twelfth aspect of the present invention, furthermore, it is possible to carry out an optimum correspondence in conformity with the saving situation of the image data, and particularly, to implement the correspondence of a parameter to a write disable region or image data which are not preferable for writing.

According to the thirteenth aspect of the present invention, moreover, the parameter can be set automatically.

According to the fourteenth aspect of the present invention, furthermore, the image processing section is prepared corresponding to the image processing. Consequently, the image reproduction processing can be simply implemented. Moreover, the image processing section and the like provided on the outside can easily execute the image reproduction processing.

According to the fifteenth aspect of the present invention, moreover, it is possible to provide a medium recording an image data set capable of producing the same effects. According to the sixteenth to twenty-ninth aspects of the present invention, it is possible to provide a medium recording an image data processing program capable of producing the same effects. According to the thirtieth to thirty-sixth aspects of the present invention, it is possible to provide an image data processing method.

What is claimed is:

1. An image data management processing apparatus comprising:
a saving unit that saves a thumb nail image corresponding to image data, a parameter representing contents of a predetermined image processing to be executed on the image data and position information indicative of a storage position of the image data as photographic information related to the image data in a storage region;
a thumb nail modification unit that modifies the thumb nail image by using the parameter;
a display unit that displays the modified thumb nail image on a screen;
an overwrite specification unit that inputs specification whether the image data are overwritten with modified image data that are modified by using the parameter or not; and
a determination unit that determines whether the modified image data are saved in the storage region or the photographic information are saved in the storage region;
wherein
the determination unit saves the modified image data in the storage region when the overwrite specification unit inputs the specification that the image data are overwritten; and
the determination unit saves the photographic information, which further includes information to generate the modified image data, in the storage region when the overwrite specification unit does not input the specification that the image data are overwritten.

2. The image data management processing apparatus according to claim 1, wherein the display unit displays the thumb nail image before and after the modification at the same time.

3. The image data management processing apparatus according to claim 2, wherein the parameter includes a parameter about rotation of the image data.

4. The image data management processing apparatus according to claim 1, wherein the parameter includes a parameter about trimming of the image data.

5. A non-transitory computer readable medium storing a control program to have a computer carry out an image data management method, the method comprising:
saving a thumb nail image corresponding to image data, a parameter representing contents of a predetermined image processing to be executed on the image data and position information indicative of a storage position of the image data as photographic information related to the image data in a storage region;
modifying the thumb nail image by using the parameter;
displaying the modified thumb nail image on a screen;
inputting specification whether the image data are overwritten with modified image data that are modified by using the parameter or not;
saving the modified image data in the storage region when the specification that the image data are overwritten is inputted; and
saving the photographic information, which further includes information to generate the modified image data, in the storage region when the specification that the image data are overwritten is not inputted.

6. An image data management processing method comprising:
saving a thumb nail image corresponding to image data, a parameter representing contents of a predetermined image processing to be executed on the image data and position information indicative of a storage position of the image data as photographic information related to the image data in a storage region;
modifying the thumb nail image by using the parameter;
displaying the modified thumb nail image on a screen;
inputting specification whether the image data are overwritten with modified image data that are modified by using the parameter or not;

saving the modified image data in the storage region when the specification that the image data are overwritten is inputted; and saving the photographic information, which further includes information to generate the modified image data, in the storage region when the specification that the image data are overwritten is not inputted.

* * * * *